(12) United States Patent
Dai et al.

(10) Patent No.: US 12,524,947 B2
(45) Date of Patent: Jan. 13, 2026

(54) DISPLAY PROGRAM, DISPLAY METHOD AND DISPLAY SYSTEM

(71) Applicant: Sumitomo Electric Industries, Ltd., Osaka (JP)

(72) Inventors: Guiming Dai, Osaka (JP); Toshiaki Kakii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/719,855

(22) PCT Filed: Apr. 10, 2023

(86) PCT No.: PCT/JP2023/014534
§ 371 (c)(1),
(2) Date: Jun. 14, 2024

(87) PCT Pub. No.: WO2024/029135
PCT Pub. Date: Feb. 8, 2024

(65) Prior Publication Data
US 2025/0173943 A1    May 29, 2025

(30) Foreign Application Priority Data

Aug. 4, 2022 (JP) .................. 2022-124758

(51) Int. Cl.
*G06T 13/80* (2011.01)
*G06T 11/60* (2006.01)
*G06T 13/40* (2011.01)

(52) U.S. Cl.
CPC .............. *G06T 13/80* (2013.01); *G06T 11/60* (2013.01); *G06T 13/40* (2013.01); *G06T 2200/24* (2013.01)

(58) Field of Classification Search
None
See application file for complete search history.

(56) References Cited

U.S. PATENT DOCUMENTS

2003/0117485 A1   6/2003   Mochizuki et al.
2011/0282673 A1   11/2011  Di Profio et al.
(Continued)

FOREIGN PATENT DOCUMENTS

CN    1427626 A     7/2003
CN    106575265 A   4/2017
(Continued)

*Primary Examiner* — Peter Hoang
(74) *Attorney, Agent, or Firm* — XSENSUS LLP

(57) ABSTRACT

A display program controls display of an activity in a virtual space, the activity being performed using a character operable by a user. The display program causes a computer to execute: displaying a first screen including the character and content, the content being based on details of the activity; and causing the display to transition to a second screen in response to an operation related to an action of the character, the second screen being different from the first screen and including a character corresponding to the character on the first screen, wherein the character on the first screen and the character on the second screen are different in at least one of form, state, and function, and for at least one of the character on the first screen and the character on the second screen, an animation imitating ears acts in response to an operation of the user.

29 Claims, 62 Drawing Sheets

(56) References Cited

U.S. PATENT DOCUMENTS

| | | | |
|---|---|---|---|
| 2015/0195397 A1* | 7/2015 | Rice | G06T 19/006 |
| | | | 345/619 |
| 2016/0005320 A1* | 1/2016 | deCharms | G09B 19/00 |
| | | | 434/236 |
| 2017/0048286 A1* | 2/2017 | Ichihashi | H04L 65/611 |
| 2018/0336714 A1* | 11/2018 | Stoyles | G06V 40/174 |
| 2021/0335055 A1* | 10/2021 | Scapel | G06F 3/0485 |
| 2022/0124140 A1 | 4/2022 | Okina et al. | |
| 2022/0392132 A1* | 12/2022 | Sepulveda | G06F 3/04842 |
| 2023/0315382 A1 | 10/2023 | Dai et al. | |

FOREIGN PATENT DOCUMENTS

| | | |
|---|---|---|
| CN | 112235530 A | 1/2021 |
| CN | 112866619 A | 5/2021 |
| CN | 112891944 A | 6/2021 |
| CN | 113632060 A | 11/2021 |
| CN | 113996062 A | 2/2022 |
| CN | 114679437 A | 6/2022 |
| CN | 114787759 A | 7/2022 |
| JP | 2004-078238 A | 3/2004 |
| JP | 2011-209787 A | 10/2011 |
| JP | 2015-038725 A | 2/2015 |
| WO | 2020/193269 A1 | 10/2020 |
| WO | 2020/203999 A1 | 10/2020 |
| WO | 2022/079933 A1 | 4/2022 |

\* cited by examiner

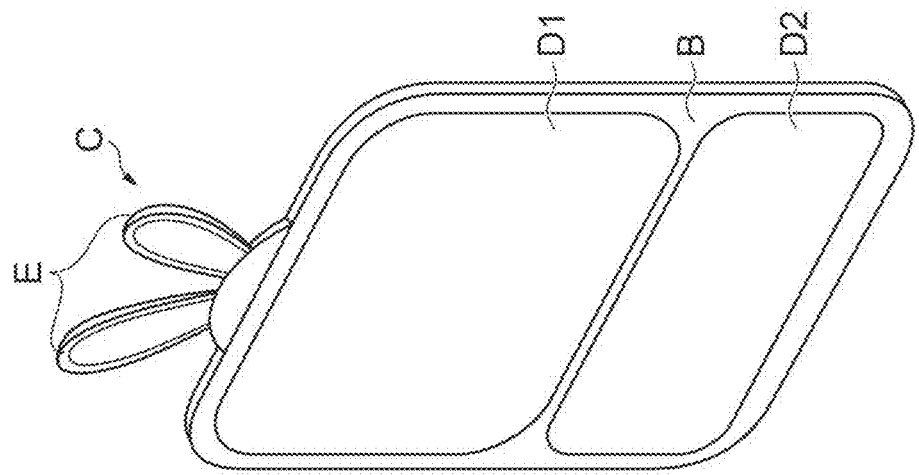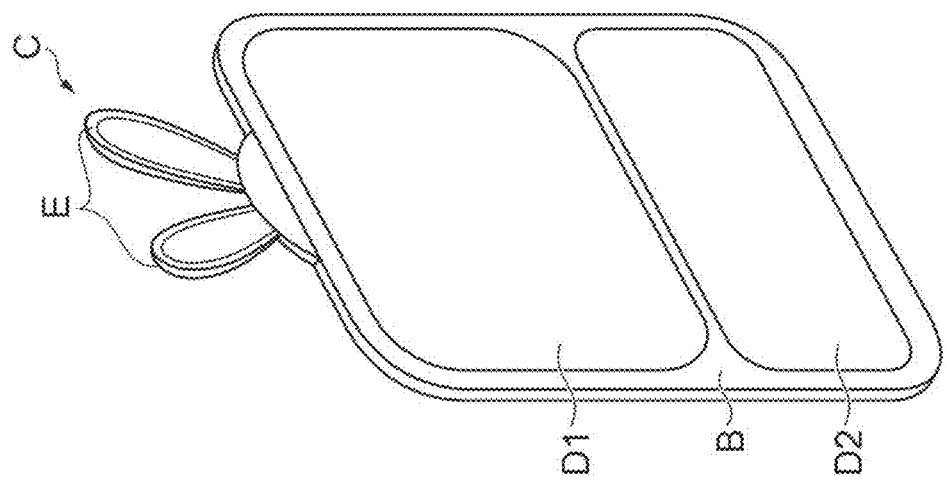
Fig.39

DISPLAY PROGRAM, DISPLAY METHOD AND DISPLAY SYSTEM

CROSS-REFERENCE TO RELATED APPLICATIONS

The present application is based on PCT filing PCT/JP2023/014534, filed on Apr. 10, 2023, which claims the priority to the Japanese Patent Application No. 2022-124758, filed on Aug. 4, 2022, the entire contents of each are incorporated herein by reference.

TECHNICAL FIELD

One aspect of the present disclosure relates to a display program, a display method, and a display system.

BACKGROUND ART

Japanese Unexamined Patent Application Publication No. 2015-38725 (Patent Literature 1) discloses an utterance animation generation device that generates a face image. The utterance animation generating device generates a visual element series by gradually performing speech recognition on audio signal by using a previously prepared acoustic model, language model, and table of correspondence between a plurality of phonemes and a plurality of visual elements. The utterance animation generation device further generates a mixed weighting for each of the plurality of visual elements by smoothing the visual element series, and generates a face image by mixing a plurality of face images corresponding to each of the plurality of visual elements in accordance with the mixed weighting for each of the plurality of visual elements.

CITATION LIST

Patent Literature

[Patent Literature 1] Japanese Unexamined Patent Application Publication No. 2015-38725

SUMMARY OF INVENTION

A display program according to an embodiment of the present disclosure is a display program for controlling display of an activity in a virtual space, the activity being performed using a character operable by a user, the display program causing a computer to execute: displaying a first screen including the character and content, the content being based on details of the activity; and causing the display to transition to a second screen in response to an operation related to an action of the character, the second screen being different from the first screen and including a character corresponding to the character on the first screen, wherein the character on the first screen and the character on the second screen are different in at least one of form, state, and function, and for at least one of the character on the first screen and the character on the second screen, an animation imitating ears acts in response to an operation of the user.

BRIEF DESCRIPTION OF DRAWINGS

FIG. 39 is a diagram showing an example of a screen displayed in the virtual space.

DESCRIPTION OF EMBODIMENTS

Figure 1:
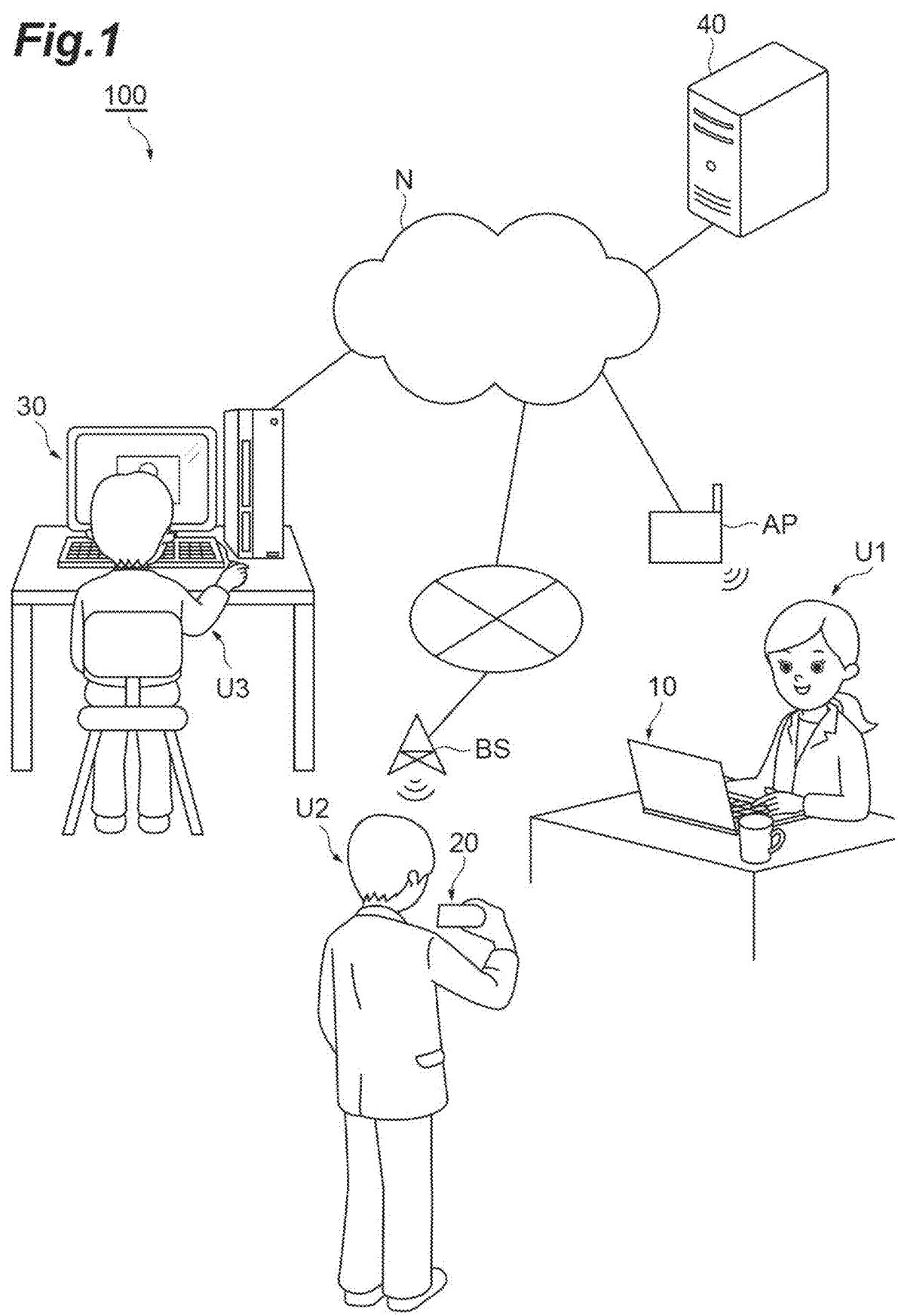
FIG. 1 is a diagram showing an example of a schematic configuration of a display system according to an embodiment.

Problems to be Solved by Present Disclosure

In recent years, services using characters such as avatars in a virtual space such as Metaverse have been provided. For such activities of characters in a virtual space, improvement in convenience for a user is required.

The present disclosure has an object to provide a display program, a display method, and a display system that can improve convenience for a user who uses a character when the character performs an activity in the virtual space.

Advantageous Effects of Present Disclosure

According to the present disclosure, in the case where a character performs an activity in the virtual space, it is possible to improve convenience for a user who uses the character.

Description of Embodiments of Present Disclosure

First, the details of embodiments of the present disclosure will be listed and explained. At least some of the embodiments described below may be arbitrarily combined.

(1) A display program according to an embodiment of the present disclosure is a display program for controlling display of an activity in a virtual space, the activity being performed using a character operable by a user, the display program causing a computer to execute: displaying a first screen including the character and content, the content being based on details of the activity; and causing the display to transition to a second screen in response to an operation related to an action of the character, the second screen being different from the first screen and including a character corresponding to the character on the first screen, wherein the character on the first screen and the character on the second screen are different in at least one of form, state, and function, and for at least one of the character on the first screen and the character on the second screen, an animation imitating ears acts in response to an operation of the user.

In the display program according to one aspect of the present disclosure, when an operation related to the action of the character is performed in a first screen including the character and the content based on the details of the activity, the display is transitioned to a second screen including a character corresponding to the character of the first screen in response to the operation. Therefore, in the display program, the screen transition can be performed in accordance with the action of the character which acts by the intentional operation of the user. That is, in the display program, the screen transitions in response to the intentional operation of the user. Therefore, in the display program, when the character performs the activity in the virtual space, the improvement of the convenience of the user who uses the character is achieved.

(2) In the display program according to (1), a plurality of display areas may be displayed in the virtual space, the character may be displayed in at least some of the plurality of display areas, each of the plurality of display areas in which the character is displayed may be divided in accordance with an attribute of the character, and a form of the character may be changed for each of the display areas. In this configuration, for example, in one display area, the size of the character of the leader explaining the content can be displayed in a large size. Therefore, the explanation and the like can be easily understood.

(3) In the display program according to (1) or (2), a plurality of display areas may be displayed in the virtual space, the character may be displayed in at least some of the plurality of display areas, and the plurality of display areas in which the character is displayed may include a display area in which output of audio of the character in the virtual space is limited and a display area capable of outputting audio of the character in a space. In this configuration, since output of the audio is automatically switched on and off in the display area, time and effort for performing the on/off operation can be omitted.

(4) In the display program according to (2) or (3), the character displayed in the display areas may be displayed in a distinguishable manner in accordance with an attribute of the user. In this configuration, the attribute of the user participating in the activity can be confirmed (grasped) at a glance.

(5) In the display program according to any one of (2) to (4), audio of the character displayed in one of the plurality of display areas and audio of the character displayed in another of the plurality of display areas may be configured not to be audible to each other. In this configuration, the character can have a conversation for each display area.

(6) In the display program according to any one of (2) to (5), upon receiving an operation of dragging and dropping the character from one of the plurality of display areas to another of the plurality of display areas on the first screen, display of the character may be in the one of the plurality of display areas and the other of the plurality of display areas on the second screen may be changed. In this configuration, the display of the character is changed by performing an operation involving the moving of the character, i.e., dragging and dropping the character. Therefore, it is possible to expect an effect of facilitating the feeling of participation and empathy for new scene switching in the moving time sensation and moving action of the character.

(7) In the display program according to any one of (1) to (6), upon receiving a predetermined operation from the user, a plurality of the characters may be displayed such that a front or back orientations are changed collectively. In this configuration, the orientation of the front or back of the plurality of characters can be easily changed.

(8) In the display program according to any one of (1) to (7), a display portion nay be displayed on part of the character on the second screen by at least one of a predetermined operation and audio input by the user on the first screen. This configuration enables the character to display the display portion. Therefore, in the display portion of the character, materials used for presentation of the character, translation of conversations of the character, and the like can be displayed.

(9) In the display program according to (8), the display portion nay display at least one of a conversation text converted into text from audio of the character, a translation of the conversation text, and a translation of details displayed in the display portion. This configuration enables communication between different languages.

(10) In the display program according to (8) or (9), the display portion may display at least one of a necessary drawing, a sentence, music, a moving image, a still image, and a website by using AI based on at least one of audio and a text input for the character. In this configuration, the explanation by the character can be more easily understood.

(11) In the display program according to (1), a display portion configured to display the content may be displayed in the virtual space. In this configuration, since the content is displayed in the display portion, the content is easily recognized.

(12) In the display program according to (11), the display portion may display input details input from the user. In this configuration, it is possible to display opinions and the like on the content.

(13) In the display program according to (11) or (12), upon receiving an operation of dragging and dropping the character to the display portion, a predetermined function may be implemented in the display portion. In this configuration, by performing an operation involving the moving of the character, such as dragging and dropping the character, it is possible to expect an effect of facilitating the moving time sensation of the character, feelings of participation in the moving operation, and empathy with new scene switching and the like.

(14) In the display program according to (13), after the character is dragged and dropped to the display portion, implementation of the predetermined function may be terminated upon receiving an operation of dragging and dropping the character displayed in the display portion to an area other than the display portion. In this configuration, the predetermined function can be terminated by a simple operation of dragging and dropping the character.

(15) In the display program according to any one of (11) to (14), upon receiving a predetermined operation on the display portion from the user, an operation screen may be displayed to operate display details in the display portion. In this configuration, the operation screen can be easily displayed by a predetermined operation by the user.

(16) In the display program according to any one of (11) to (15), the character may be changeable in size, and upon a change in a size of one of a plurality of the characters displayed in the virtual space, a size of another of the plurality of characters may be also changed in a similar manner. In this configuration, since the size of all characters is changed in the same manner, it is possible to realize an activity with a sense of unity in the virtual space.

(17) In the display program according to (1), a content display portion configured to display the content, a text display portion configured to display a conversation text converted into text from audio of the character, and at least two characters may be displayed in the virtual space. In this configuration, for example, in a case where the activity is counseling, the user can proceed with counseling while checking the content (consultation details or the like) which is the purpose of counseling and the details of the conversation.

(18) In the display program according to (17), upon receiving an operation on the conversation text displayed in the text display portion from the user, the conversation text may be displayed in the content display portion. In this configuration, for example, when the user clicks on the conversation text or drags and drops the conversation text, the conversation text is displayed in the content display portion. Thus, a new item generated in the conversation, an important item, or the like can be displayed in the content display portion. Therefore, the counseling can be made more effective.

(19) In the display program according to (17) or (18), the character may be changeable in layout and size, and upon a change in a layout or size of one of two characters among the plurality of characters displayed in the virtual space, a layout or size of another of the two characters may be also changed in accordance with the layout or size of the one of the two characters. In this configuration, since the layout or size of two characters is changed in accordance with the layout or size of one character, it is possible to realize an activity with a sense of unity in the virtual space.

(20) In the display program according to (11), one or more movable objects on which one or more characters are arranged may be displayed, the one or more movable objects being movably provided in the virtual space. In this configuration, the character can be placed on the movable object and moved in the virtual space. Accordingly it is possible to perform activities such as sightseeing and art gallery appreciation while carried on the movable object.

(21) In the display program according to (20), in a case where a plurality of the characters are arranged on each of a plurality of the movable objects, audio of the plurality of characters arranged on one of the plurality of movable objects and audio of the plurality of characters arranged on the other of the plurality of movable objects may be configured not to be audible to each other. In this configuration, the conversation can be held for each group of characters carried on the movable object.

(22) In the display program according to (11), a description of the content displayed in the display portion may be displayed. In this configuration, for example, when the activity is art gallery appreciation, the explanation of the painting as the content can be displayed.

(23) In the display program according to (11), the animation for the character may be output as editable video in the activity in the virtual space. In this configuration, after the activity is created as video, the animation can be edited.

(24) In the display program according to any one of (1) to (23), an image or video of a face of the user may be displayed on part of the character. In this configuration, when the face of the user needs to be displayed, the face can be displayed, for example, temporarily.

(25) In the display program according to any one of (1) to (24), one or more characters may be displayed in the virtual space, and at least one character among the one or more characters may be operated by AI. This configuration can be applied to a case where the AI is a user.

(26) In the display program according to (25), for the character operated by the AI, the animation imitating ears may act by an operation of the AI, a display portion corresponding to the character operated by the AI may be displayed, and the display portion may display at least one of text generated by the AI, a still image related to the text, a moving image related to the text, a sentence related to the text, and website information related to the text. In this configuration, the AI operates ear animation in accordance with the state and situation of the AI and the state and situation of a communication partner. In this way, by displaying ear animation, which is non-verbal information, more emotive communication can be realized than with text only communication. Further, since the information related to the text of the AI is displayed in the display portion, the explanation by the character (AI) or the like can be more easily understood.

(27) In the display program according to (25) or (26), the character may output audio corresponding to the text generated by the AI. In this configuration, the state of the AI and the like can be recognized by audio.

(28) In the display program according to any one of (1) to (27), the character may be made to rotate in accordance with a position of a predetermined object so as to give the impression of the character gazing at the predetermined object. In this configuration, the character is made to rotate so as to give the impression that the character is gazing at (focusing on) the predetermined object in response to the screen transition or a change in at least one or more of the form, state, and function of the character, and thus the impression is given that that the character is interested in the predetermined object. The rotation of the character produces a non-verbal communication effect similar to the change of the line of sight or the posture, and expresses a positive interest in the conversation. Therefore, rich communication can be achieved, such as improvement in the sense of reaction to the conversation and improvement in the sense of presence.

(29) A display method according to one aspect of the present disclosure is a display method for controlling display of an activity in a virtual space, the activity being performed using a character operable by a user, the display method comprising: displaying a first screen including the character and content, the content being based on details of the activity; and causing the display to transition to a second screen in response to an operation related to an action of the character, the second screen being different from the first screen and including a character corresponding to the character on the first screen, wherein the character on the first screen and the character on the second screen are different in at least one of form, state, and function, and, for at least one of the character on the first screen and the character on the second screen, an animation imitating ears acts in response to an operation of the user.

In the display method according to one aspect of the present disclosure, when an operation related to the action of the character is performed in the first screen including the character and content based on details of the activity, the display is transitioned to a second screen including a character corresponding to the character of the first screen in response to the operation. Therefore, in the display method, the screen transition can be performed in accordance with the action of the character which acts by the intentional operation of the user. That is, in the display method, the screen transitions in response to the intentional operation of the user. Therefore, in the display method, when the character performs the activity in the virtual space, the improvement of the convenience of the user who uses the character is achieved.

(30) A display system according to one aspect of the present disclosure is a display system for controlling display of an activity in a virtual space, the activity being performed using a character operable by a user, wherein a first screen is displayed, the first screen including the character and content, the content being based on details of the activity, the display is caused to transition to a second screen in response to an operation related to an action of the character, the second screen being different from the first screen and including a character corresponding to the character on the first screen, the character on the first screen and the character on the second screen are different in at least one of form, state, and function, and, for at least one of the character on the first screen and the character on the second screen, an animation imitating ears acts in response to an operation of the user.

In the display system according to one aspect of the present disclosure, when an operation related to the action of the character is performed in the first screen including the character and content based on details of the activity, the display is transitioned to the second screen including a character corresponding to the character of the first screen in response to the operation. Therefore, in the display system, the screen transition can be performed in accordance with the action of the character which acts by the intentional operation of the user. That is, in the display system, the screen transitions in accordance with the intentional operation of the user. Therefore, in the display system, when the character performs the activity in the virtual space, the improvement of the convenience of the user who uses the character is achieved.

Details of Embodiments of Present Disclosure

Specific examples of embodiments of the present disclosure are described below with reference to the drawings. The present invention is not limited to these examples, but is defined by the scope of the claims, and it is intended that the present invention includes all modifications within the meaning and scope equivalent to the scope of the claims. In the description of the drawings, the same elements are denoted by the same reference numerals, and redundant description will be omitted.

FIG. 1 is a diagram showing an example of a schematic configuration of a display system (hereinafter, also simply referred to as a "system"). A system 100 is a computer system that supports activity in a virtual space R (see FIG. 7) using a character C that is operable by users U1, U2, and U3 (see pattern A in FIG. 5) and in which an ear animation E (see pattern A in FIG. 5) acts in response to the operation by users U1, U2, and U3.

Character C indicates users U1, U2, and U3. Character C is a dynamic character. Character C is generated by an image material independent of actual images (captured data and the like) of users U1, U2, and U3. The image material is a material for generating an animation character. Character C may be drawn by two dimensional or three dimensional computer graphics (CG).

As an example, character C is configured to include a body B (see the pattern A in FIG. 5) and ear animation E. In character C, body B and ear animation E are integrally displayed. The integral display means that body B and ear animation E are visually recognized as one unit when character C is viewed. That is, it is sufficient that what is integrally displayed is a state in which it is possible to recognize at a glance that body B and ear animation E are connected (correspond). Therefore, what is integrally displayed may be a state in which body B and ear animation E are in contact with each other or a state in which body B and ear animation E are separated from each other.

Body B may include at least one of an image indicating user and a text indicating user. A shadow may be displayed on character C. Body B has a spherical shape and may include text ("A", "B", "C") that can identify the user. Character C may be configured to include utterance animation (not shown in the diagram) or may be configured to include animation that imitates an arm, a foot, or the like.

Ear animation E is an animation representing non-verbal information. Ear animation E is an animation indicating the state (action) and emotion of the user. Ear animation E is an animation representing the state of the user in a form different from the actual motion part of the user. Ear animation F may not include a dynamically changing face expression or may include a dynamically changing face expression. Ear animation E is displayed outside the display area of body B so as to protrude from the display area. Ear animation E is an animation imitating ears of an animal (for example, a rabbit), and acts in accordance with a change in the state of the user. Ear animation E acts in response to the user's operation. Ear animation E performs acts such as, for example, expansion, contraction, bending, and swinging. Ear animation E is deformable, and visually deforms to give an impression of the states of users U1, U2, and U3 in accordance with the states of users U1, U2, and U3.

In system 100, the states, emotions, reactions, and the like of users U1, U2, and U3 can be confined by ear animation E of character C.

<Configuration of System>

System 100 includes a terminal 10, a terminal 20, and a terminal 30. In the example shown in FIG. 1, terminal 10 is a laptop personal computer (PC) used by user U1. Terminal 20 is a mobile phone (smartphone or the like) used by user U2. Terminal 30 is a desktop PC used by user U3. Terminal 10, terminal 20, and terminal 30 are connectable to a network N. In this example, terminal 10 is connected to network N via an access point AP, terminal 20 is connected to network N via a base station BS, and terminal 30 is connected to network N by wire (not shown). As terminal 10, terminal 20, and terminal 30, in addition to the above-described PC and mobile phone, a tablet terminal, a wearable terminal, a head mounted display (1-MD) terminal, and other various terminals may be used. The number of terminals included in system 100 is not limited to the example of FIG. 1.

System 100 includes a server 40. Server 40 is connected to network N. Therefore, terminal 10, terminal 20, terminal 30, and server 40 can communicate with each other via network N. The number of servers included in system 100 is not limited to the example of FIG. 1.

The configuration of network N is not limited. For example, network N may be configured to include the Internet (public network), a communication carrier network, a business operator network, and the like.

Figure 2:
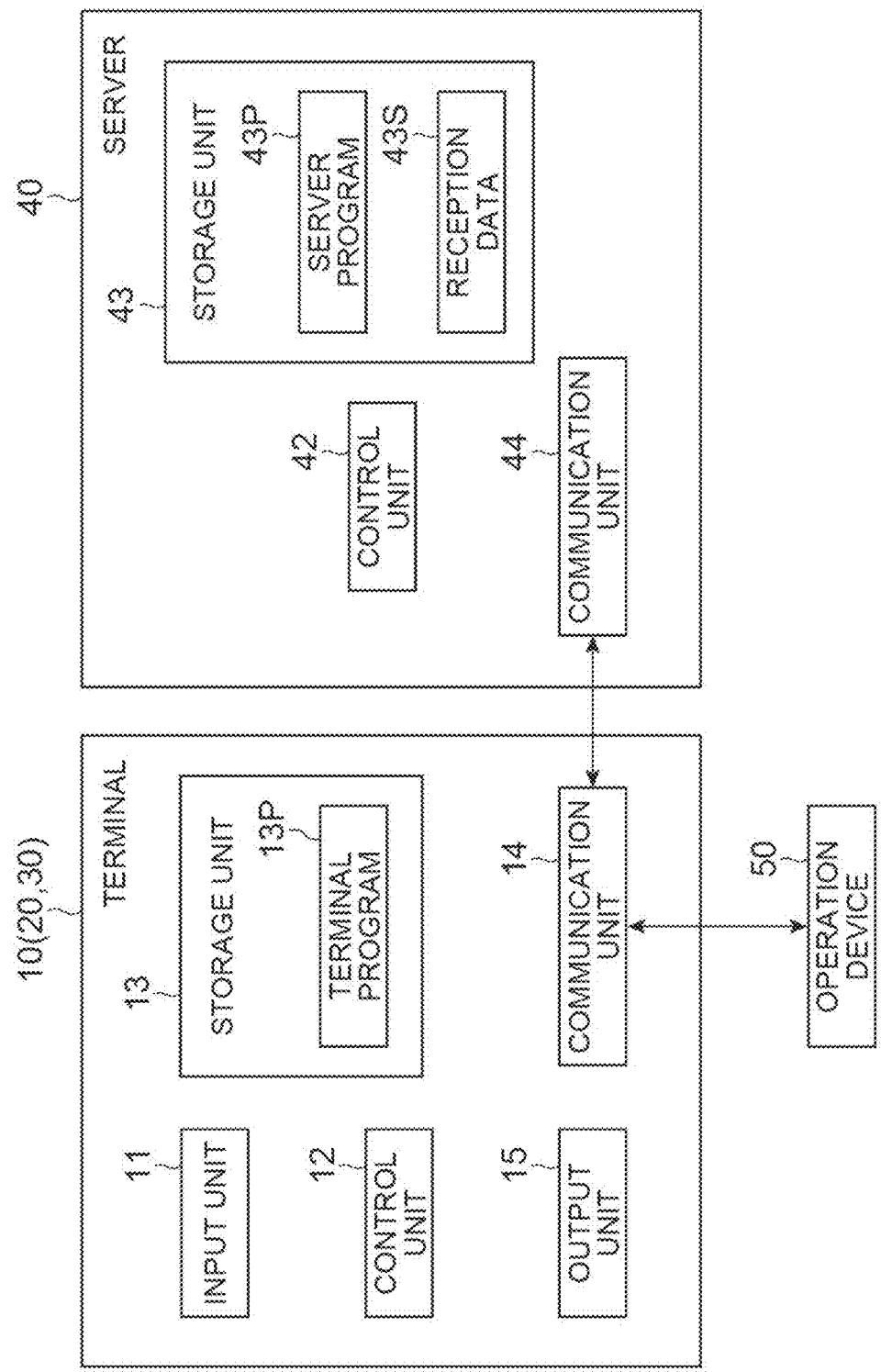
FIG. 2 is a diagram showing an example of functional blocks of a terminal and a server.

FIG. 2 is a diagram showing an example of functional blocks of terminal 10, terminal 20, terminal 30, and server 40. The functional blocks of terminal 20 and terminal 30 are the same as the functional blocks of terminal 10, and therefore terminal 10 and server 40 will be described below. First, terminal 10 will be described, and then server 40 will be described.

<Configuration of Terminal>

Terminal 10 includes an input unit 11. Input unit 11 is a part to which audio data and image data of user U1 are input. Input unit 11 may be input with video data of user U1. The video includes audio data and image data of user U1.

Terminal 10 includes a control unit 12. Control unit 12 is a part that generates control data of user U1. The control data of user U1 is generated based on the operation data output from an operation device 50. In the embodiment, for example, data for causing ear animation E of character C to perform six actions of "nodding", "agreeing", "praising (clapping)", "questioning", "raising hand", and "showing surprise" can be generated as the control data. Control unit 12 may generate control data for other operations (for example, actions indicating "YES" and "NO").

The control data is associated with the action data. In the embodiment, for example, the action data is associated with each of the control data of "nodding", "agreeing", "praising (clapping)", "questioning", "raising hand", and "showing surprise". The action data is data transmitted from operation device 50. Control unit 12 generates the control data when the action data corresponds to the control data.

The control data may be generated based on the audio data and the image data of user U1 input into input unit 11. The image data is composed of a plurality of continuous unit frames. The unit frame usually includes image information of user UL. For example, image data of 60 frames/second includes 60 unit frames per second. The generation of the control data by control unit 12 will be described in detail later.

Control unit 12 is also a part for controlling the operation of character C based on the control data. Control unit 12 displays character C in virtual space R and controls the action of ear animation E of character C based on the generated control data and the received control data.

Control unit 12 generates video data of virtual space R. The video data of virtual space R includes video data of character C controlled based on the control data. In addition, various objects appearing in virtual space R may be included in the video data of virtual space R. The method for generating virtual space R by control unit 12 is not particularly limited, and various known methods can be used. Control unit 12 may generate video data of virtual space R based on, for example, an image captured by a camera. Alternatively, control unit 12 may generate video data of virtual space R based on the three-dimensional CAD data.

Terminal 10 includes a storage unit 13. Storage unit 13 is a part for storing information necessary for control (processing) of terminal 10. In FIG. 2, a terminal program 13P is exemplified as information stored in storage unit 13. Terminal program 13P is a program for operating terminal 10, and operates the computer so that control unit 12 performs control and the like. Since system 100 is a display system, terminal program 13P can also be called a display program.

Terminal 10 includes a communication unit 14. Communication unit 14 is a part that communicates with external devices located outside terminal 10 via network N (see FIG. 1). Examples of the external devices located outside terminal 10 include terminal 20, terminal 30, server 40, and operation device 50. Communication unit 14 transmits audio data and control data generated by control unit 12 to server 40, and receives audio data and control data from server 40. Communication unit 14 is a part that communicates with operation device 50. Communication unit 14 receives the action data from operation device 50.

Terminal 10 includes an output unit 15. Output unit 15 outputs the video of virtual space R. The video of virtual space R is the video based on the video data of virtual space R generated by control unit 12.

<Configuration of Server>

Figure 3:
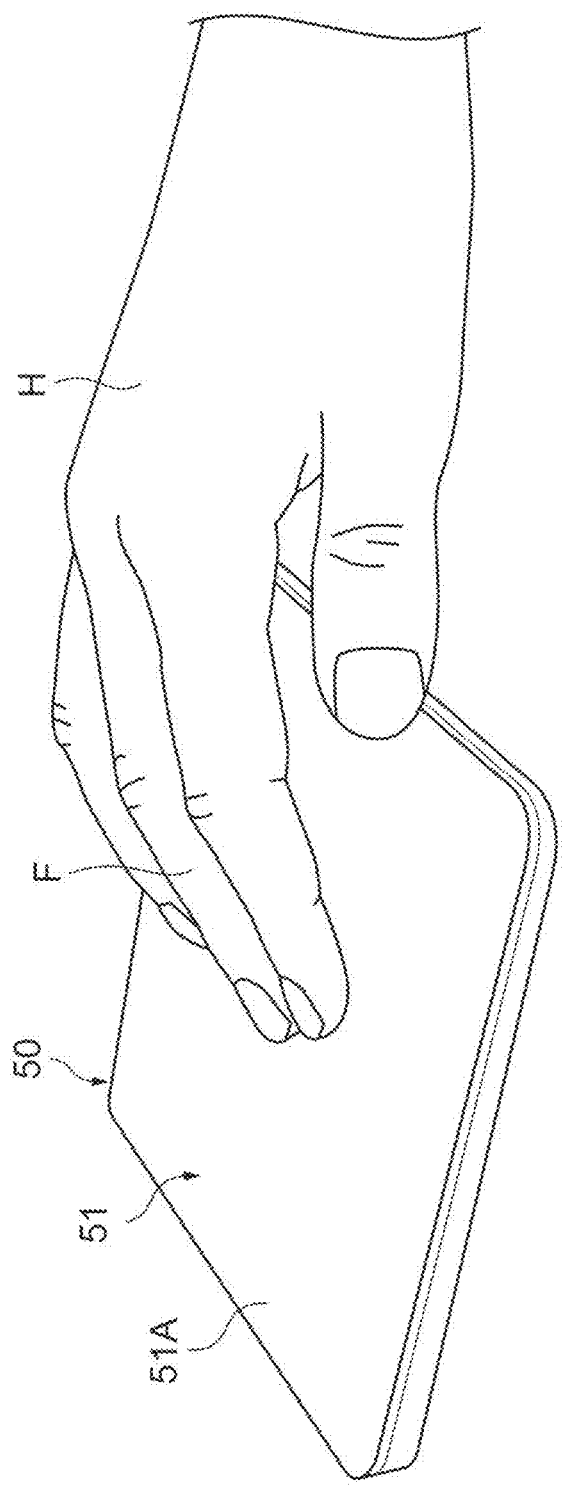
FIG. 3 is a perspective view of an operation device.

Server 40 includes a control unit 42. Control unit 42 controls the operation of server 40. Server 40 includes a storage unit 43. Storage unit 43 is a part for storing information necessary for controlling server 40. In FIG. 3, a server program 43P and a reception data 43S are exemplified as information stored in storage unit 43. Server program 43P is a program for operating server 40, and operates the computer so that control and the like by control unit 42 are executed. Reception data 43S is data transmitted from terminal 10, terminal 20, and terminal 30 to server 40, and may include control data generated by terminal 10, terminal 20, and terminal 30.

Server 40 includes a communication unit 44. Communication unit 44 is a part that communicates with external devices located outside server 40 via network N (see FIG. 1). Examples of the external devices located outside server 40 are terminal 10, terminal 20, and terminal 30. Communication unit 44 receives control data of user U1, control data of user U2, and control data of user U3 from terminal 10, terminal 20, and terminal 30, respectively, and transmits control data generated by terminal 10, terminal 20, and terminal 30 to terminal 10, terminal 20, and terminal 30, respectively.

<Hardware Configuration>

An example of a hardware configuration of each functional part of terminal 10 and server 40 will be described. Communication unit 44 of server 40 may be configured with a network card or a wireless communication device so as to be able to access network N. Control unit 42 of server 40 may be configured with a processor such as a central processing unit (CPU) or a graphics processing unit (GPU), a clock, and an internal memory. Control unit 42 may be configured as one piece of hardware (SoC: System on a Chip) in which a processor, a clock, an internal memory, storage unit 43, and communication unit 44 are integrated. Control unit 42 operates based on server program 43P, thereby operating the server computer as server 40. Storage unit 43 of server 40 may be configured with a nonvolatile storage medium such as a flash memory, a hard disk, or a solid state disk (SSD).

Input unit 11 of terminal 10 may be configured with a microphone, a camera, or the like. The audio of user U1 is acquired by the microphone. That is, the microphone is a kind of audio sensor that acquires audio. An image of user U1 is acquired by the camera. That is, the camera is a kind of image sensor that acquires an image. Furthermore, input unit 11 may be configured with an operation device such as a keyboard, a mouse, or a touch panel. Control unit 12 of terminal 10 may be configured in the same manner as control unit 42 of server 40. Control unit 12 operates based on terminal program 13P, thereby operating the general-purpose computer as terminal 10. Storage unit 13 of terminal 10 may be configured in the same manner as storage unit 43 of server 40. Communication unit 14 of terminal 10 may be configured in the same manner as communication unit 44 of server 40. Output unit 15 of terminal 10 may be configured with a display device such as a liquid crystal panel, an organic EL panel, or the like (or a touch panel). Further, output unit 15 may be configured with a speaker.

<Configuration of Operation Device>

FIG. 3 is a perspective view of operation device 50. FIG. 3 is a diagram showing a state in which operation device 50 is operated by fingers F of users U1, U2, and U3. Operation device 50 is a device operated by users U1, U2, and U3. Ear animation E acts in response to the operation of operation device 50 by users U1, U2, and U3. Operation device 50 is a touch pad. As a method of the touch pad, a capacitance method, a pressure sensitive touch method, an ultrasonic method, or the like can be adopted.

Operation device 50 includes a main body 51 as a hardware configuration. Main body 51 has an operation surface 51A. Operation device 50 is operated by finger F of a hand H of each of users U1, U2, and U3. Operation device 50 may be provided as a single unit or may be provided as a part of a remote controller for operating a television display or the like. That is, operation device 50 may be a part of the apparatus.

Figure 4:
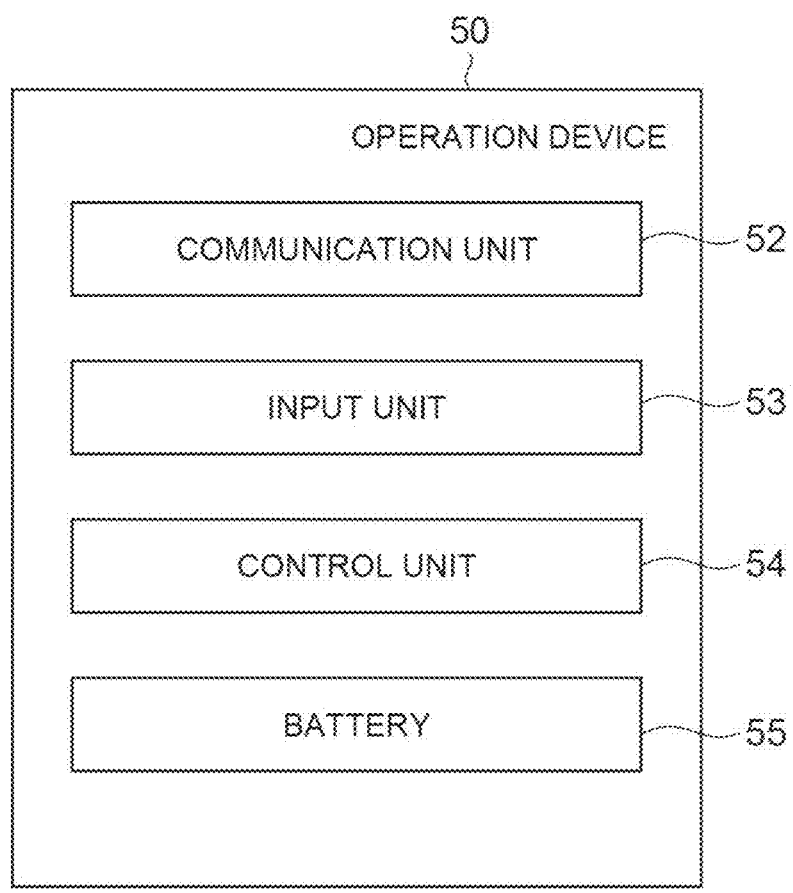
FIG. 4 is a diagram showing an example of functional blocks of the operation device shown in FIG. 4.

FIG. 4 is a diagram showing an example of functional blocks of operation device 50. As shown in FIG. 4, operation device 50 includes a communication unit 52. Communication unit 52 is a unit that communicates with an external device by wireless communication or wired communication. The wireless communication is, for example, LAN, Bluetooth (registered trademark), Wifi, or the like. Examples of the external device are terminal 10, terminal 20, and terminal 30. Communication unit 52 transmits the action data output from a control unit 54 to terminal 10, terminal 20, and terminal 30.

Operation device 50 includes an input unit 53. Input unit 53 is a part for inputting operations of users U1, U2, and U3 in operation surface 51A. Input unit 53 detects an operation (gesture) of operation surface 51A by users U1, U2, and U3. Examples of the operation include clicking, tapping, sliding, and scrolling. Input unit 53 outputs the operation signal to control unit 54.

Operation device 50 includes control unit 54. Control unit 54 generates action data based on the operation signal of input unit 53. Control unit 54 outputs the action data to communication unit 52.

Control unit 54 may be configured with a processor such as a central processing unit (CPU) or a graphics processing unit (GPU), a clock, and an internal memory. Control unit 54 may be configured as one piece of hardware (SoC: System on a Chip) in which a processor, a clock, an internal memory, and communication unit 52 are integrated.

Operation device 50 includes a battery 55. Battery 55 supplies power to each unit of operation device 50.

Next, the operation of operation device 50 by users U1, U2, and U3 when ear animation E of character C is activated as, for example, "nodding", "agreeing", "praising (clapping)", "questioning", "raising hand", and "showing surprise" will be described. That is, the relationship between the action of ear animation E of character C and the motions of users U1, U2, and U3 detected by operation device 50 will be described. The action of ear animation E is similar to (related to) the operation of finger F of users U1, U2, and U3 for operating ear animation E. For example, when ear animation E of "nodding" is operated, an operation similar to a nodding action is performed by finger F on operation surface 51A of operation device 50. That is, users U1, U2, and U3 can operate ear animation E by performing an operation similar to ear animation E to be operated in operation device 50.

Figure 5:
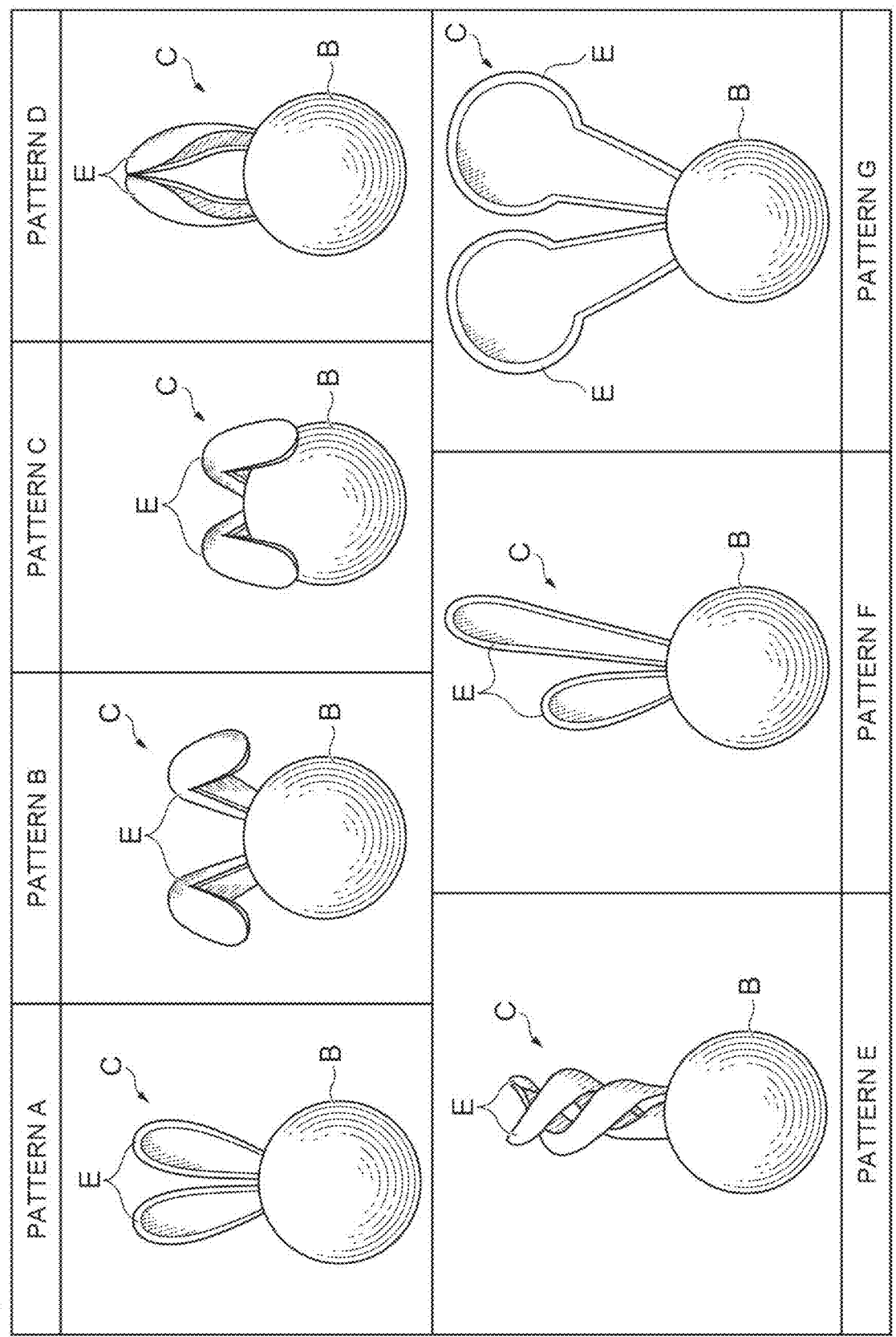
FIG. 5 is a diagram showing an example of an operation of an ear animation.

FIG. 5 is a diagram showing an example of the action of ear animation E. In the pattern A of FIG. 5, the normal state of ear animation E is shown.

In the pattern B of FIG. 5, the action of "nodding" in ear animation E is shown. As shown in pattern B of FIG. 5, in the action of "nodding", the upper half of the ears are folded forward in ear animation E of character C. When ear animation E is caused to execute the operation of "nodding", users U1, U2, and U3 touch operation surface 51A of main body 51 of operation device 50 with two fingers F (for example, an index finger and a middle finger). Alternatively, users U1, U2, and U3 slide two fingers F in a state where two fingers F touch operation surface 51A. The amount of sliding of finger F is, for example, 1 cm to 2 cm.

When the operation is performed, operation device 50 detects the operation by input unit 53 and transmits the operation to terminals 10, 20, and 30 as action data. Control unit 12 of terminals 10, 20, and 30 generates control data for causing ear animation E to act as "nodding" based on the action data.

In the pattern C of FIG. 5, the operation of "agreeing" in ear animation E is shown. In the action of "agreeing", the ears are entirely folded forward in ear animation E of character C. When ear animation E is caused to execute the operation of "agreeing", users U1, U2, and U3 slide two fingers F (for example, an index finger and a middle finger) in a state where two fingers F touch operation surface 51A. The amount of sliding of finger F is, for example, longer than 2 cm, and is, for example, 3 cm to 4 cm. That is, when ear animation E is caused to execute the action of "agreeing", users U1, U2, and U3 make the sliding amount of finger F longer than that when ear animation E is caused to execute the action of "nodding".

When the operation is performed, operation device 50 detects the operation by input unit 53 and transmits the operation to terminals 10, 20, and 30 as action data. Control unit 12 of terminals 10, 20, and 30 generates control data for operating ear animation E as "agreeing" based on the action data.

In the pattern D of FIG. 5, the operation of "clapping (praising)" in ear animation E is shown. In the action of "clapping (praising)", the ears approach and separate in ear animation E of character C. When the action of "clapping (praising)" is executed by ear animation E, users U1, U2, and U3 bring two fingers F close to (into contact with) each other or separate two fingers F from each other in a state where two fingers F (for example, a parent finger and an index finger or an index finger and a middle finger) touch operation surface 51A.

When the operation is performed, operation device 50 detects the operation with input unit 53 and transmits the operation to terminals 10, 20, and 30 as action data. Control units 12 of terminals 10, 20, and 30 generate control data for operating ear animation E as "clapping" based on the action data. Control units 12 of terminals 10, 20, and 30 may generate control data so as to clap a plurality of times with respect to the action data related to one operation of moving two fingers F closer to each other and away from each other.

In the pattern E of FIG. 5, the operation of "questioning" in ear animation E is shown. In the action of "questioning", the ears are entangled in ear animation E of character C. When the action of "questioning" is executed by ear animation E, users U1, U2, and U3 slide fingers F so as to draw a circle (semicircle) in a state where two fingers F (for example, an index finger and a middle finger) touch operation surface 51A. Note that, when ear animation E is caused to execute the operation of "questioning", users U1, U2, and U3 may slide fingers F to draw ∞ (infinity) in a state where two fingers F (for example, an index finger and a middle finger) touch operation surface 51A.

When the operation is performed, operation device 50 detects the operation with input unit 53 and transmits the operation to terminals 10, 20, and 30 as action data. Control unit 12 of terminals 10, 20, and 30 generates control data for operating ear animation E as "questioning" based on the action data.

In the pattern F of FIG. 5, the action of "raising hand" in ear animation E is shown. In the action of "raising hand", an ear is extended in ear animation E of character C. When the action of "raising hand" is executed by ear animation E, users U1, U2, and U3 slide only one finger F (middle finger) upward in a state where two fingers F (for example, an index finger and a middle finger) touch operation surface 51A.

When the operation is performed, operation device 50 detects the operation with input unit 53 and transmits the operation to terminals 10, 20, and 30 as action data. Control units 12 of terminals 10, 20, and 30 generate control data for operating ear animation E as "raising hand" based on the action data.

In the pattern G of FIG. 5, the action of "showing surprise" in ear animation E is shown. In the action of "showing surprise", the tips of the ears enlarge in ear animation E of character C. At this time, body B of character C bends backward. When ear animation E is caused to execute the action of "showing surprise", users U1, U2, and U3 slide two fingers F (for example, an index finger and a middle finger) upward and separate two fingers F from each other in a state where two fingers F touch operation surface 51A.

When the operation is performed, operation device 50 detects the operation with input unit 53 and transmits the operation to terminals 10, 20, and 30 as action data. Control units 12 of terminals 10, 20, and 30 generate control data for causing ear animation E to act as "showing surprise" based on the action data.

<Method of Operating Action of Ear Animation>

Next, the method of operating the action of ear animation E of character C will be described. When ear animation E is operated, users U1, U2, and U3 perform an operation corresponding to, for example, any one of the pattern B of FIG. 5, the pattern C of FIG. 5, the pattern D of FIG. 5, the pattern E of FIG. 5, the pattern F of FIG. 5, and the pattern G of FIG. 5. Thus, the action data is generated in operation device 50. Operation device 50 transmits the action data to terminals 10, 20, and 30.

Upon receiving the action data, terminals 10, 20, and 30 generate control data corresponding to the action data. As a result, in virtual space R of terminals 10, 20, and 30, ear animation E of character C acts any one of the actions of "nodding", "agreeing", "praising (clapping)", "questioning", "raising hand", and "showing surprise". In this way, the actions of ear animation E of character C are operated according to operation of operation device 50 by users U1, U2, and U3.

<Activity in Virtual Space>

Next, the activity of character C in virtual space R displayed based on the video data generated by control unit 12 will be described. In virtual space R, the activity of character C is performed. In virtual space R, characters C (users U1, U2, and U3) can have a conversation or communicate with each other. In virtual space R, character C and the content based on the details of the activity of character C are displayed. In virtual space R, the screen transitions based on the action of character C. That is, a computer is caused to execute displaying a first screen including character C and content, the content being based on details of the activity and causing the display to transition to a second screen which is different from the first screen in response to an action of the character in the activity in a virtual space.

Figure 6:
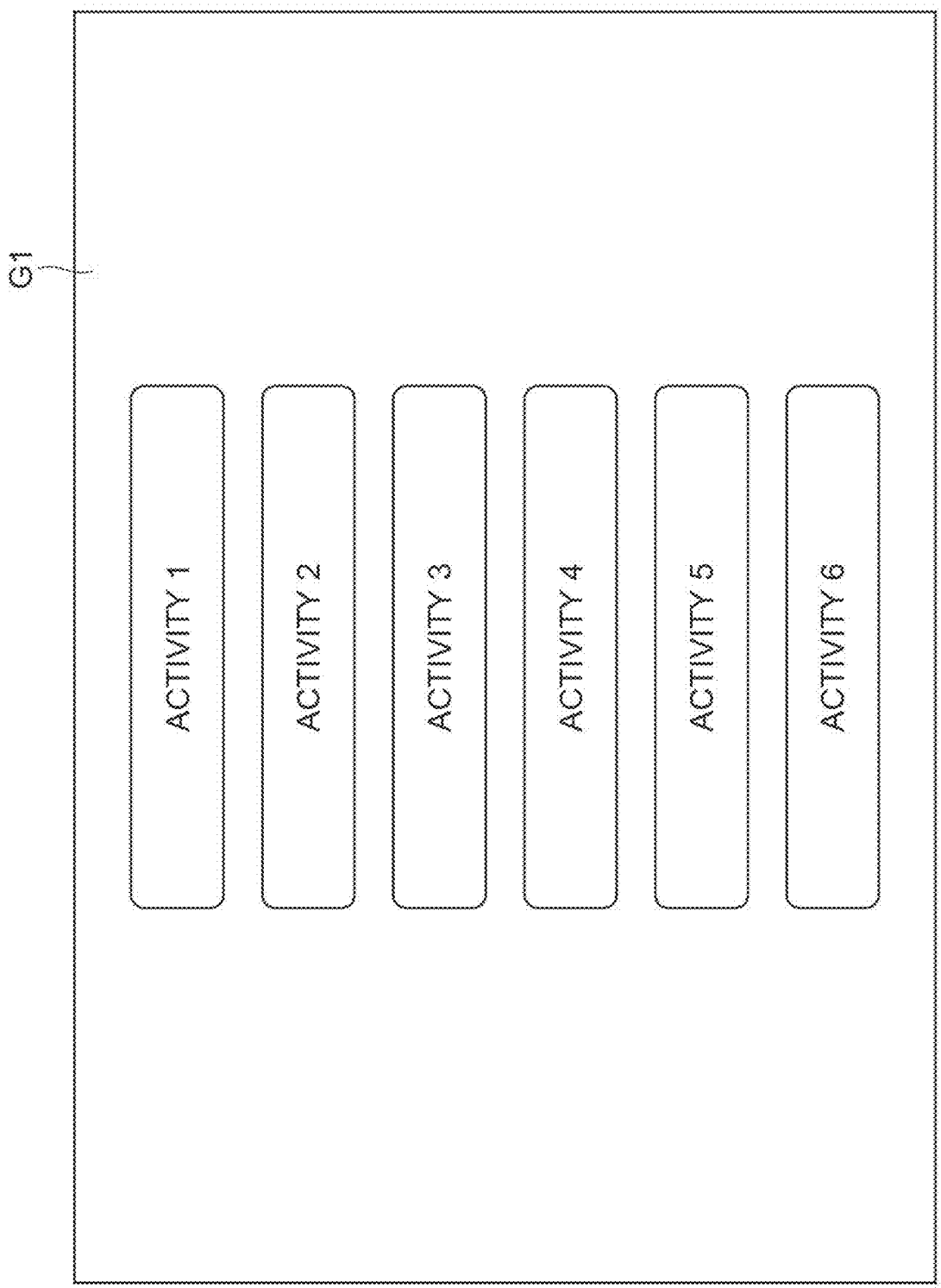
FIG. 6 is a diagram showing an example of an activity selection screen.

Details of character C in virtual space R include, for example, lectures, addresses, training, conferences, report meetings, counseling, consultations, entertainment, sightseeing, video creation, and the like. In system 100, application software (software) may be prepared for each detail, or a plurality of details may be included in one application software. When a plurality of details are included in one application software, a screen for selecting an activity may be displayed on output units 15 of terminals 10, 20, and 30. For example, as shown in FIG. 6, selection buttons are displayed for each of a plurality of activities (activity 1, activity 2, activity 3, activity 4, activity 5, and activity 6) on a selection screen G1. The activity 1, the activity 2, the activity 3, the activity 4, the activity 5, and the activity 6 correspond to each activity described later.

(Activity 1)

Figure 7:
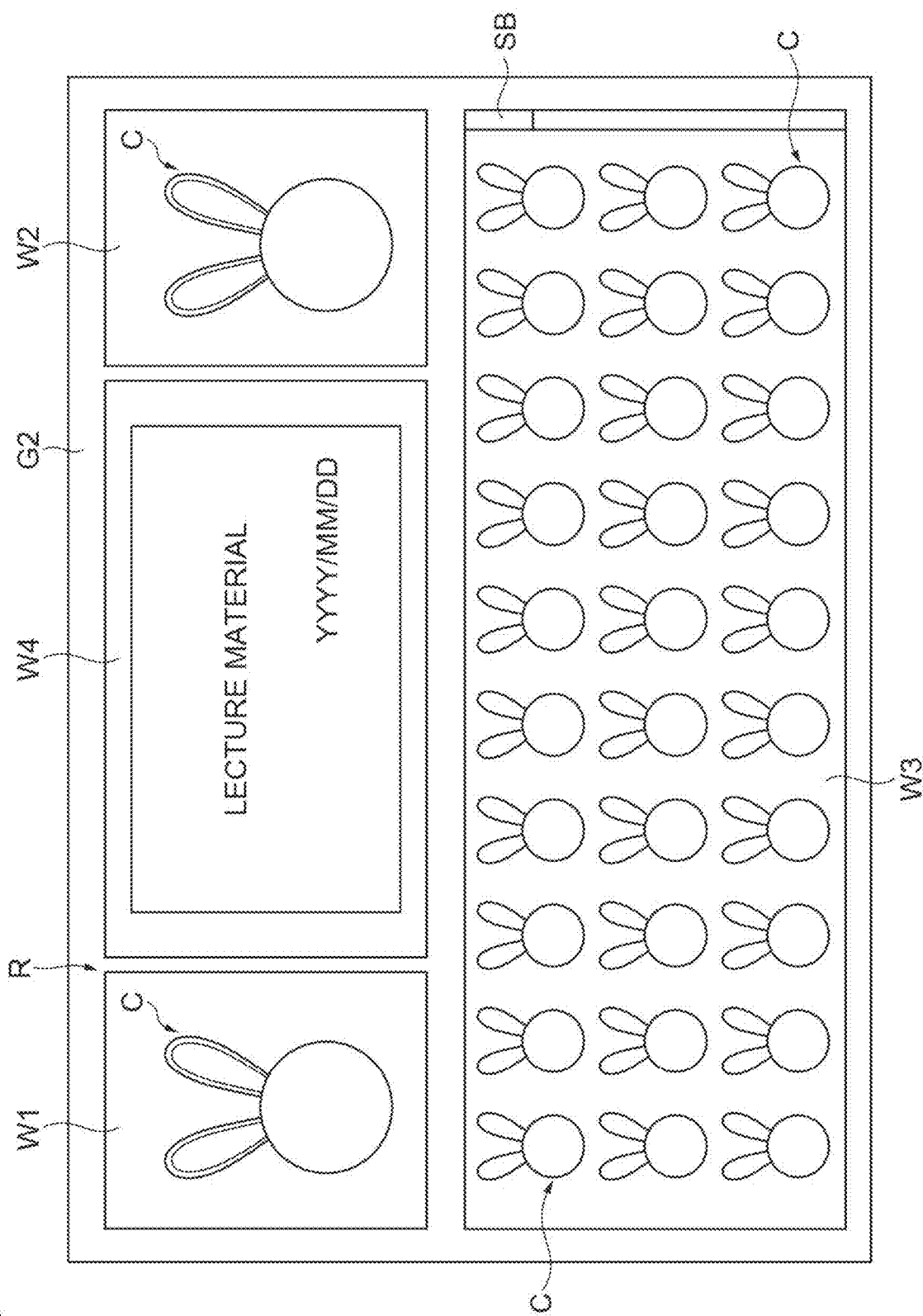
FIG. 7 is a diagram showing an example of a screen displayed in a virtual space.

The activity 1 is a lecture, a training meeting, an address meeting, or the like. Hereinafter, the lecture will be described as an example. In the lecture, character C of professors (teachers, instructors) and students (pupils) can participate. As shown in FIG. 7, a moderator window (display area) W1, a presenter window (display area) W2, a participant window (display area) W3, and a material window (display area) W4 are displayed on a screen G2 on which the video of virtual space R of the lecture is displayed.

In moderator window W1, character C, which is the moderator of the lecture, is displayed. Moderator window W1 is displayed, for example, in the upper right portion of screen G2. In the lecture, a professor may correspond to a moderator (leader). In moderator window W1, character C is displayed so as to face the front. That is, character C of moderator window W1 is displayed so as to face users U1, U2, and U3 of terminals 10, 20, and 30. In moderator window W1, camera videos (images) of users U1, U2, and U3 serving as moderators may be displayed. Users U1, U2, and U3 can switch between the display of character C and the display of the camera video.

Presenter window W2 displays character C as a presenter. Presenter window W2 is displayed, for example, in the upper left portion of screen G2. In the lecture, a professor or a student may correspond to the presenter (leader). That is, in the lecture, the professor can be both the moderator and the presenter. In presenter window W2, character C is displayed so as to face the front. In presenter window W2, camera videos (images) of users U1, U2, and U3 serving as the presenters may be displayed. Users U1, U2, and U3 can switch between the display of character C and the display of the camera video.

In participant window W3, characters C, participants of the lecture, are displayed. Participant window W3 is displayed, for example, in the lower portion of screen G2 (the lower portion of moderator window W1 and presenter window W2). In the lecture, the students may correspond to the participants. The seat (position) of character C in participant window W3 may be a reserved seat or a non-reserved seat. The seat of character C may be allocated in the order of entry into participant window W3 based on a predetermined pattern.

In participant window W3, characters C are displayed so as to face the back. In terminals 10, 20, and 30 of the moderator and the presenter, characters C of participant window W3 may be displayed so as to face the front. The audio of character C displayed in participant window W3 is turned off. That is, the output of the audio of character C displayed in participant window W3 in virtual space R is restricted. This can prevent the progress of the professor from being hindered by the audio of the student, for example. The audio of character C may be the audio of users U1, U2, and U3, or may be the audio of users U1, U2, and U3 converted (voice-changed). That is, the audio player may have an audio change function. The orientation of the front or back of the plurality of characters C may be collectively changed and displayed upon receiving predetermined operations from users U1, U2, and U3.

When the number of characters C displayed is large (when the number of students participating is large), a scroll bar SB is displayed in participant window W3. By operating scroll bar SB, character C of all the students who participate can be confirmed in participant window W3.

Identification information may be displayed in character C displayed in participant window W3. The identification information may be, for example, a student number, a name, initials or the like. Characters C of participant window W3 are displayed in smaller size than character C of moderator window W1 and presenter window W2. In other words, characters C of moderator window W1 and presenter window W2 are displayed larger than character C of participant window W3.

Material window W4 displays materials and the like. The materials and the like is a content based on the details of the activity of character C. That is, the materials and the like displayed in material window W4 in the lecture show details (content) of the lecture in the activity of character C of participating in the lecture. Material window W4 is displayed, for example, in the center of the upper portion of screen G2 (between moderator window W1 and presenter window W2).

The moderator and the presenter can operate material window W4. The moderator and the presenter can operate the display details to be displayed in material window W4 on the predetermined operation screen. The operation screen is displayed on output unit 15 of the moderator or the presenter, for example, when the moderator or the presenter taps (clicks) material window W4. On the operation screen, materials (text data, image data, presentation data and the like) can be displayed in material window W4, and the displayed materials and boards can be input by handwriting.

The layout and size of moderator window W1, presenter window W2, participant window W3, and material window W4 are arbitrarily configurable by the administrator. The administrator is, for example, a lecturer in the case of lecture.

Figure 8:
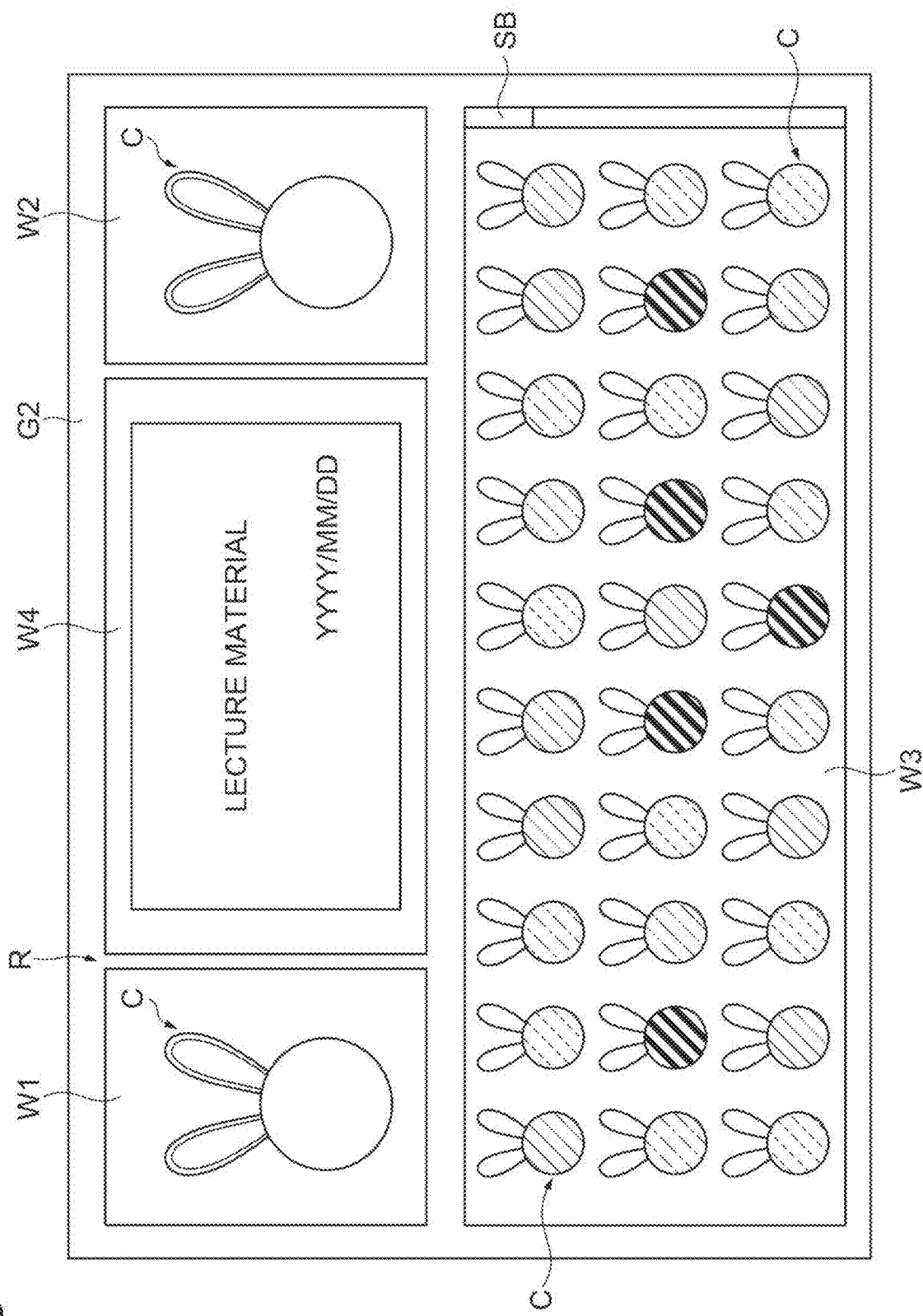
FIG. 8 is a diagram showing an example of a screen displayed in the virtual space.

As shown in FIG. 8, in participant window W3, character C may be displayed so as to be distinguishable by the attributes of the participants (users U1, U2, and U3). This allows the attributes of users U1, U2, and U3 participating in the activity to be confirmed (grasped) at a glance. In the example shown in FIG. 8, character C is classified into five attributes. Specifically, for example, the attributes can be distinguished by the type of hatching. The line type is, for example, a solid line (thin line), a solid line (thick line), a dashed line, a one dot chain line, or a two dot chain line. The attribute may be, for example, a faculty, a department, or the like in the case of lecture. Specifically, for example, the department is a literature department, an engineering department, a physics department, or the like. The attribute is set based on information of users U1, U2, and U3 set in advance. In the example shown in FIG. 8, the attributes of users U1, U2, and U3 of character C are indicated by the type of hatching line so as to be distinguishable, but the attributes of users U1, U2, and U3 of character C may be indicated by the type of color.

Figure 9:
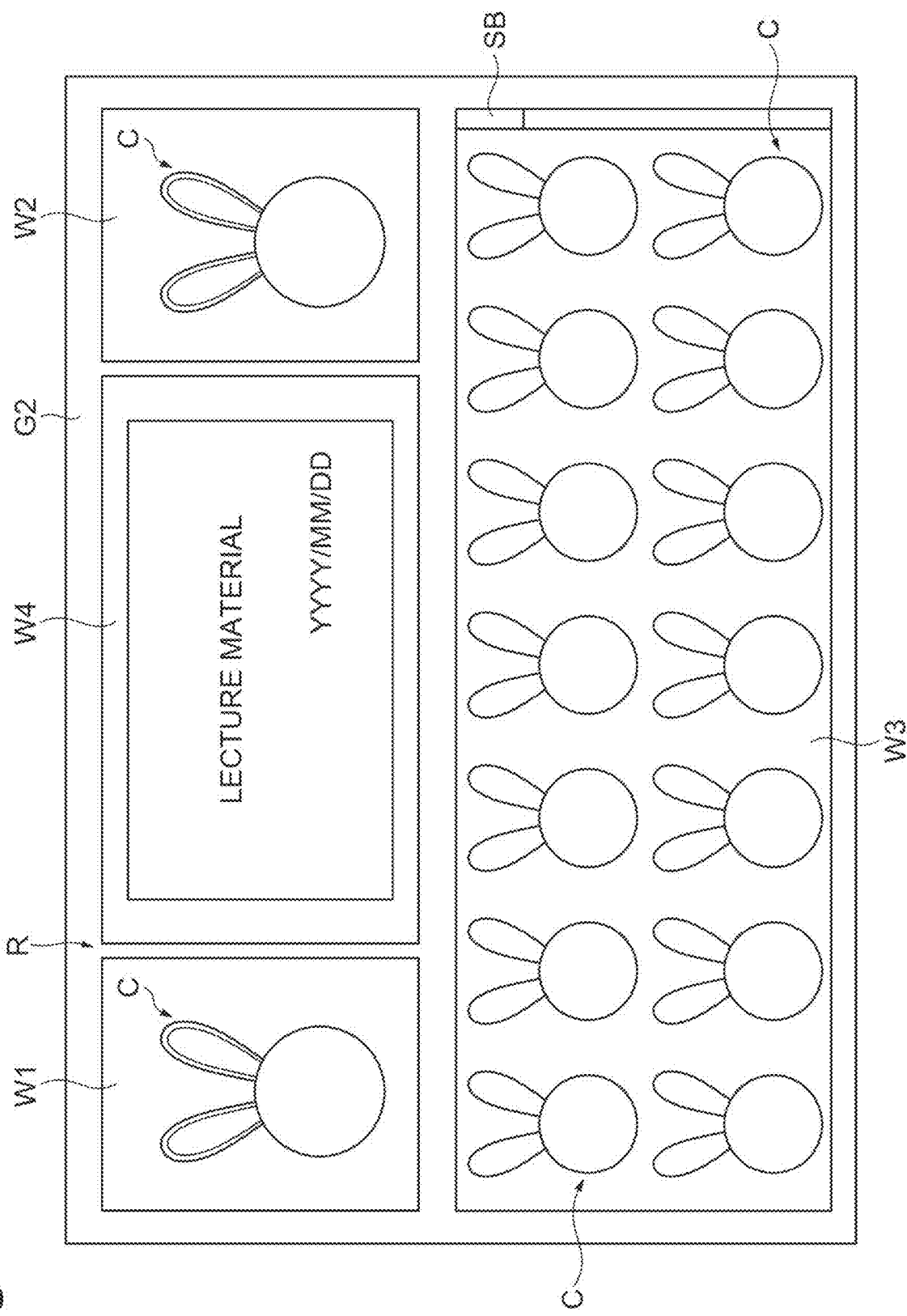
FIG. 9 is a diagram showing an example of a screen displayed in the virtual space.

As shown in FIG. 9, the display size of character C displayed in participant window W3 can be changed. In the example shown in FIG. 9, the size of character C is displayed larger than that in the example shown in FIG. 8. In participant window W3, the size of character C displayed on the front row side (upper side in the diagram) can be bigger, and the size of character C displayed on the rear row side (lower side in the diagram) can be smaller. By changing the size of character C, the number of characters C displayed in participant window W3 in a state in which scrolling is not performed can be set. When the size of character C is bigger, the number of characters C displayed in participant window W3 decreases, and when the size of character C is bigger, the number of characters C displayed in participant window W3 increases. Such settings are arbitrarily configurable by the administrator. The administrator can perform setting on a predetermined setting screen.

Figure 10:
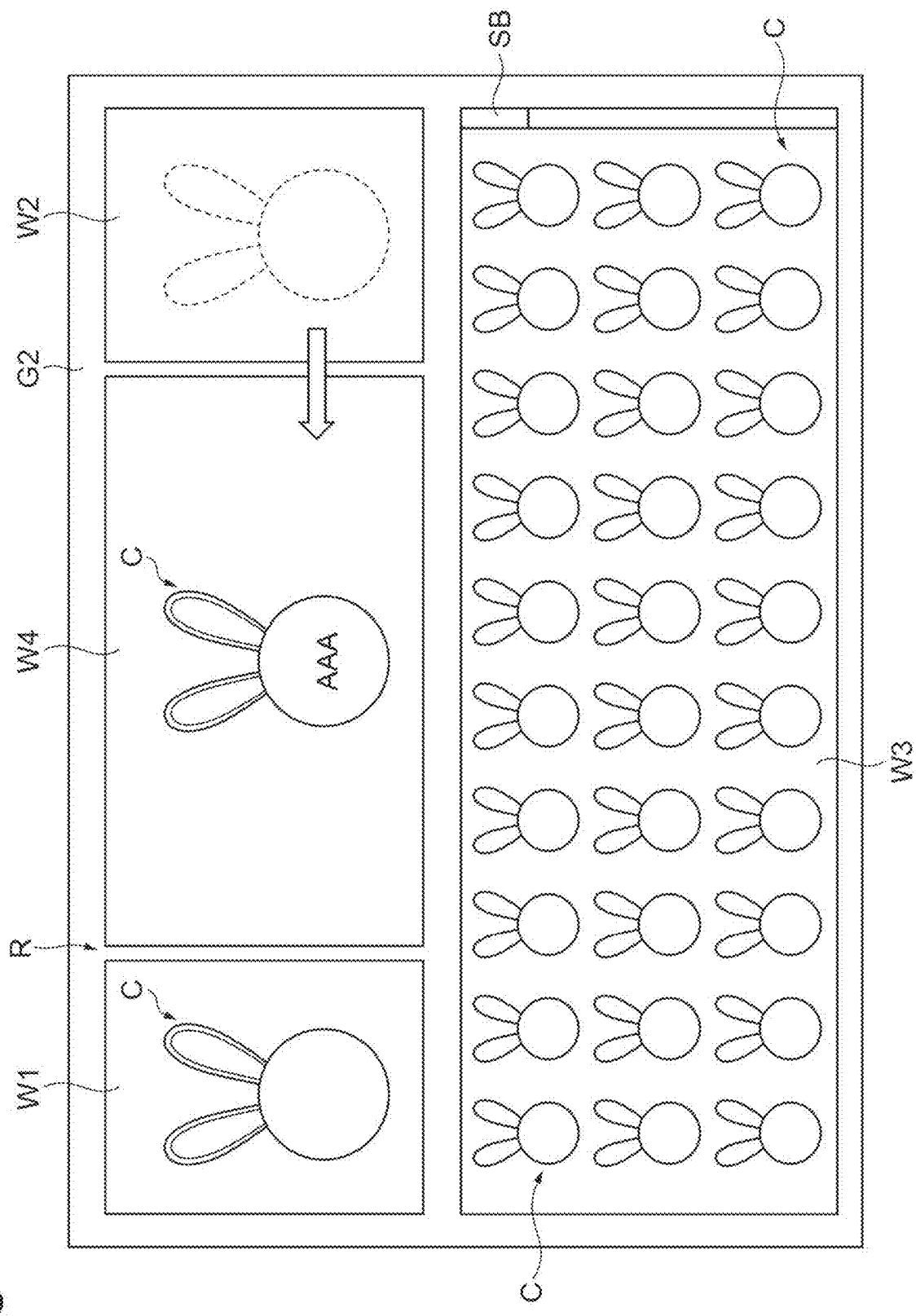
FIG. 10 is a diagram showing an example of a screen displayed in the virtual space.

As shown in FIG. 10, by dragging and dropping character C displayed in presenter window W2 to material window W4, character C displayed in presenter window W2 can be displayed in (moved to) material window W4. Dragging and dropping of character C can be performed by the moderator and the presenter. The identification information of the presenter is displayed in character C that has been dragged and dropped from presenter window W2 to material window W4. The identification information may be, for example, a student number, a name, initials or the like. In the example shown in FIG. 10, "AAA" is displayed in body B of character C.

Further, by dragging and dropping character C displayed in moderator window W1 to material window W4, character C displayed in moderator window W1 can be displayed in material window W4. For example, before the start of the lecture, character C of the moderator may be displayed in material window W4, and when the lecture is started, character C of the moderator may be moved to moderator window W1.

Figure 11:
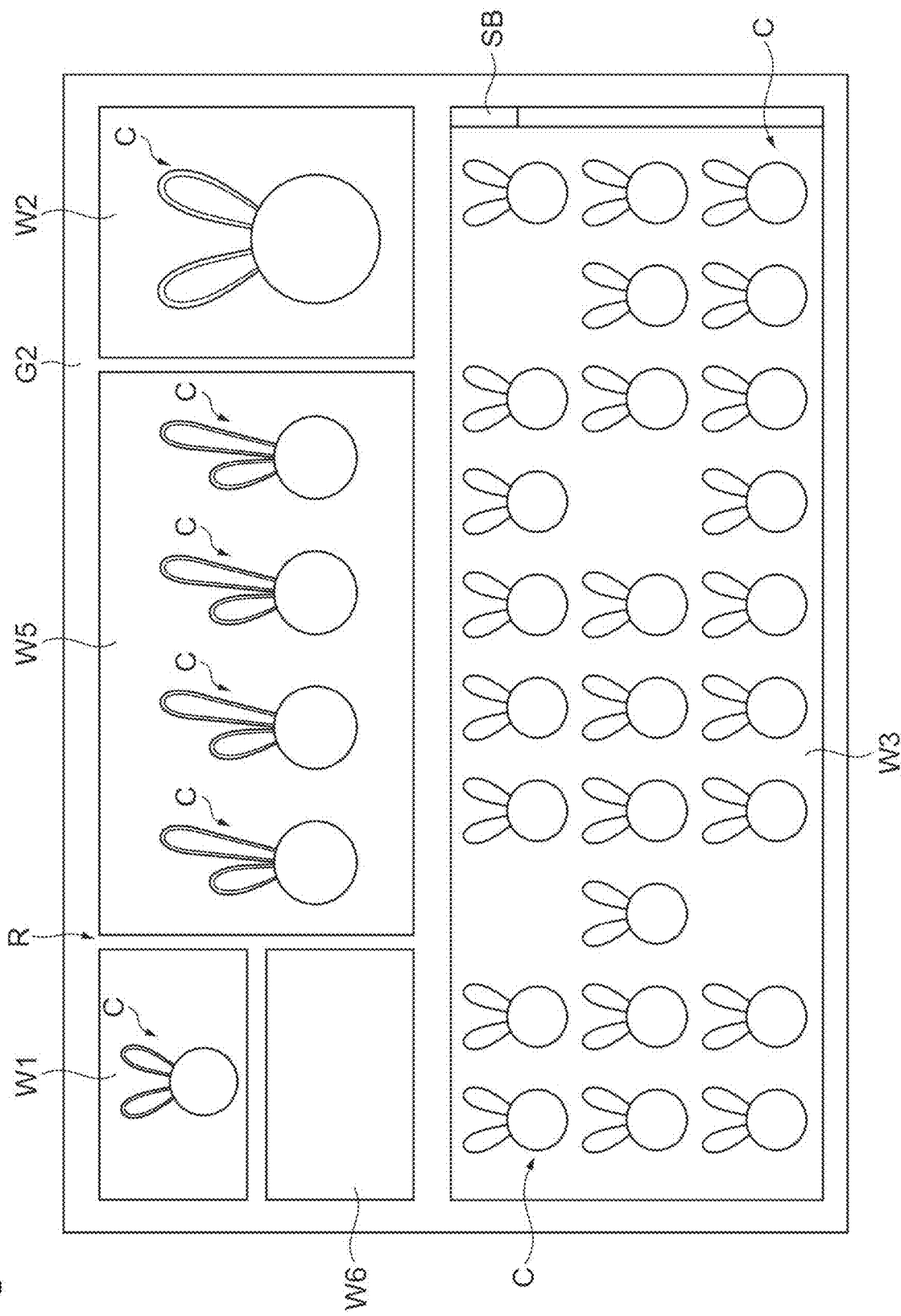
FIG. 11 is a diagram showing an example of a screen displayed in the virtual space.

As shown in FIG. 11, when ear animations E of a plurality of characters C perform the action of raising hand in response to a question or the like from the moderator and/or the presenter, a raiser-of-hand window (display area) W5 is displayed instead of material window W4. In raiser-of-hand window W5, characters C for which ear animation E performed the action of raising hand are displayed in the order of the action. In raiser-of-hand window W5, for example, characters C which perform the action of raising hand in order are displayed in order from the left. When character C moves from participant window W3 to raiser-of-hand window W5, a predetermined mark (identification information or the like) may be displayed at a place which character C vacates. This makes it possible to prevent another character C from moving into (being positioned in) a portion of participant window W3 which has become vacant due to the moving to raiser-of-hand window W5.

When ear animation E of character C performs the action of raising hand, a speaker window (display area) W6 is displayed. Speaker window W6 is displayed below moderator window W1 (between moderator window W1 and participant window W3).

Figure 12:
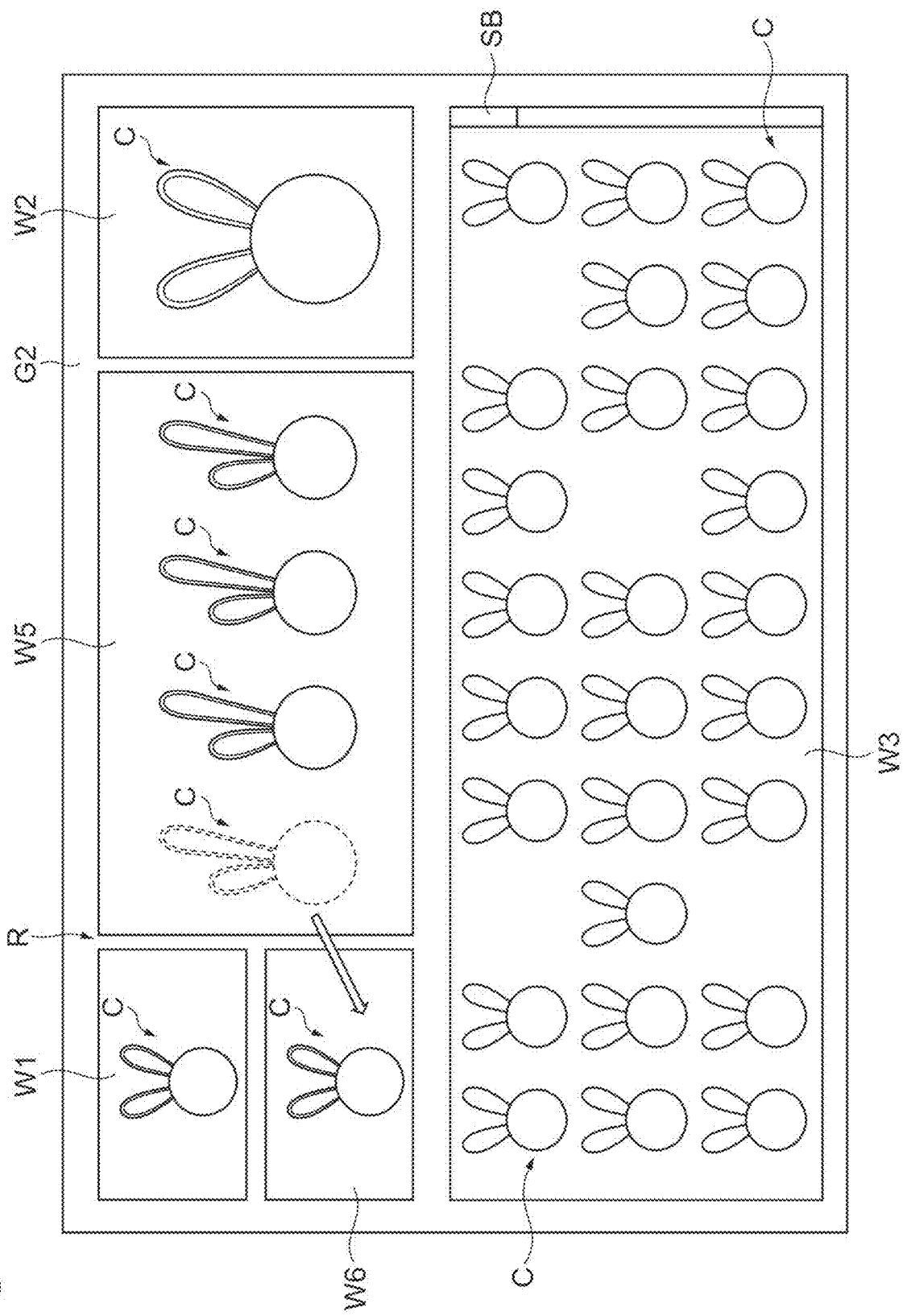
FIG. 12 is a diagram showing an example of a screen displayed in the virtual space.

As shown in FIG. 12, character C displayed in raiser-of-hand window W5 can be moved to speaker window W6. The moving of character C can be performed by clicking or dragging and dropping character C. Character C can be clicked or dragged and dropped by the moderator and the presenter. When character C is displayed in speaker window W6, information of users U1, U2, and U3 of character C may be displayed in body B of character C. When character C is displayed in speaker window W6, the audio of character C is automatically turned on. As a result, the utterance content of character C of any one of users U1, U2, and U3 of character C is transmitted to other users U1, U2, and U3 participating in the lecture.

When ear animations E of the plurality of characters C perform the action of raising hand in response to a question or the like from the moderator and/or the presenter, only speaker window W6 is displayed. Character C who performs the action of raising hand can be moved to speaker window W6. The moving of character C can be performed by clicking or dragging and dropping character C. Character C can be clicked or dragged and dropped by the moderator and the presenter.

When the utterance of character C in speaker window W6 is finished, character C is moved to participant window W3. The moving of character C can be performed by clicking or dragging and dropping character C. Character C can be clicked or dragged and dropped by the moderator and the presenter. Character C returns to a predetermined position of participant window W3. As a result, the audio of character C is automatically turned off.

Figure 13:
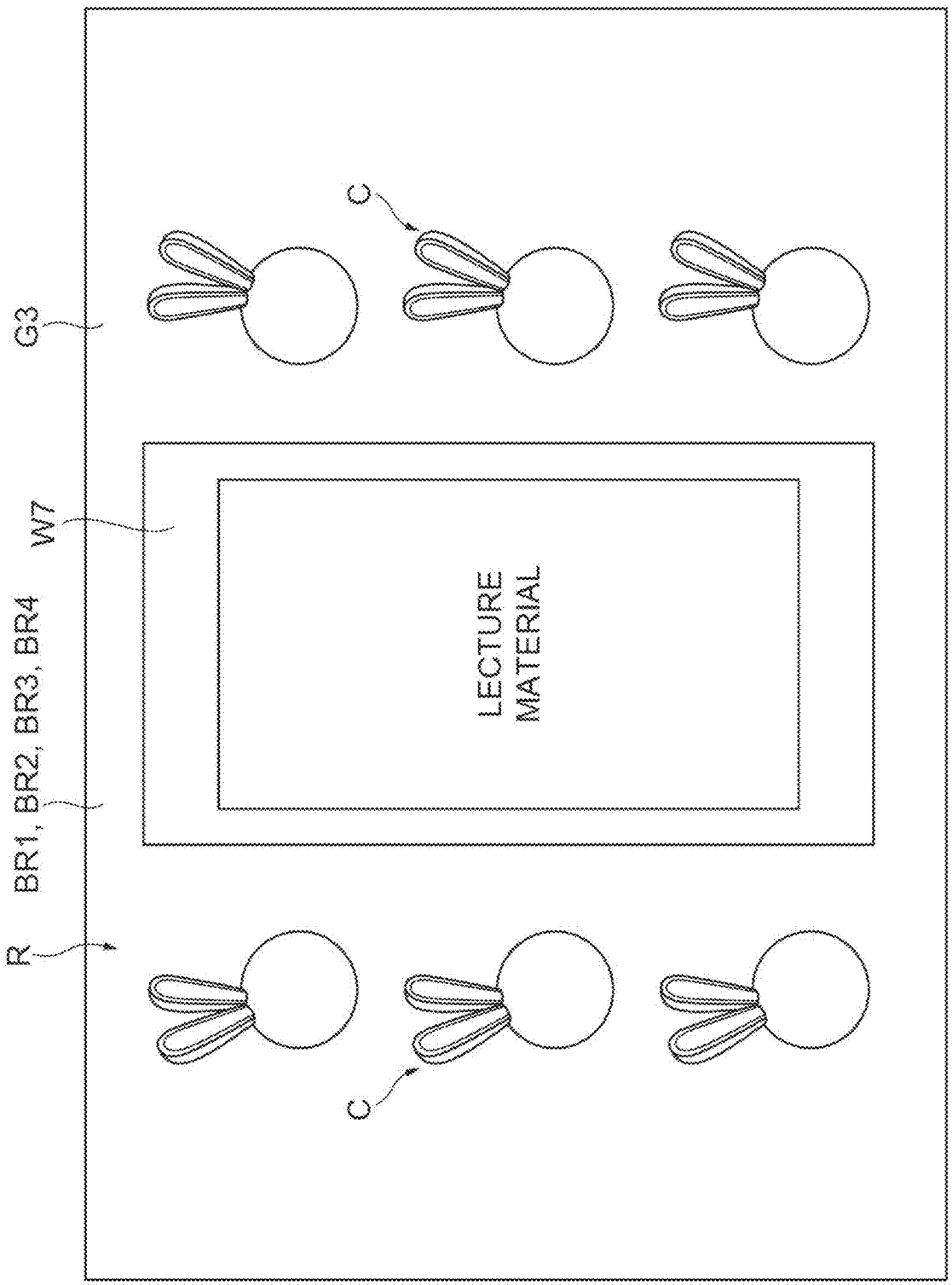
FIG. 13 is a diagram showing an example of a screen displayed in the virtual space.

As shown in FIG. 13, characters C displayed in participant window W3 can be moved to breakout rooms (display area) BR1, BR2, BR3, and BR4. A plurality of breakout rooms BR1, BR2, BR3, and BR4 can be set in accordance with the number of characters C (the number of students participating in the lecture) displayed in participant window W3.

Characters C can be arbitrarily assigned to breakout rooms BR1, BR2, BR3, and BR4 by the moderator or the presenter. Characters C can be automatically assigned to breakout rooms BR1, BR2, BR3, and BR4 based on the attributes of characters C. The moving to breakout rooms BR1, BR2, BR3, and BR4 is performed in response to an operation of the moderator or the presenter. That is, when the moderator or the presenter performs an operation (input) indicating moving to the breakout room BR, characters C displayed in participant window W3 move to each of breakout rooms BR1, BR2, BR3, and BR4.

A material window W7 is displayed on a screen G3 on which the videos of breakout rooms BR1, BR2, BR3, and BR4 are displayed. Material window W7 displays materials and the like. The screen shown in FIG. 13 is displayed on output units 15 of terminals 10, 20, and 30 of the students participating in the lecture. That is, each of terminals 10, 20 and 30 of students displays only one of breakout rooms BR1, BR2, BR3, and BR4 to which each student is allocated. In each of breakout rooms BR1, BR2, BR3, and BR4, the audio of characters C displayed in other breakout rooms BR1, BR2, BR3, and BR4 are not audible to each other. That is, in each of breakout rooms BR1, BR2, BR3, and BR4, characters C can have a conversation in each room.

Figure 14:
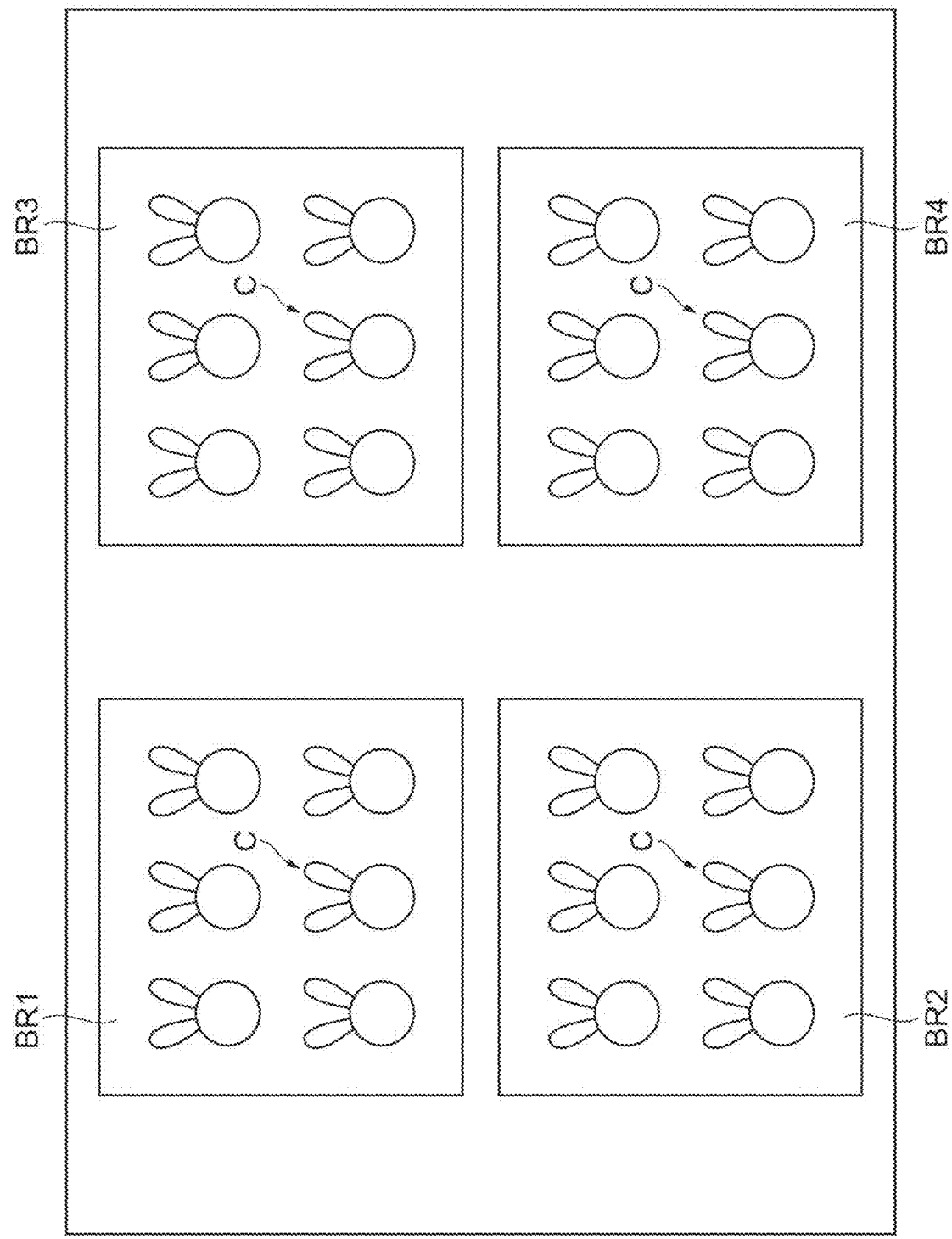
FIG. 14 is a diagram showing an example of a screen displayed in the virtual space.

As shown in FIG. 14, the moderator or presenter can see a plurality of breakout rooms BR1, BR2, BR3, and BR4. In the example shown in FIG. 14, four breakout rooms BR1, BR2, BR3, and BR4 are shown. The moderator or presenter can display breakout rooms BR1, BR2, BR3, and BR4 as shown in FIG. 13 by clicking on one of breakout rooms BR1, BR2, BR3, and BR4.

Figure 15:
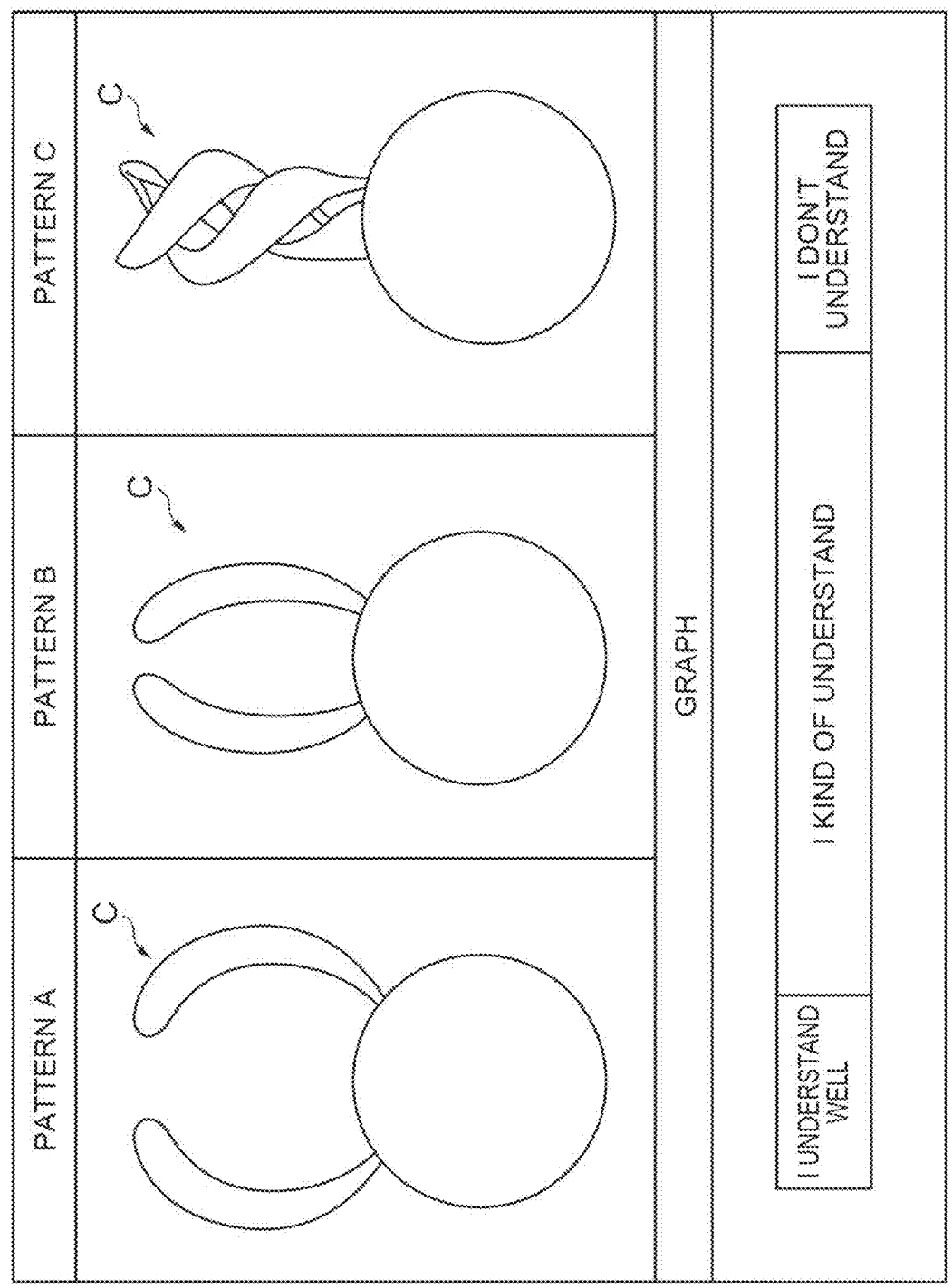
FIG. 15 is a diagram showing an example of the operation of the ear animation and an example of a bar graph.

In a lecture, a student can respond to the inquiry about understanding level from the moderator or the presenter with ear animation E as shown in the pattern A of FIG. 15, the pattern B of FIG. 15, and the pattern C of FIG. 15 in character C. In the pattern A of FIG. 15, the action of "I understand well" in ear animation E is shown. The pattern B in FIG. 15 shows the action of "I kind of understand" in ear animation E. In the pattern C of FIG. 15, the action of "I don't understand" in ear animation E is shown. The action of "I don't understand" in ear animation E is the same as the action of "questioning" shown in the pattern E of FIG. 5. In response to the inquiry about the understanding level from the moderator or the presenter, users U1, U2, and U3 operate operation device 50 to operate ear animation E of character C. The operation of ear animation E shown in the pattern A of FIG. 15, the pattern B of FIG. 15, and the pattern C of FIG. 15 may be controlled by a predetermined operation on operation device 50, or may be controlled by an operation of a button displayed on the screen of the participant.

The reaction of the participant, that is, the action of ear animation E of character C, can be visualized and displayed. As shown in FIG. 15, the statistics of the action of ear animation E of character C are displayed, for example, in a bar graph. Accordingly, the moderator or the presenter can grasp the degree of understanding of the student in the lecture.

Next, an example of a method of participating in the lecture will be described. First, students (users U1, U2, and U3) who are participants open a home page of a school on terminals 10, 20, and 30. Subsequently, the student logs in by inputting an ID, a password, and the like on the homepage. After the login, a lecture schedule is displayed on a predetermined screen. When the lecture time comes, the application is activated, and characters C of users U1, U2, and U3 are displayed in participant window W3. Thus, the student completes the participation in the lecture.

The activity (participation in a lecture or the like) of character C in virtual space R can be recorded. The recording may be performed by the administrator or by all the participants. When the administrator performs recording, the recorded video may be made public to the participants. Users U1, U2, and U3 can review the lecture or the like by the recorded video.

(Activity 2)

Next, the activity 2 will be described. The activity 2 is a conference, a report meeting, or the like. First, a conference will be described as an example. The meeting may be a brainstorming.

Figure 16:
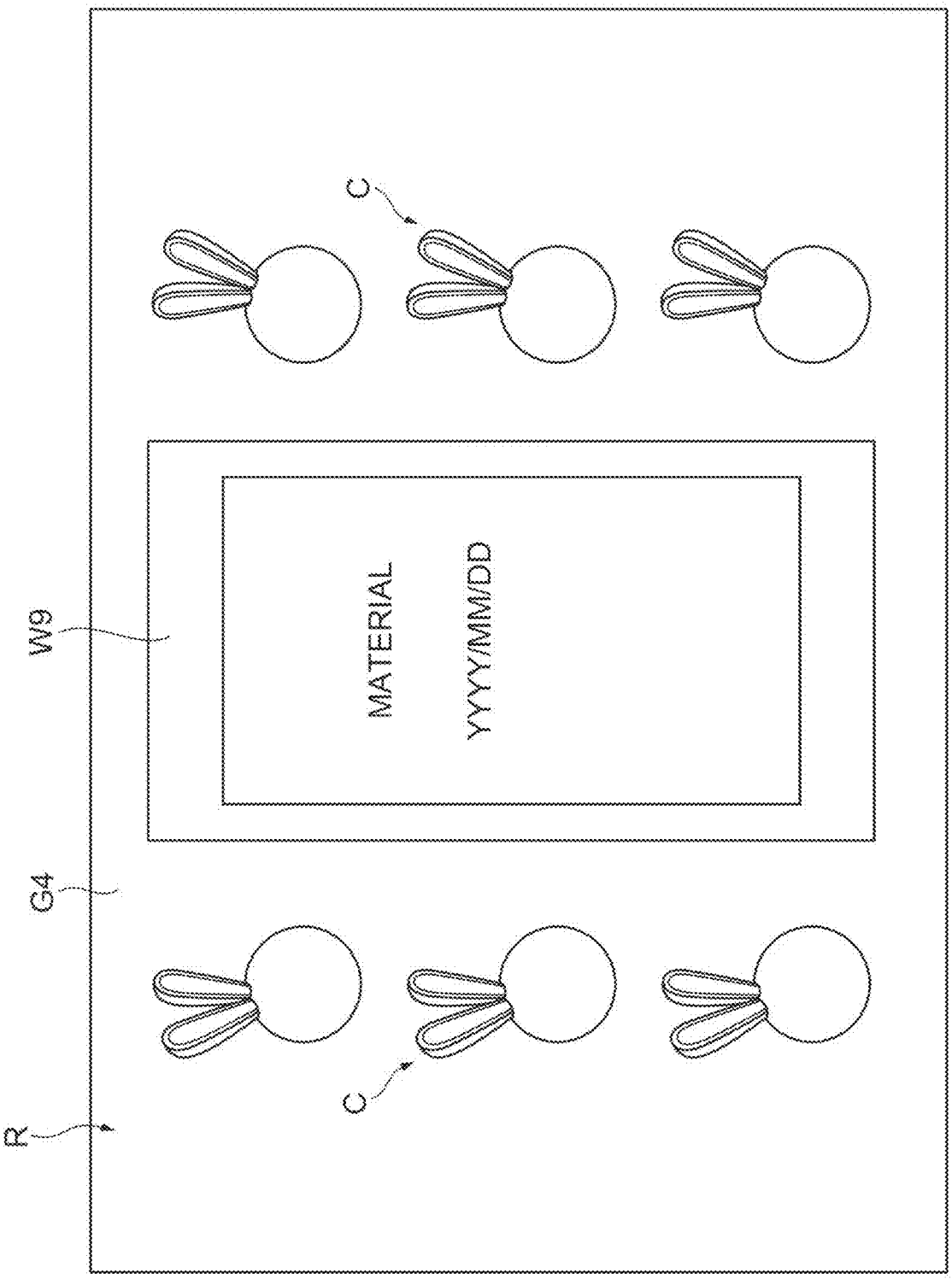
FIG. 16 is a diagram showing an example of a screen displayed in the virtual space.

As shown in FIG. 16, a material window (display portion) W9 is displayed on a screen G4 on which the video of virtual space R of the conference is displayed. Material window W9 is displayed in the center of screen G4. Characters C are displayed at positions sandwiching material window W9. In the example shown in FIG. 16, six characters C are displayed at positions opposed to each other with material window W9 interposed therebetween. Characters C are displayed in the same size, for example. The size of characters C are arbitrarily configurable by the administrator and the participant. The administrator is, for example, an organizer in the case of a conference. When the administrator or the participant changes the size of one character C, the sizes of all characters C may be changed accordingly. Of course, it is possible to change the size of only specific character C.

The positions of characters C may be arbitrarily set by users U1, U2, and U3 participating in the conference or may be set in advance by the organizer. When the positions of characters C are not set (in the case of a free seat), the positions of characters C may be assigned in the order of participating in the conference. The positions of characters C can be changed as appropriate.

Material window W9 displays materials and the like. The materials and the like is a content based on the details of the activity of character C. That is, the materials and the like displayed in material window W9 in the lecture show details (content) of the conference in terms of the activity of characters C participating in the conference. In material window W9, the conversation of characters C may be converted into text and displayed. In addition, material window W9 may display the translation of the conversation of characters C.

Material window W9 is operable by the participants. The participants can operate the display details to be displayed in material window W9 on the predetermined operation screen. The operation screen is displayed on output unit 15 of the participant, for example, by the participant tapping (clicking) material window W9. On the operation screen, materials (text data, image data, presentation data, etc.) can be displayed in material window W9, and the displayed materials and boards can be input by handwriting. In the case of the explanation using the pointer, character C may be automatically rotated so as to face the position indicated by the pointer (predetermined object). That is, character C may be rotated in accordance with the position of the predetermined object so as to give the impression that character C is gazing at the predetermined object. Further, when speaking to the specific character C, the specific character C may be clicked so that character C of the user and the specific character C (predetermined object) of the conversation partner face each other.

Material window W9 can be created by users U1, U2, and U3 set in advance, such as the administrator and all the participants. For example, material window W9 can be created by clicking the material window in the task bar (not shown in the diagram). The display of material window W9 may be terminated by an end button (not shown in the diagram).

The layout and size of material window W9 can be arbitrarily set by the administrator. The administrator is, for example, an organizer in the case of a conference. The size of character C is also changed in accordance with the change of the size of material window W9. For example, when the size of material window W9 is increased, the size of character C is decreased. Character C is displayed in an area (margin) outside material window W9 on screen G3. When the size of material window W9 is increased to the maximum, the size of character C can be reduced to about 10 mm. Material window W9 may be displayed in the full screen in screen G3. In this case, character C is displayed in a state of being superimposed on material window W9. Further, each of users U1, U2, and U3 can arbitrarily change the display viewpoint. For example, the viewpoint can be rotated in 3D.

Figure 17:
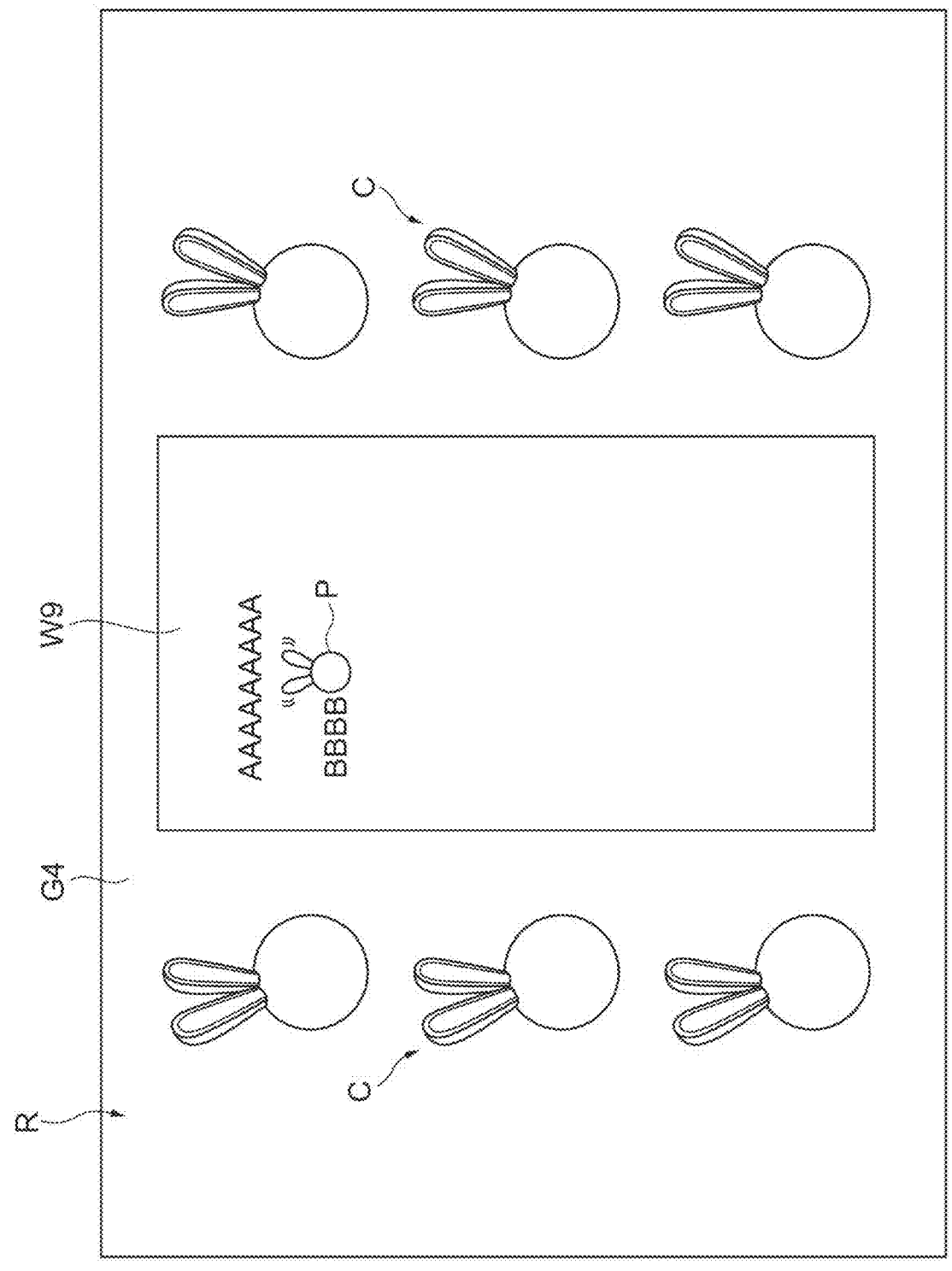
FIG. 17 is a diagram showing an example of a screen displayed in the virtual space.

As shown in FIG. 17, when a participant inputs text in material window W9, material window W9 may be displayed so that the participant who inputs text in material window W9 can be recognized. Specifically, a pointer corresponding to character C may be displayed in material window W9 so that the user can recognize at a glance that character C inputs text in material window W9 that corresponds to a pointer P. Specifically, for example, pointer P and character C may be displayed with hatching, or pointer P and character C may be displayed in the same color.

Figure 18:
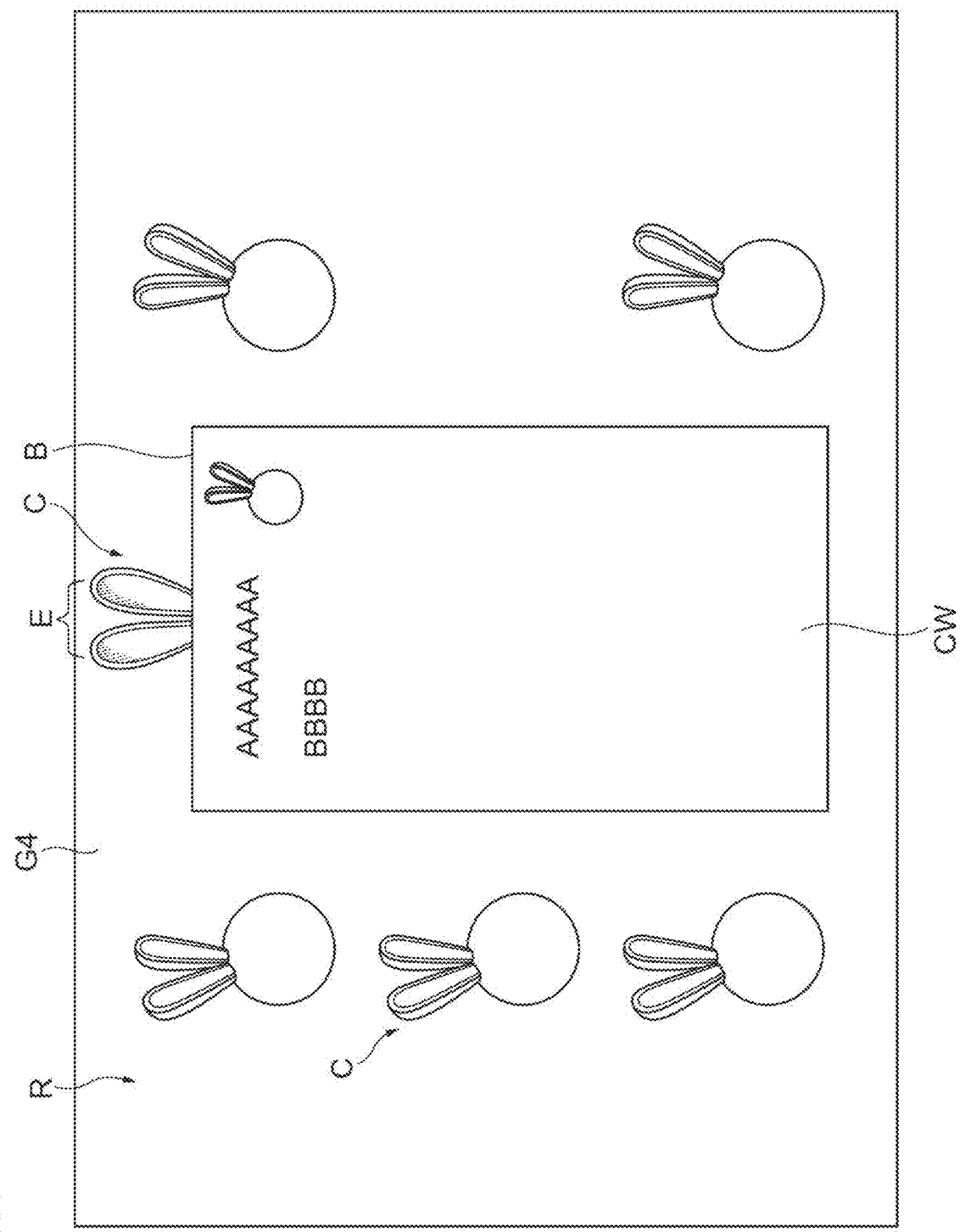
FIG. 18 is a diagram showing an example of a screen displayed in the virtual space.

As shown in FIG. 18, body B of character C of the participant may be transformed into a material window CW. Thus, character C inputs text in material window CW can be recognized at a glance. The switching of the display from material window W9 to a material window WC can be executed by dragging and dropping (dragging in) character C to material window W9. That is, in response to receipt of an operation of dragging and dropping character C in material window W9, a predetermined function of switching the display is executed in material window W9. In material window WC, materials of users U1, U2, and U3 of character C which is dragged and dropped are displayed, and details input by users U1, U2, and U3 are displayed.

Material window WC may be displayed so that the participant (the operator) can be identified. Specifically, for example, ear animation E of character C of the participant or a similar design can be provided outside or inside the window, or a frame color or a frame pattern can be provided so that the participant can be recognized at a glance. At this time, not only ear animation E of the same color, the same pattern, or a design to be similarly associated is added to the outside of the window, but also the color, pattern, and the like of the frame or the like of the corresponding window may be associated with the color, pattern, and the like of character C in a matching or similar manner by providing a thickness to the frame. The frame may also be designed to be slightly rounded rather than completely quadrilateral. Further, pointer P (see FIG. 17) may be displayed in material window WC. Similarly, the color, frame, periphery, and background of pointer P may be the same as or similar to the color of ear animation E of character C.

The display can be switched from material window WC to material window W9 by dragging and dropping (dragging out) character C displayed in material window WC to an area other than material window WC. That is, upon receiving an operation of dragging and dropping character C displayed in material window WC to an area other than material window WC after character C is dragged and dropped to material window W9, the execution of the predetermined function of switching the display from material window W9 to material window WC is terminated. In addition, when another character C is dragged and dropped (dragged in) in material window WC, the display may be changed to material window WC of another character C. Further, the display may be switched from material window WC to material window W9 by clicking the exit button (not shown in the diagram).

The deformation of body B of character C may have a plurality of patterns. For example, body B may be deformed so that the display area is bigger in a stepwise manner. Users U1, U2, and U3 can change the deformation pattern of body B in accordance with the situation or the like. The material displayed in the material window is not limited, and the material may be used in a pen input window, a video window, or the like as information display. In particular, when the pen input operator is changed, dragging and dropping the changed character C to the pen input window switches from the state of the previous pen input window and enables additional writing, thereby enabling a smooth changeover in the pen input.

Figure 19:
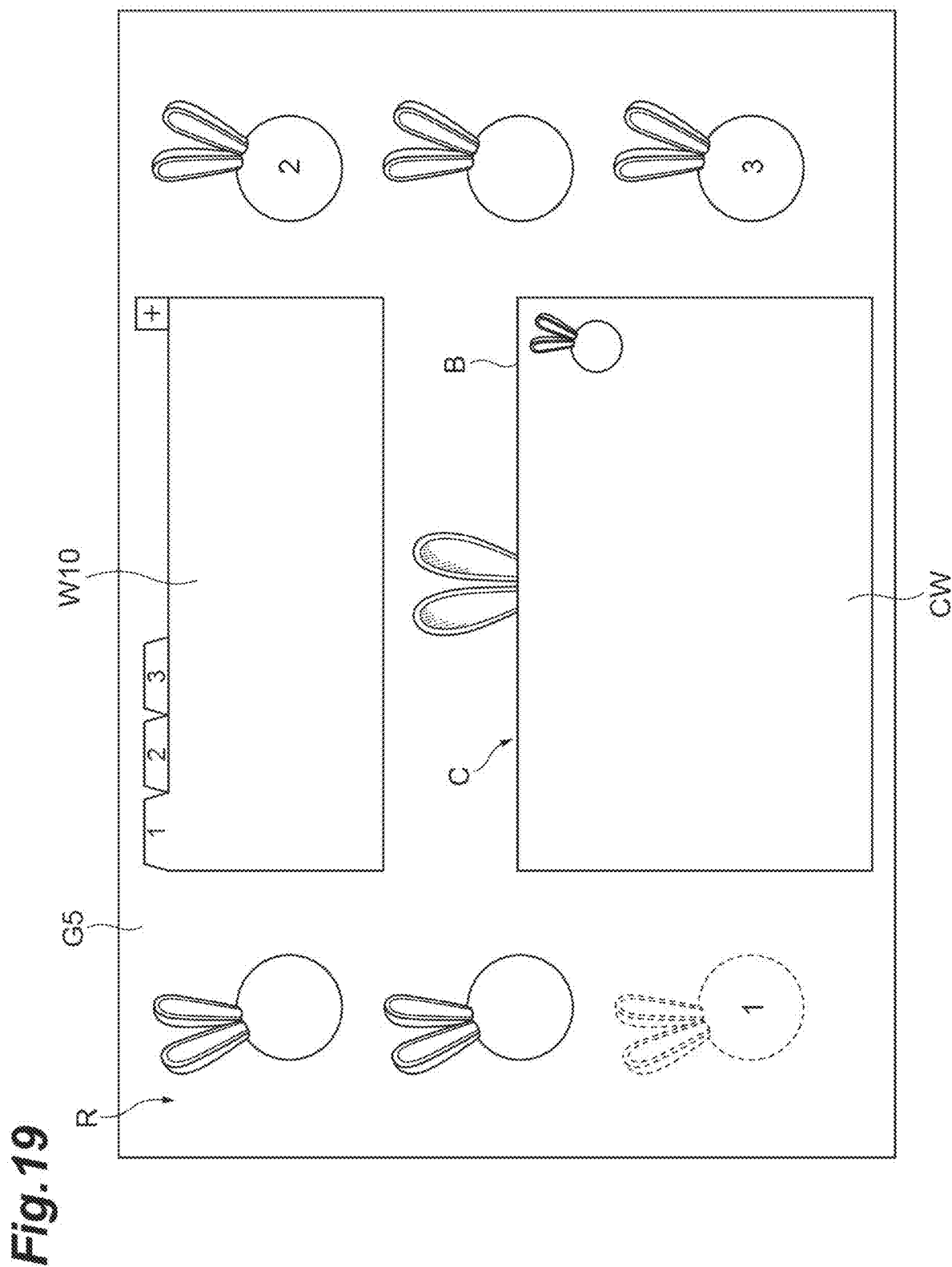
FIG. 19 is a diagram showing an example of a screen displayed in the virtual space.

As shown in FIG. 19, on a screen G5 on which the video of virtual space R of the conference is displayed, a material window W10 may be displayed, and material window CW in which body B of character C of the participant is deformed may be displayed. Material window CW can be displayed by dragging and dropping character C in the material window (not shown in the diagram) as described above. The display can be switched from material window WC to the material window (not shown in the diagram) by dragging and dropping (dragging out) character C displayed in material window WC to an area other than material window WC.

Material window W10 is displayed, for example, in the upper center portion of screen G5. Material window W10 may be provided with a tab. The tab can be added by clicking "+" displayed on the upper right of material window W10. In the example shown in FIG. 19, three tabs ("1", "2", and "3") are displayed. By clicking the tab, the display of the materials and the like in material window W10 can be switched. Material window CW composed of body B of character C is displayed, for example, in the lower center portion (lower portion of material window W10) in screen G5.

In material window W10, the tabs may be associated with the respective characters C. For example, the tab "1" is associated with character C in which "1" is displayed in body B, the tab "2" is associated with character C in which "2" is displayed in body B, and the tab "3" is associated with character C in which "3" is displayed in body B. Users U1, U2, and U3 of characters C can display any information in material window W10 of their own tabs.

In addition, conversation text in which the conversation of character C is converted into text may be displayed in material window CW. When the languages are different, the text can be displayed in the language selected by each participant in conjunction with an automatic interpretation function. Thus, the non-verbal information using ear animation E and the translated text between different languages are displayed. Therefore, it is possible to achieve an automatic interpretation conversation with visual support of the states, emotions, and words (translated text) of users U1, U2, and U3.

The conversation text can be arbitrarily selected and dragged and dropped to material window W10. The conversation text which is dragged and dropped is displayed in the window of the tab corresponding to character C. Note that, regarding the converting the conversation of character C into text, a predetermined word may not be displayed. The predetermined words are, for example, "yeah, yeah", "well", "I see", "yes, yes", and the like. When the predetermined word is set not to be displayed, ear animation E of character C may act by the predetermined word. Ear animation E of character C composing material window CW may be expanded in accordance with the volume of the audio of character C.

Further, virtual space R may have a function of displaying a real image window (not shown in the diagram) and changing character C to real images (videos) of users U1, U2, and U3 when dragging and dropping character C in the real image window. When the real image is turned off, the display may return to character C. Note that, when the display is switched to the real image, it is preferable to perform prior confirmation (approval) of the image to be displayed in advance. That is, a step of approving the screen transition may be provided.

The series of operations and the scene transition may be achieved by clicking a function switch in character C. By providing a "moving process" by dragging of character C itself and a "transform process" of character C by clicking of a switch of character C, "state transition" is performed, and scene transition by sensory and intuitive operation can be achieved with a sense of time. The sensory and intuitive operations are characterized in that users U1, U2, and U3 can switch to the next scene by moving character C to a desired position and operating character C itself, rather than by operating the screen operation panel, which is far from the character operation displayed on the title bar or the like at the top of the screen. For example, the difference is the same as the difference between the intuitive moving of the waste to the trash box on the screen and the non-intuitive operation of the delete key by clicking the title bar. File operation has been targeted, but in the embodiment, intuitive operation in character C appearing in a remote conference or a metaverse is provided. The embodiment is also characterized in that the transition is performed while maintaining ear animation E of the non-verbal information expression.

Figure 20:
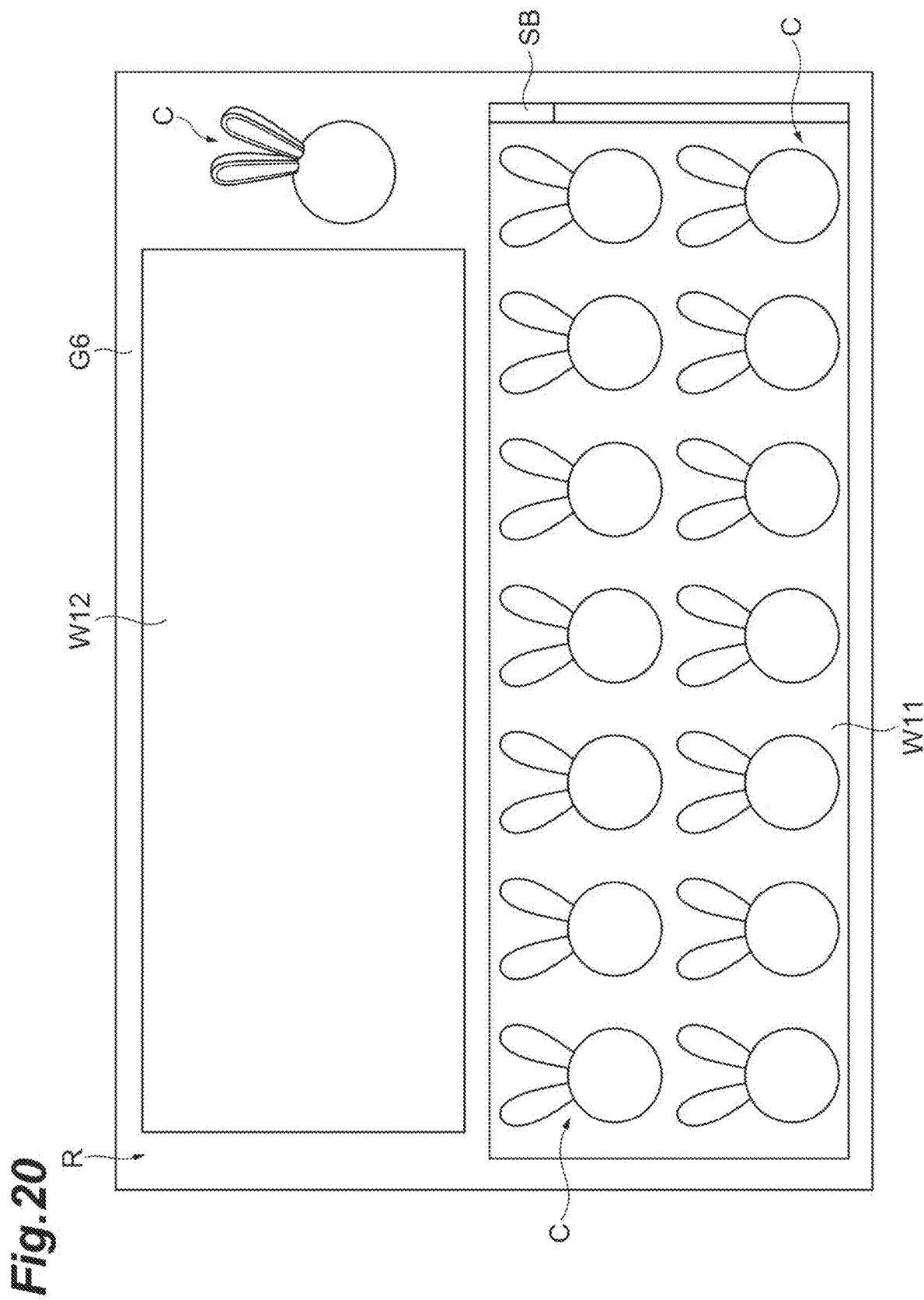
FIG. 20 is a diagram showing an example of a screen displayed in the virtual space.

Next, a report meeting will be described as an example. As shown in FIG. 20, a participant window W11 and a material window W12 are displayed on a screen G6 on which the video of virtual space R of the report meeting is displayed. In participant window W11, characters C, participants of the report meeting, are displayed. Participant window W11 is displayed, for example, in the lower portion of screen G6. In participant window W11, character C is displayed so as to face back. The audio of character C displayed in participant window W11 is turned off. When the number of character C to be displayed is large (when the number of participants is large), scroll bar SB is displayed in participant window W11. By operating scroll bar SB, all characters C participating in the report meeting can be confirmed in participant window W11. Identification information may be displayed in character C displayed in participant window W11. The identification information may be, for example, a post, a name, initials and the like.

Material window W12 displays materials and the like. The materials or the like are content based on the details of the activity of character C. That is, the materials or the like displayed in material window W12 in the report meeting show details (contents) of the report meeting in the activity of character C participating in the report meeting. Material window W12 is displayed, for example, in the upper portion of screen G6 (upper portion of participant window W11). Character C of the reporter participating in the report meeting is displayed on the right side of material window W12 in screen G6. Character C of the reporter may be displayed on material window W12 (overlapping material window W12).

Material window W12 is operable by the reporter. The reporter can operate the display details to be displayed in material window W12 on the predetermined operation screen. The operation screen is displayed on output unit 15 of the reporter when the reporter taps (clicks) material window W12, for example. Character C of the participant may be dragged and dropped to material window W12 to give the participant the authority to operate material window W12. In this case, when character C moves from participant window W3 to material window W12, a predetermined mark (identification information or the like) may be displayed at a place where character C becomes an empty seat. Accordingly, it is possible to prevent the situation where another character C moves into (is positioned in) the portion of participant window W3 that has become vacant as a result of the moving to material window W12.

The layout and size of participant window W11 and material window W12 are arbitrarily configurable by the administrator. The administrator is, for example, an organizer in the case of report meeting.

In participant window W11, character C may be displayed so as to be distinguishable by the attributes of the participants (users U1, U2, and U3). For example, the attributes can be distinguished by the type of hatching or color. The display size of character C displayed in participant window W11 can be changed. In participant window W11, for example, the size of character C displayed on the front row side (the upper side in the diagram) can be increased, and the size of character C displayed on the rear row side (the lower side in the diagram) can decreased.

Next, an example of a method of participating in the conference or report meeting will be described. The organizer downloads the application software. When the application software is opened, selection screen G1 is displayed as shown in FIG. 6. When the organizer selects "Activity 2" in selection screen G1, a selection screen of "conference" or "report meeting" is displayed. The organizer selects "conference" or "report meeting", further selects a participant, and sends a notice to the participant.

The invitation letter may include an explanation of the conference, an ID, and a password. In addition, a URL, a calendar, or the like may be displayed on the invitation letter. By clicking on the URL or calendar, the user can join the conference. The invitation may include an explanation for supporting downloading of an application to a user who participates in the conference for the first time. When the time for a conference or the like comes, the participant participates in the conference or the like by inputting an ID and a password or clicking a URL or the like.

The activity (conference, lecture, etc.) of character C in virtual space R can be recorded. The recording may be performed by the administrator or by all the participants. When the administrator performs recording, the recorded video may be made public to the participants. Users U1, U2, and U3 can review the conference or the like by the recorded video.

(Activity 3)

Figure 21:
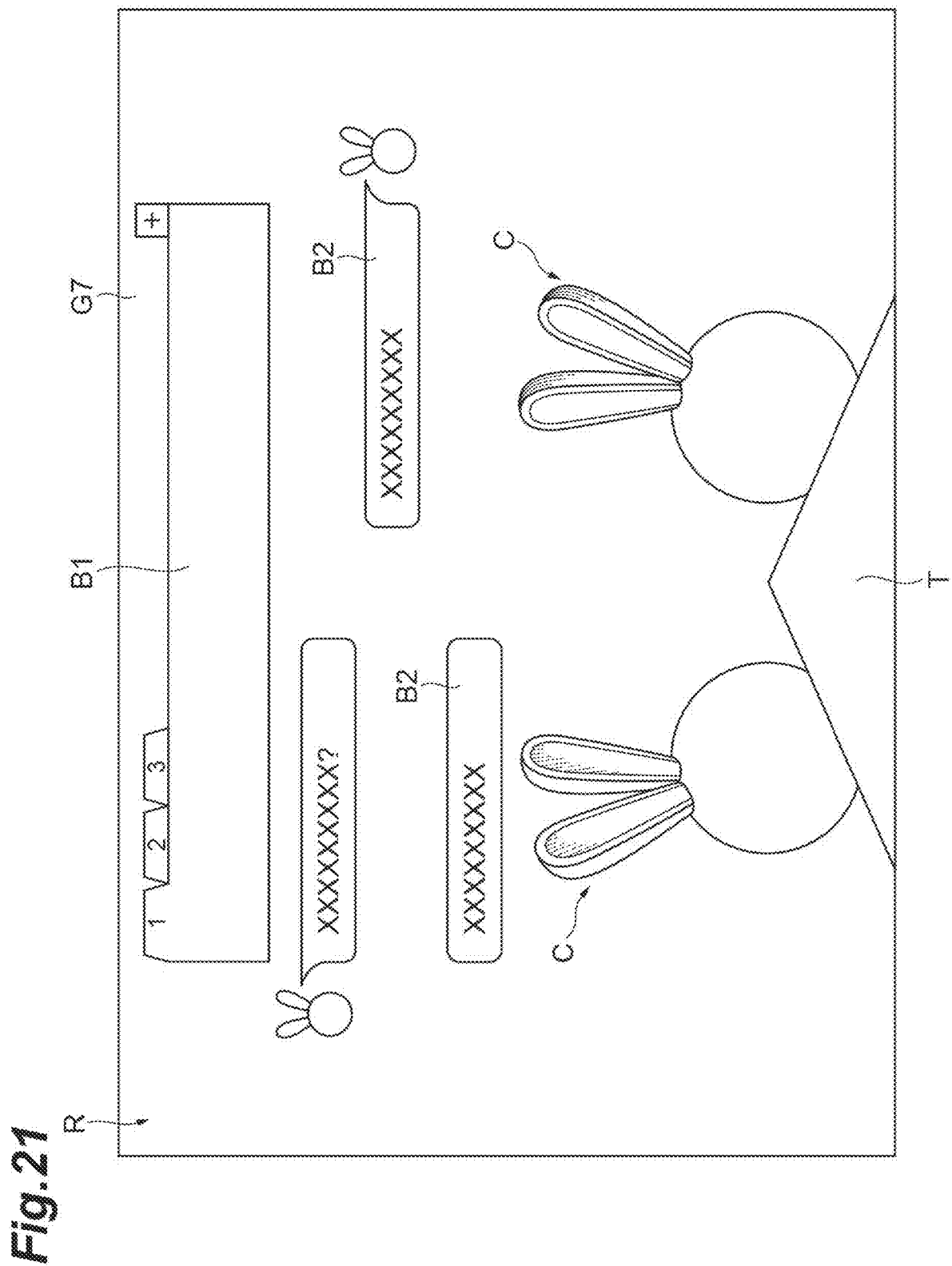
FIG. 21 is a diagram showing an example of a screen displayed in the virtual space.

Next, the activity 3 will be described. The activity 3 is a one-to-one activity of character C, and includes counseling, support and explanation communication in call centers, discussions, remote medical care, personal lessons, and the like. In the embodiment, a form in which the activity 3 is counseling will be described as an example. In counseling, character C of counselor and client may participate. As shown in FIG. 21, a display board (content display portion) B1, a chat board (text display portion) B2, character C, and a table T are displayed on a screen G7 on which video of virtual space R for counseling are displayed.

On display board B1, counseling details and the like are displayed. The counseling details and the like are contents based on the details of the activity of character C. That is, the counseling details and the like displayed on display board B1 in the counseling show details (contents) of the counseling in the activity of receiving the counseling of character C. Display board B1 is displayed, for example, in the upper portion of screen G7. Display board B1 may be provided with a tab. The tab can be added by clicking on the "+" displayed at the upper right portion of display board B1. In the example shown in FIG. 21, three tabs ("1", "2", and "3") are displayed. By clicking the tab, the display of the materials and the like on display board B1 can be switched.

Display board B1 is operable by the counselor. The counselor can operate the display details to be displayed on display board B1 on the predetermined operation screen. The operation screen is displayed on output unit 15 of the counselor when the counselor taps (clicks) display board B1, for example. On the operation screen, materials can be displayed on display board B1 or can be input by handwriting.

On chat board B2, conversation text indicating conversation details of character C converted into text is displayed in a chat format. The conversation text is obtained by converting the audio of users U1, U2, and U3 into text by voice recognition processing. Chat board B2 displays a prescribed number of conversation texts from the latest one in time series among a plurality of conversation texts generated based on the audio of users U1, U2 and U3. In the example shown in FIG. 21, three conversation texts are displayed. Chat board B2 is displayed, for example, in the center portion of screen G7 (lower portion of display board B1). In chat board B2, a mark of character C may be displayed near the conversation text.

Note that not only the text converted into text by the voice recognition processing but also text input from a keyboard or the like by users U1, U2, and U3 may be displayed on chat board B2. The display of the input text on chat board B2 is effective in the case where the user wants to avoid speaking in audio. For example, when the participant steps away from or leaves the conference, the participant inputs the information and displays the information on chat board B2, thereby reducing the hindrance to the current conversation and informing participants of the stepping away or leaving state. Of course, this can be used in a wide variety of other applications. For example, it can be used for a scene in which a moderate comment is transmitted. Chat board B2 may be configured to be able to handle different types such as providing scenes without sound, providing scenes with sound, providing scenes with sound effects, and the like, and such as audio on/off functions of audio, selection of audio details, automatic generation of standard format, and the like in accordance with the situation, Character C is displayed, for example, in the lower portion of screen G7 (lower portion of chat board B2). For example, character C of the counselor is displayed on the left side, and character C of the client is displayed on the right side. Characters C is arranged so as to obliquely face each other with table T interposed therebetween.

Figure 22:
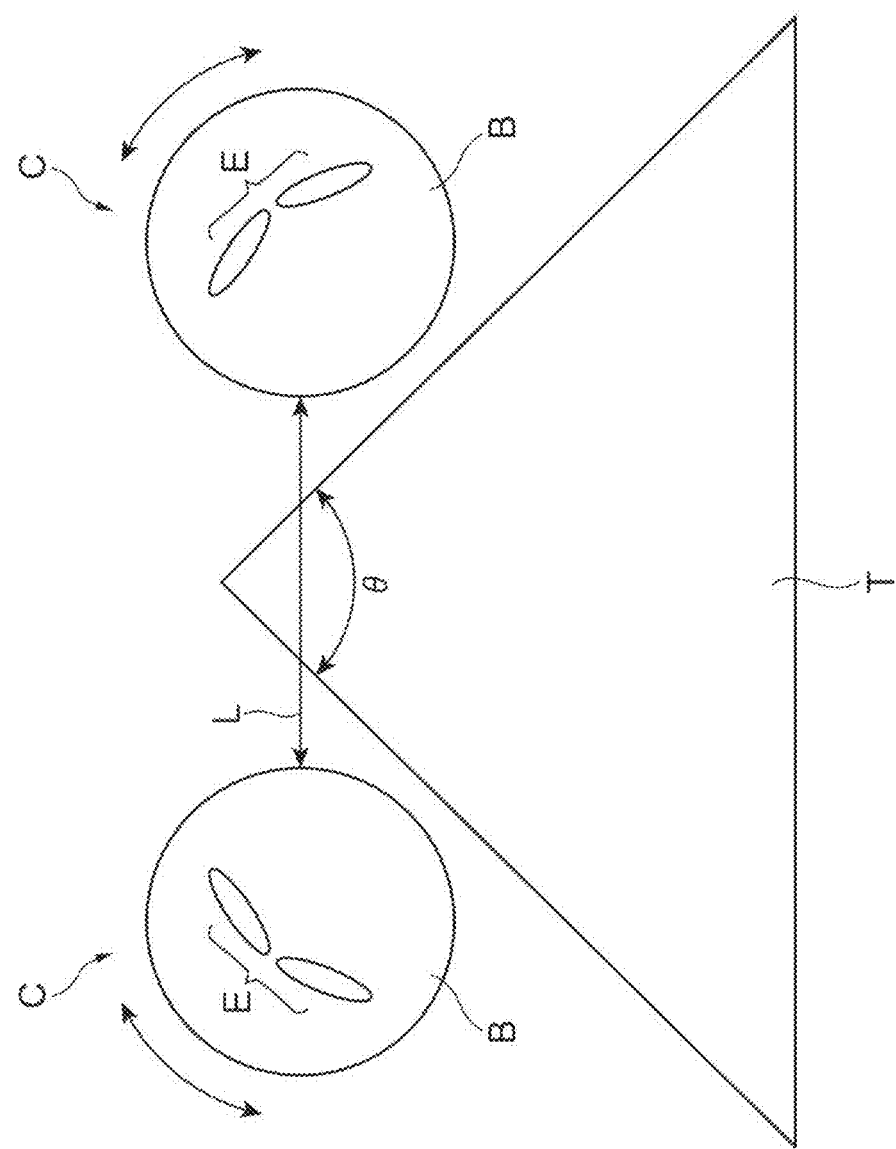
FIG. 22 is a diagram for explaining a setting of the arrangement of characters.

As shown in FIG. 22, the layout of character C can be arbitrarily set. Specifically, a distance L between characters C, the angle θ at which characters C face each other, and the rotation angle of characters C can be set. The angle θ at which characters C face each other can be changed by adjusting the angle of table T. When the layout of one character C is changed, the arrangement of other characters C may be changed (collectively) in conjunction with the change of the layout of one character C. The size of characters C can be arbitrarily set. The size of characters C can be set for each of two characters C. Further, when the size of one character C is changed, the size of the other character C may be changed in conjunction with the change of the size of one character C. Further, each of users U1, U2, and U3 can arbitrarily change the display viewpoint. For example, the viewpoint can be rotated in 3D.

Figure 23:
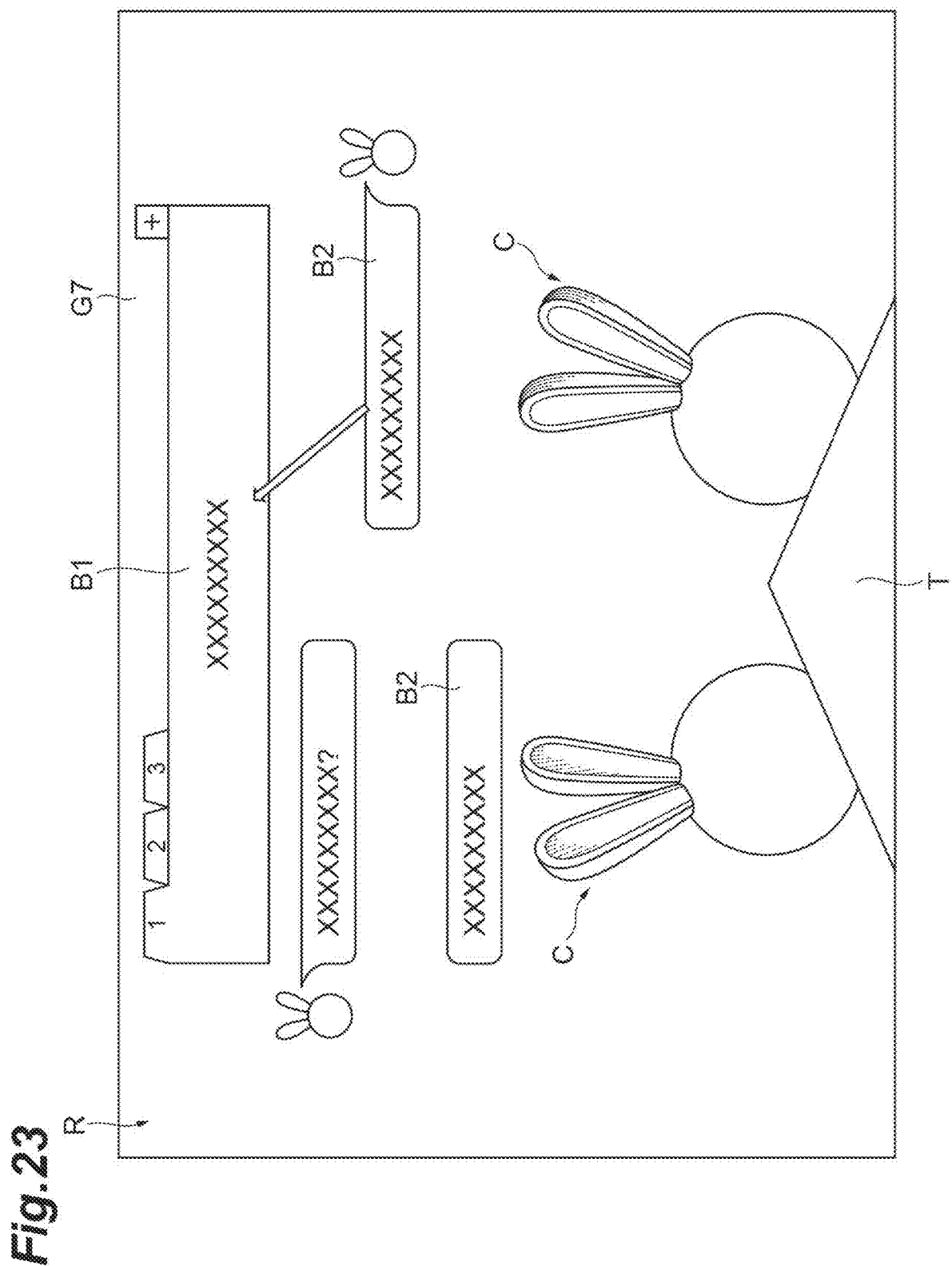
FIG. 23 is a diagram showing an example of a screen displayed in the virtual space.

As shown in FIG. 23, upon receiving the operation from users U1, U2, and U3 on the conversation text displayed on chat board B2, the conversation text is displayed on display board B1. For example, when users U1, U2, and U3 click on the conversation text displayed on chat board B2, the clicked conversation text is displayed on display board B1. Users U1, U2, and U3 may drag and drop the conversation text displayed on chat board B2 onto display board B1.

Figure 24:
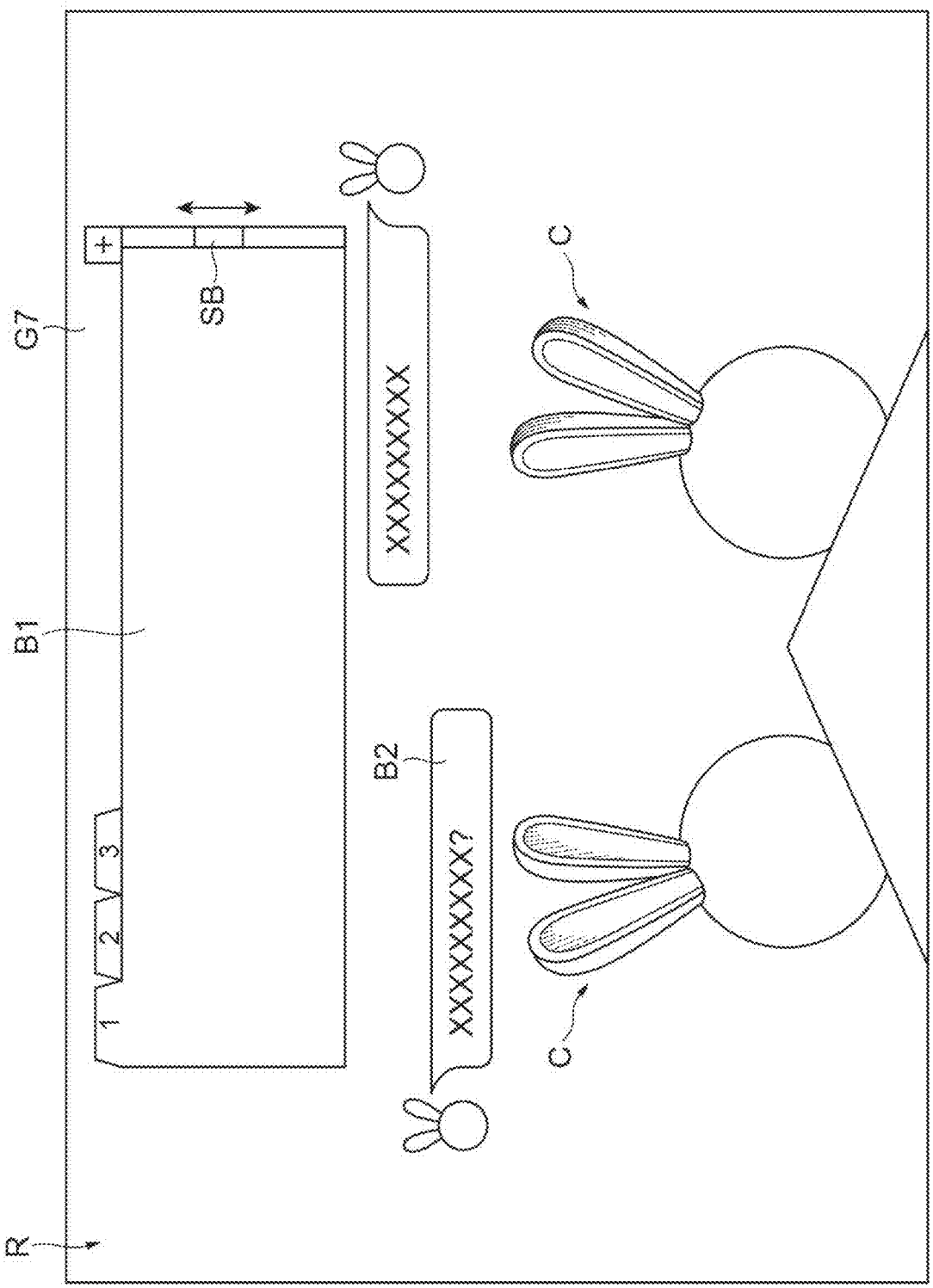
FIG. 24 is a diagram showing an example of a screen displayed in the virtual space.
Figure 25:
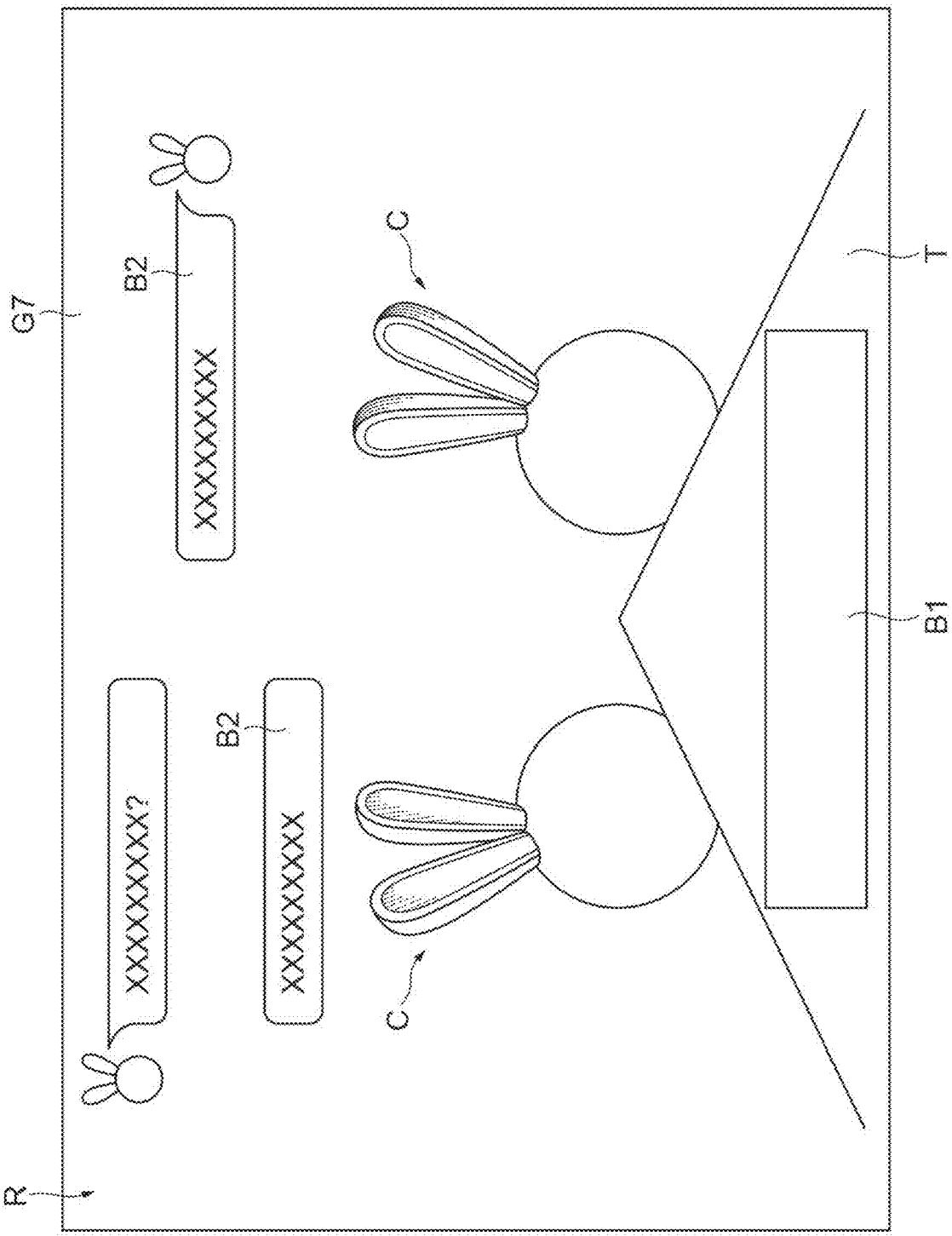
FIG. 25 is a diagram showing an example of a screen displayed in the virtual space.
Figure 26:
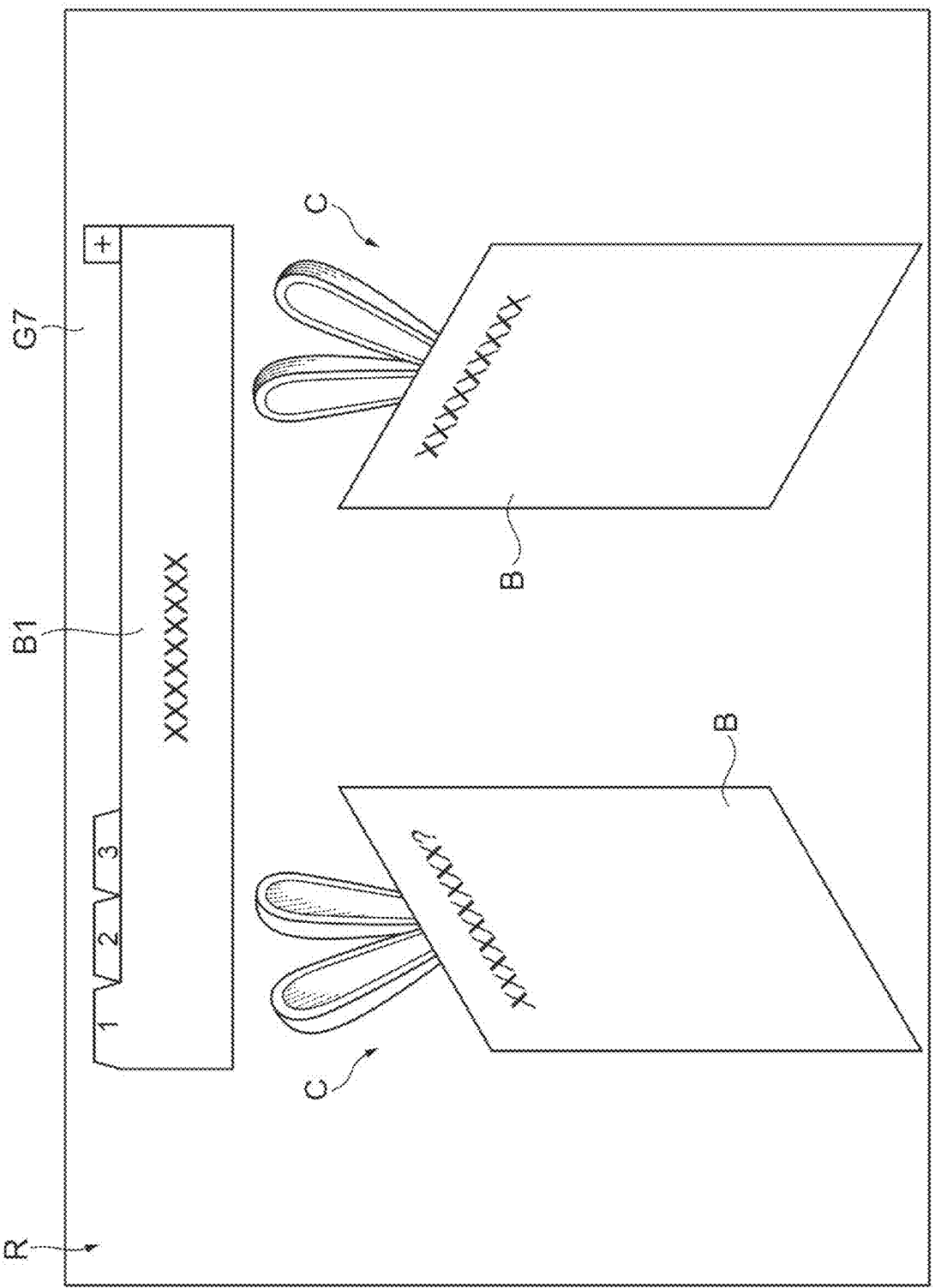
FIG. 26 is a diagram showing an example of a screen displayed in the virtual space.

As shown in FIG. 24, scroll bar SB may be provided on display board B1. Thus, a large amount of information can be displayed on display board B1. As shown in FIG. 25, display board B1 may be displayed on table T. As shown in FIG. 26, the conversation text may be displayed in body B of character C. The background of character C can be arbitrarily set by the counselor. The background may be set by selecting from a plurality of images or the like effective for counseling stored in advance, or may be created by a counselor.

The activity (participation in counseling) of character C in virtual space R can be recorded. The recording may be performed by the counselor or the client. When the counselor performs recording, the recorded video may be published to the client. Users U1, U2, and U3 can review the counseling by the recorded video.

Further, screen G7 on which the video of virtual space R is displayed may be created based on the video (or audio) of the real face-to-face counseling recorded video (or recorded audio). In this case, screen G7 displays character C of the counselor and the client. Ear animation E of character C may act in response to audio. The audio of character C may be the audio of users U1, U2, and U3, or may be the audio of users U1, U2, and U3 converted (voice-changed). Also, on screen G7, based on the recorded conversation details of the counselor and the client, conversation text indicating conversation details of character C converted into text is displayed on chat board B2 in a chat format. Users U1, U2, and U3 viewing the created video can display the conversation text on display board B1 by operating the conversation text displayed on chat board B2.

The video of virtual space R is effective for a review observation after counseling, and it is easy to obtain a new notice. In particular, the text display of conversation (words) on chat board B2 affects not only auditory stimulation in real conversation but also on visual stimulation, and it can be expected that the user can be more easily aware of the conversation. Further, since the conversion into text can be performed offline, it is not necessary to take into consideration delay or the like which is a problem in real-time display. Further, since the face of the client or the like is not displayed (the camera is not used) by using character C, it is effective for privacy protection. Further, if audio is output by using a voice changer, stronger privacy protection can be achieved. Conventionally, recording audio and video in counseling has not been widely used from the viewpoint of privacy protection, but this system facilitates review. Also, a supervisor can easily conduct guidance for the counselor.

Although the motion operation of character C is not performed in the real conversation, expressions such as the expansion of ear animation E by audio can be automatically expressed. When silence continues for a certain time, the expression of character C can also be emphasized by a color change or the like. Further, for example, by integrating the measurement values of a heart rate monitor attached to a wrist band and an acceleration sensor for physical shaking and the like, quantitative and objective data transmission and analysis can be performed.

(Activity 4)

Next, the activity 4 will be described. The activity 4 is, for example, entertainment. Examples of entertainment include musical performance, games, and the like. First, musical performance will be described.

Figure 27:
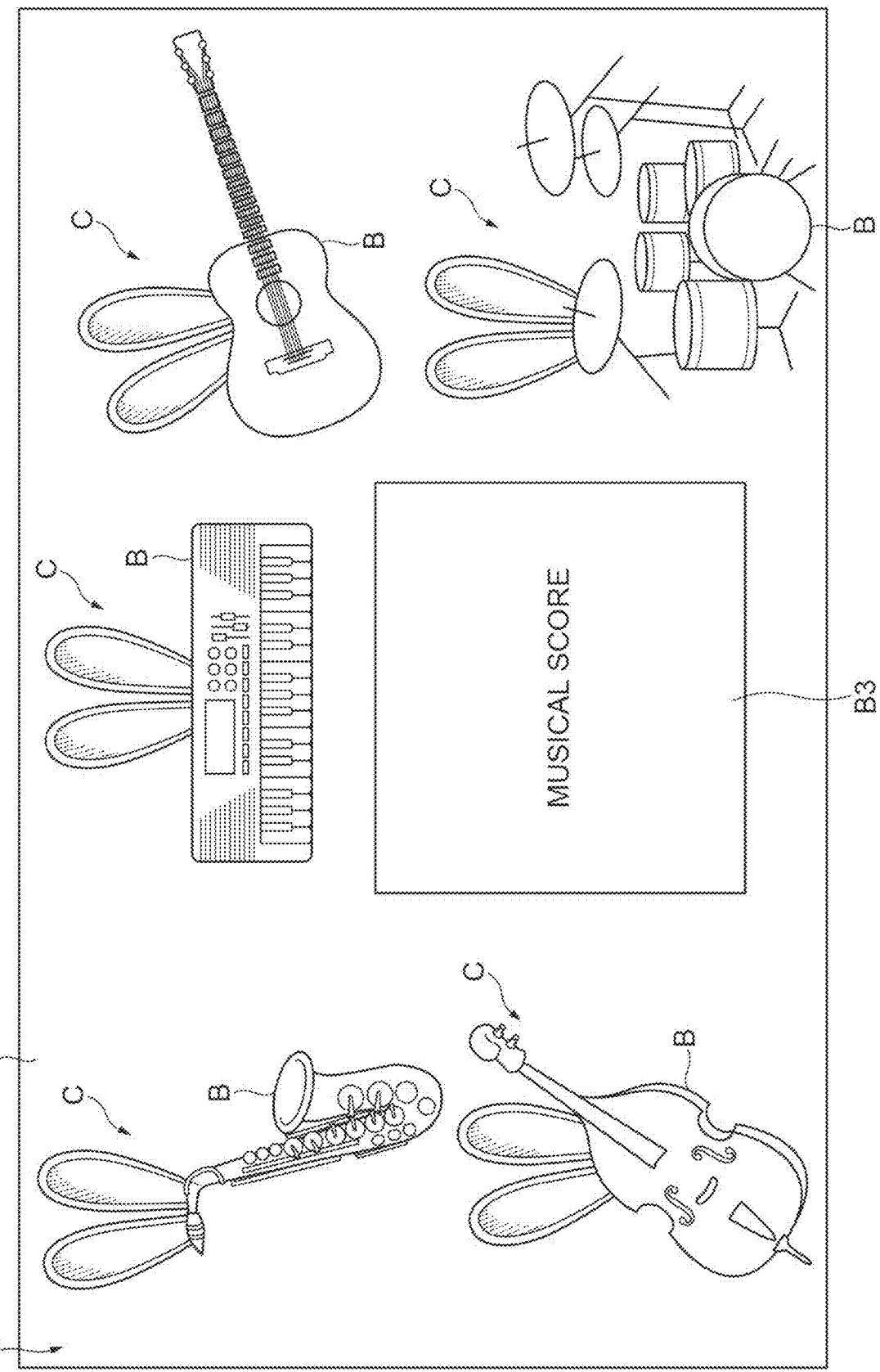
FIG. 27 is a diagram showing an example of a screen displayed in the virtual space.

In musical performance, character C of the performer can participate. As shown in FIG. 27, a display board B3 is displayed on a screen G8 on which the video of virtual space R of musical performance is displayed. FIG. 27 shows an example of a band performance.

Display board B3 displays a musical score and the like. The musical score and the like is a content based on the details of the activity of character C. That is, the musical score and the like displayed on display board B3 in the musical performance shows details (contents) of the musical performance in terms of the activity of character C participating in the musical performance. Display board B3 is displayed, for example, at the center of screen G8. The layout and size of display board B3 can be arbitrarily set. In display board B3, the display of the musical score may be changed (slid) in accordance with the performance.

Character C is displayed around display board B3. In the example shown in FIG. 27, bodies B of characters C are a guitar, a drum, a wood bass, a saxophone, and a keyboard. That is, the user of character C of body B as a guitar plays the guitar. Similarly, the user of character C of body B of the drum plays the drum.

The size of character C is also changed in accordance with the change in the size of display board B3. For example, when the size of display board B3 is increased, the size of character C is decreased. Character C is displayed in the outer area (margin) of display board B3 on screen G8. When the size of display board B3 is increased to the maximum, the size of character C can be reduced to about 10 mm. Display board B3 may be displayed in the full screen in screen G8. In this case, character C is displayed on display board B3.

Ear animation E of character C may act in response to the operations of users U1, U2, and U3. The motions of users U1, U2, and U3 can be detected by a sensor or the like. Control unit 12 generates control data of ear animation E based on the detected motions of users U1, U2, and U3.

Figure 28:
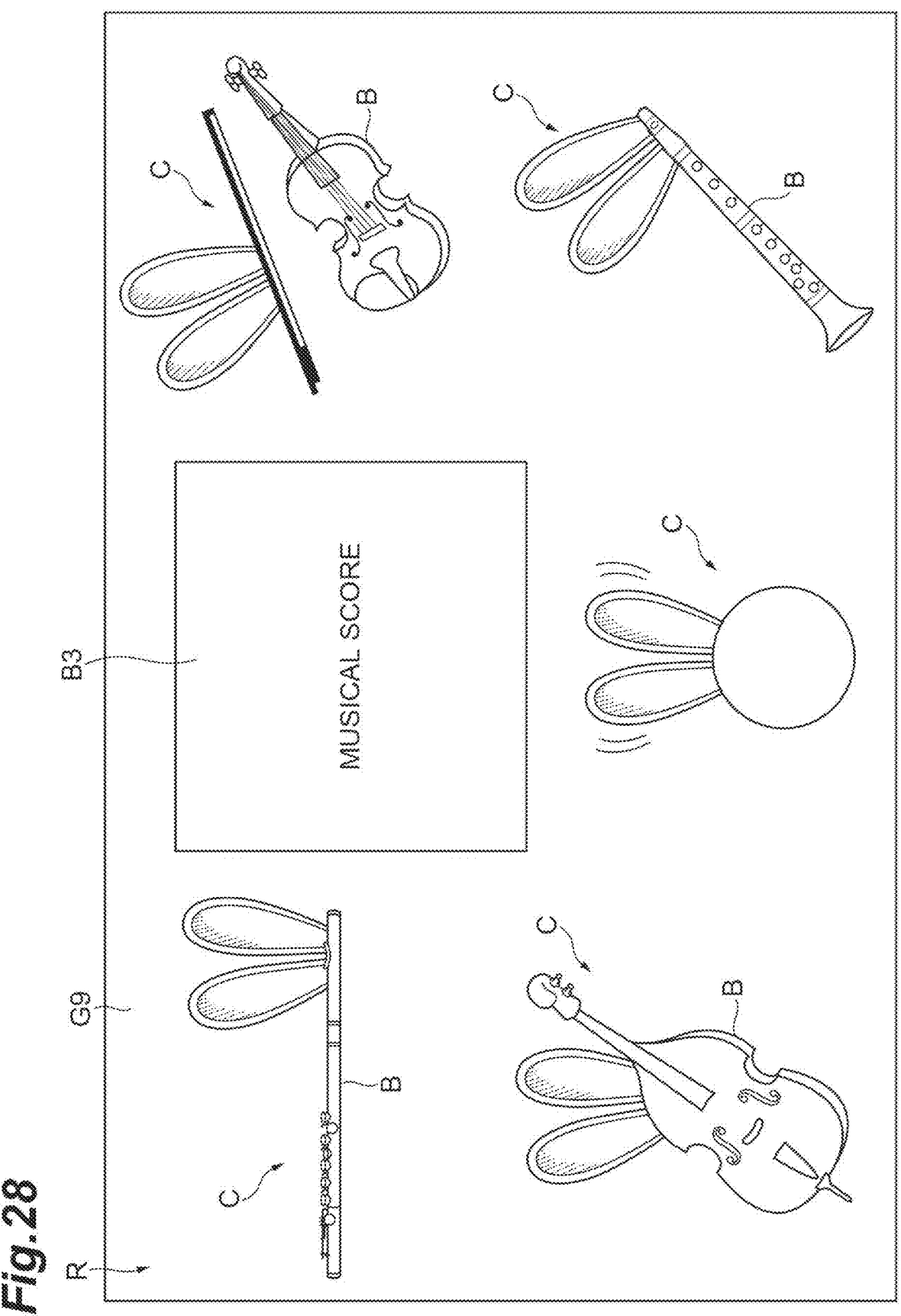
FIG. 28 is a diagram showing an example of a screen displayed in the virtual space.

As shown in FIG. 28, display board B3 is displayed on a screen G9 on which the video of virtual space R of musical performance is displayed. FIG. 28 shows an example of an orchestra performance.

Characters C are displayed so as to surround display board B3. In the example shown in FIG. 27, bodies B of characters C are a violin, a clarinet, a wood bass, or a flute. In the example shown in FIG. 28, character C as conductor is displayed. The motion of conducting by users U1, U2, and U3, which are the conductors, can be detected by a sensor or the like. Control unit 12 generates control data of ear animation E based on the detected motion of conducting by users U1, U2, and U3. Thus, ear animation E of character C of conductor performs the conducting. Thus, users U1, U2, and U3 of other character C can play the music while viewing the conducting.

Figure 29:
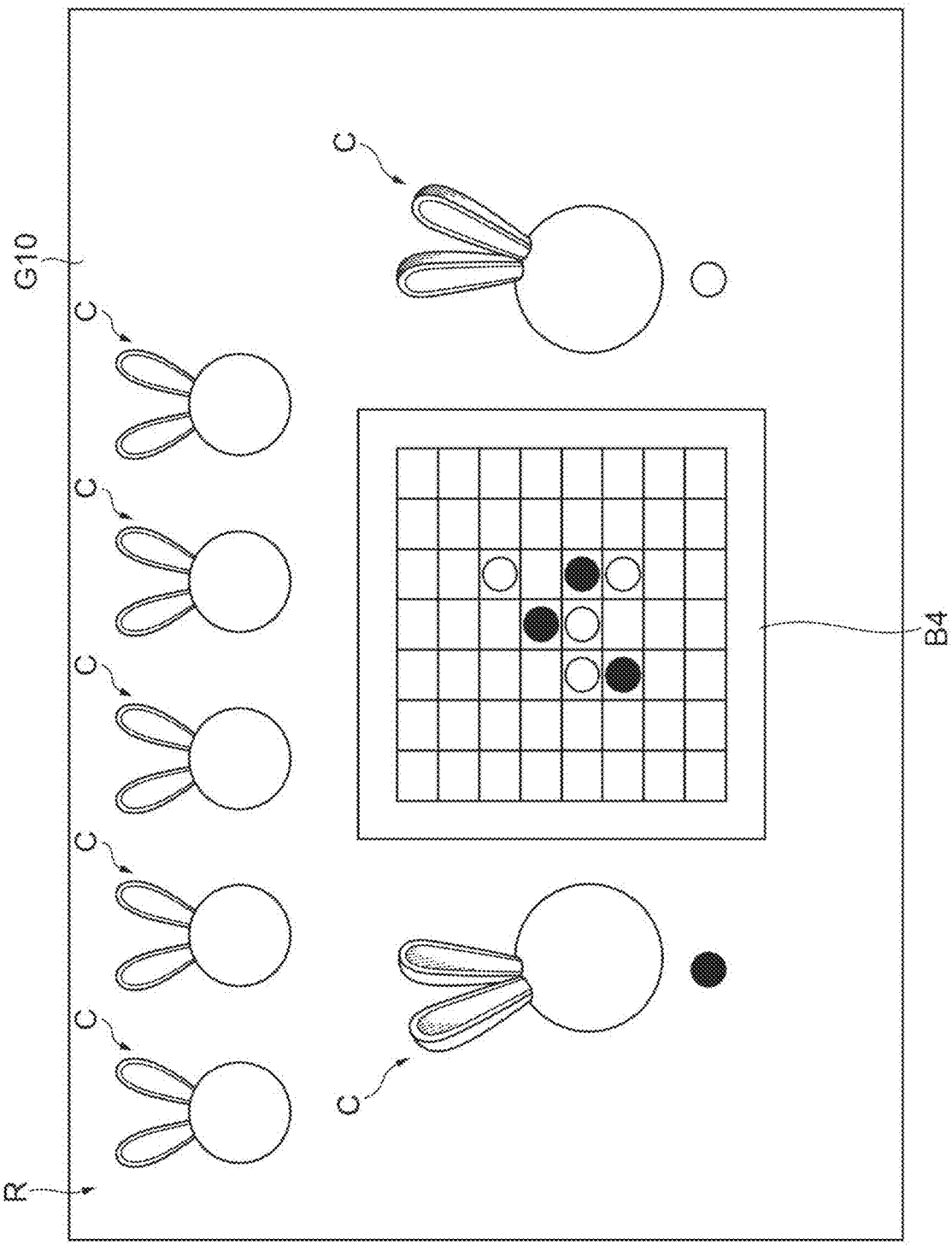
FIG. 29 is a diagram showing an example of a screen displayed in the virtual space.

Next, a game will be described. In the game, character C of a player of the game and character C of a spectator may participate. As shown in FIG. 29, a display board B4 is displayed on a screen G10 on which the video of virtual space R of the game is displayed. FIG. 29 shows an example of Go.

A game board which is a Go board is displayed on display board B4. The game board is a content based on the details of the activity of character C. That is, the game board displayed on display board B4 in the game shows the details (content) of the game in the activity of character C participating in the game. Display board B4 is displayed, for example, at the center of screen G10.

Figure 30:
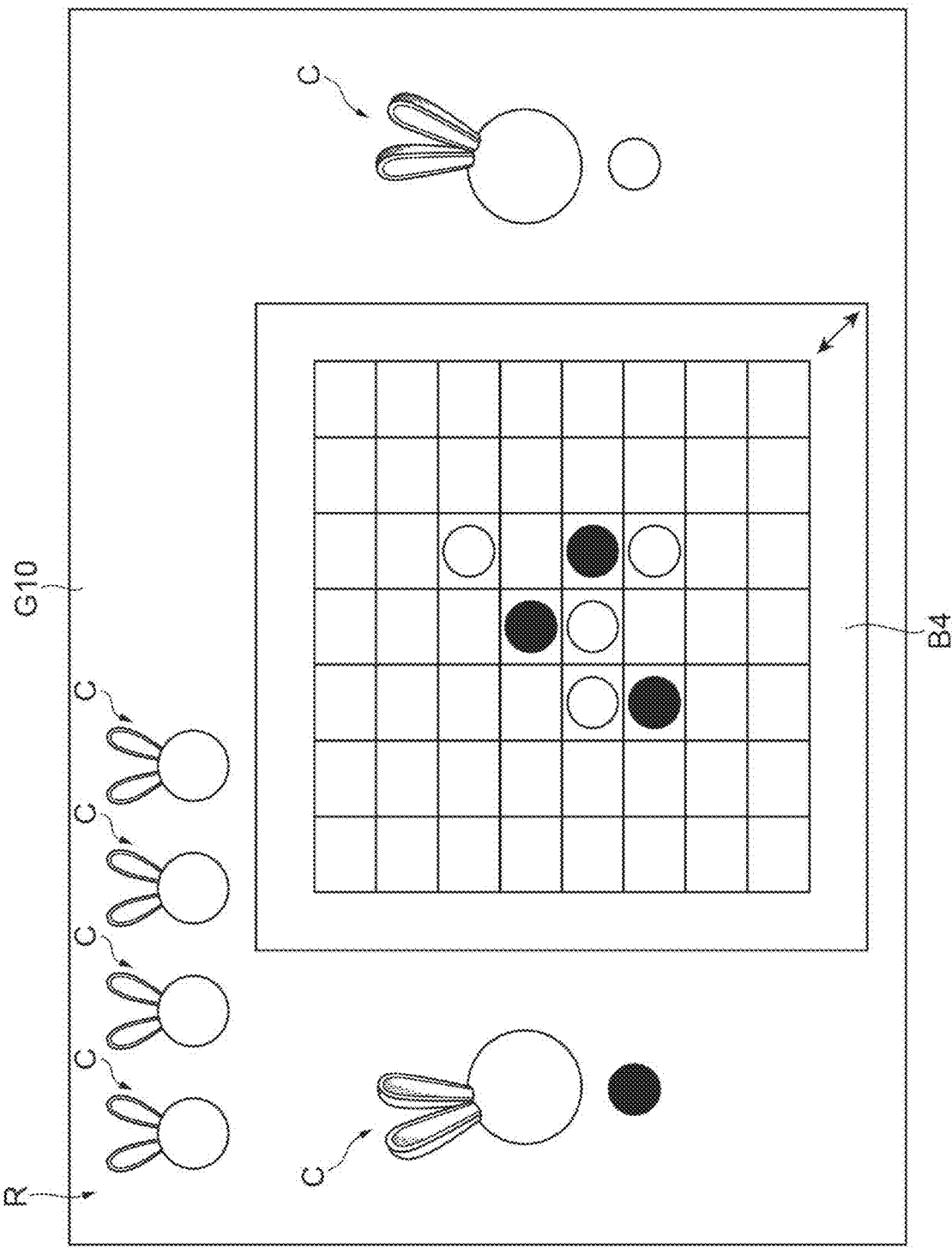
FIG. 30 is a diagram showing an example of a screen displayed in the virtual space.

Characters C as players are displayed so as to sandwich display board B4. Characters C as spectators may be displayed at the upper portion of screen G10. As shown in FIG. 30, display board B4 can be changed in layout and size. In the example shown in FIG. 30, display board B4 is displayed in an enlarged manner. The size of character C can be reduced in accordance with the enlargement of display board B4.

The activity (musical performance, game, etc.) of character C in virtual space R can be recorded. The recording may be performed by the administrator or by all the participants. When the administrator performs recording, the recorded video may be made public to the participants. Users U1, U2, and U3 can review musical performance, games, and the like by the recorded video.

(Activity 5)

Figure 31:
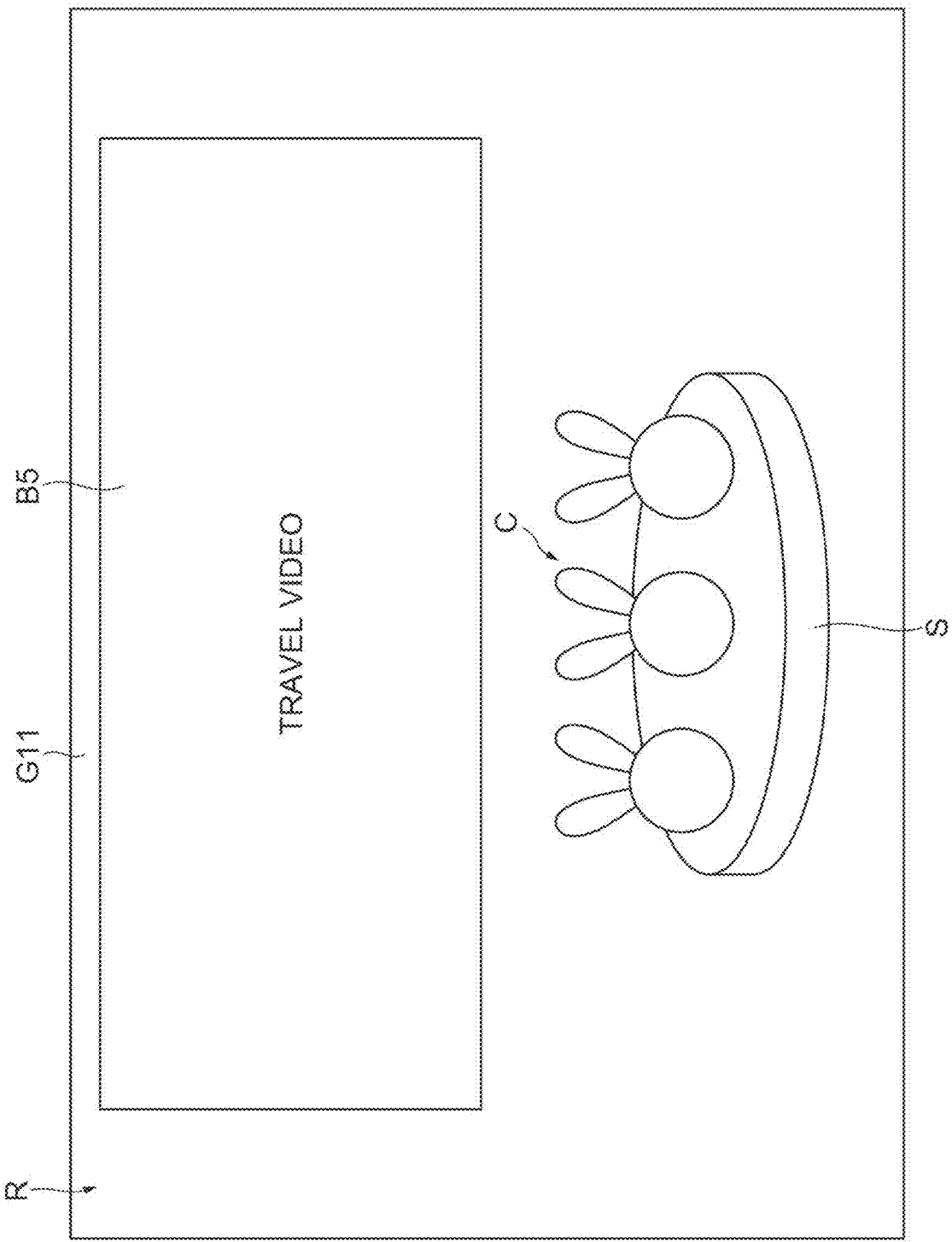
FIG. 31 is a diagram showing an example of a screen displayed in the virtual space.

Next, the activity 5 will be described. The activity 1 is sightseeing, appreciation (sports appreciation, movie appreciation, concert appreciation), or the like. First, sightseeing will be described as an example. In sightseeing, character C of a sightseer can participate. As shown in FIG. 31, on a screen G11 on which the video of virtual space R for sightseeing is displayed, a display board B5 and a moving stage (movable object) S are displayed.

Display board B5 displays a video of a tourist spot or the like. The video of the sightseeing spot or the like is content based on the details of the activity of character C. That is, the video of the sightseeing spot or the like displayed on display board B5 in the sightseeing shows the details (contents) of the sightseeing in terms of the activity of character C. Display board B5 is displayed, for example, in the upper portion of screen G11.

Display board B5 is operable for a sightseeing organizer. The organizer can operate the display details to be displayed on display board B5 on the predetermined operation screen. The operation screen is displayed on output unit 15 of the organizer when the organizer taps (clicks) display board B5, for example. On the operation screen, the video can be displayed on display board B5, and the displayed video can be input by handwriting.

The layout and size of display board B5 can be arbitrarily set by the administrator. The administrator is, for example, an organizer in the case of sightseeing. Screen G11 of the administrator may display information of the participant, guide information, and the like.

Character C is arranged in moving stage S. Moving stage S is provided in a movable manner. Moving stage S is operated by users U1, U2, and U3. That is, users U1, U2, and U3 can move moving stage S to an arbitrary position. Further, each of users U1, U2, and U3 can arbitrarily change the display viewpoint. For example, the viewpoint can be rotated in 3D.

Figure 32:
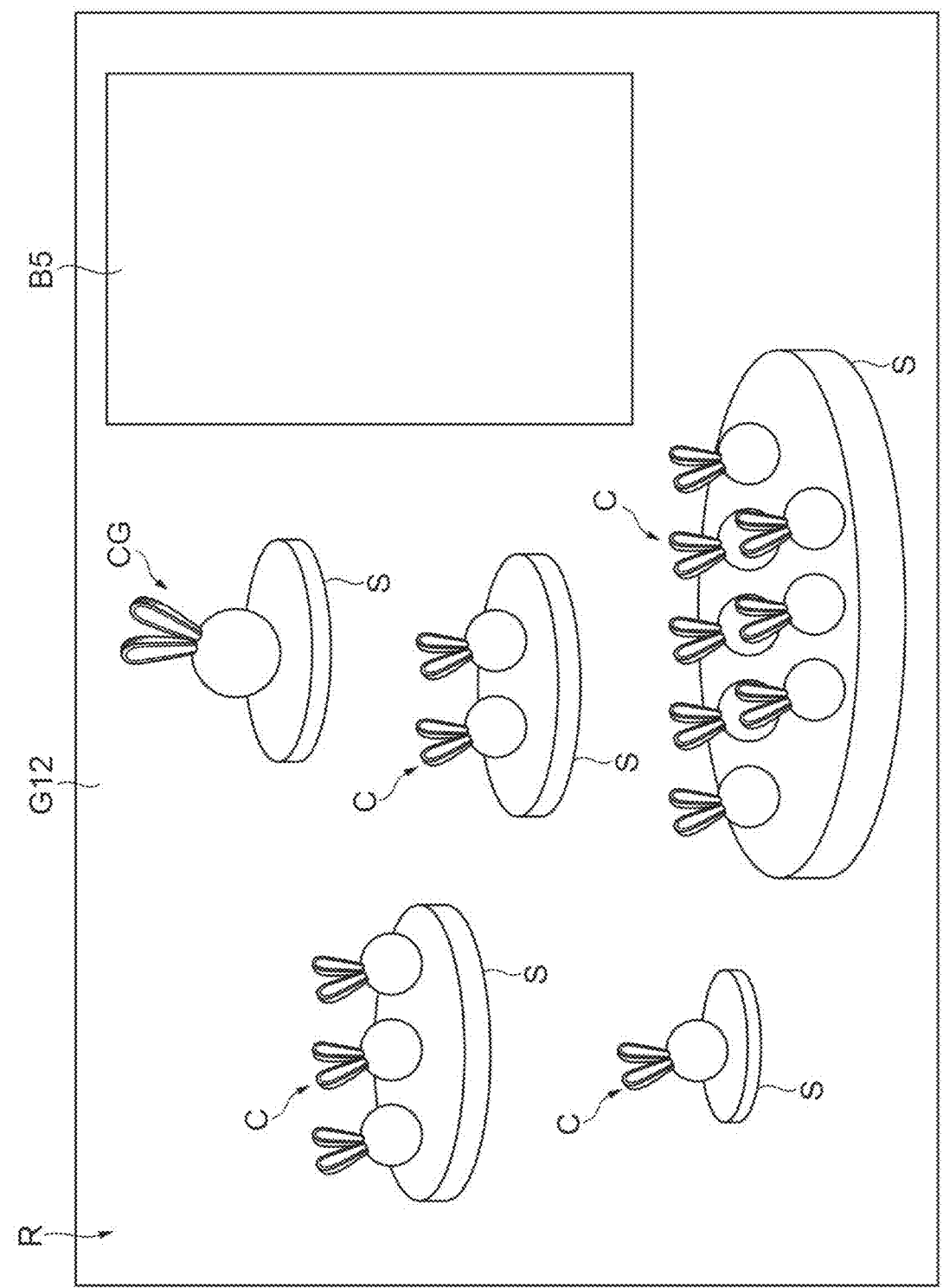
FIG. 32 is a diagram showing an example of a screen displayed in the virtual space.

As shown in FIG. 32, display board B5 and a plurality of moving stages S are displayed on a screen G12 on which the video of virtual space R for sightseeing is displayed. In the example shown in FIG. 32, a character CG of the guide can participate in addition to characters C of the tourists. In the example shown in FIG. 32, the video and the like displayed on display board B5 can be explained by the guide. At this time, the audio of the guide is transmitted to all characters C in virtual space R. In addition, audio of one or more characters C arranged on one of the plurality of moving stages S and audio of one or more characters C arranged on the other of the plurality of moving stages S can be configured so as not to be audible to each other. Users U1, U2, and U3, which are guides, control the on/off of audio in accordance with the situation.

Figure 33:
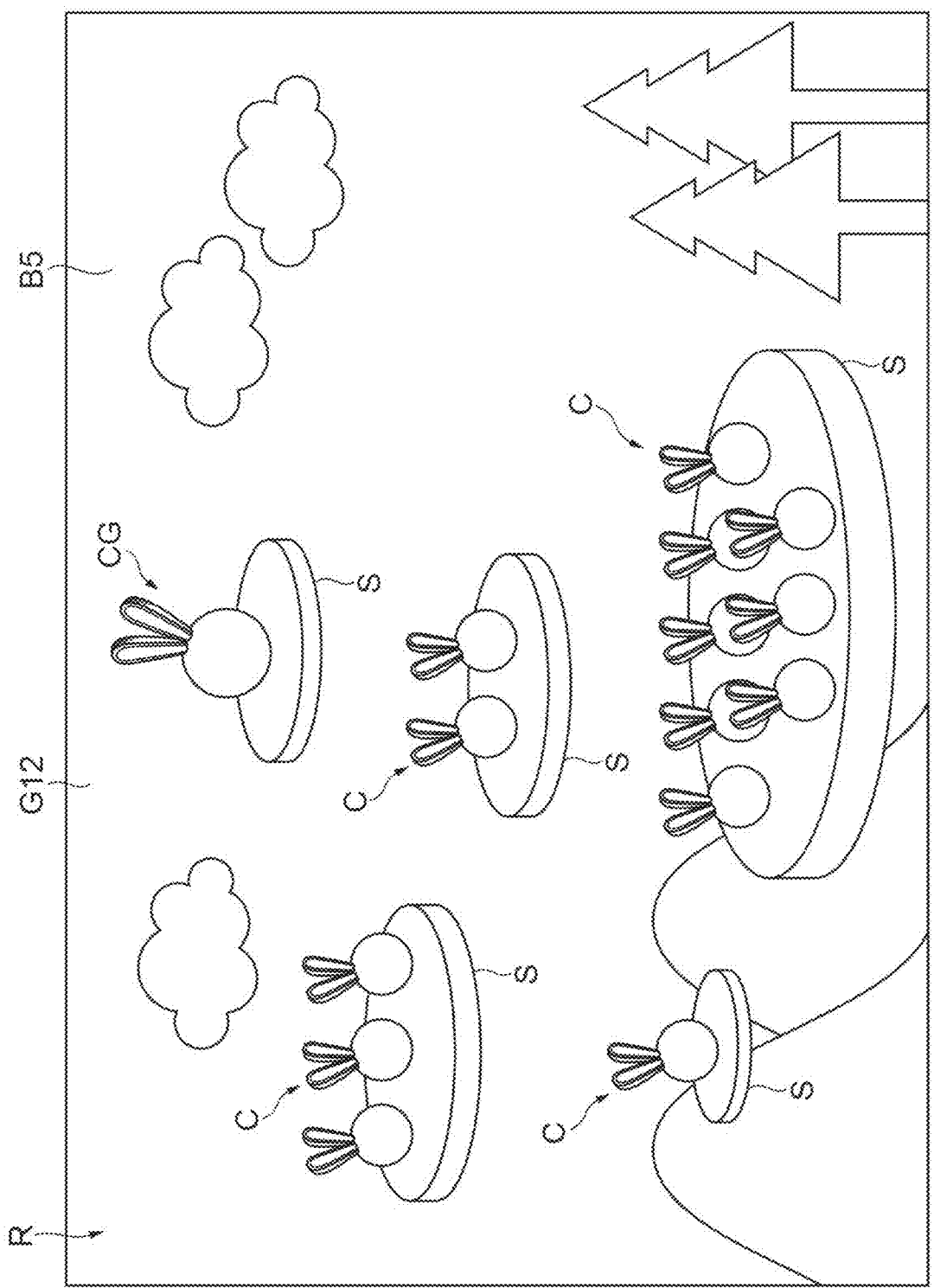
FIG. 33 is a diagram showing an example of a screen displayed in the virtual space.

As shown in FIG. 33, display board B5 may be displayed in the full screen in screen G12. In this case, character C and moving stage S are displayed on display board B5 in an overlapping manner. That is, character C and moving stage S are displayed on the video displayed on display board B3. In this case, sightseeing with a sense of presence can be achieved.

Figure 34:
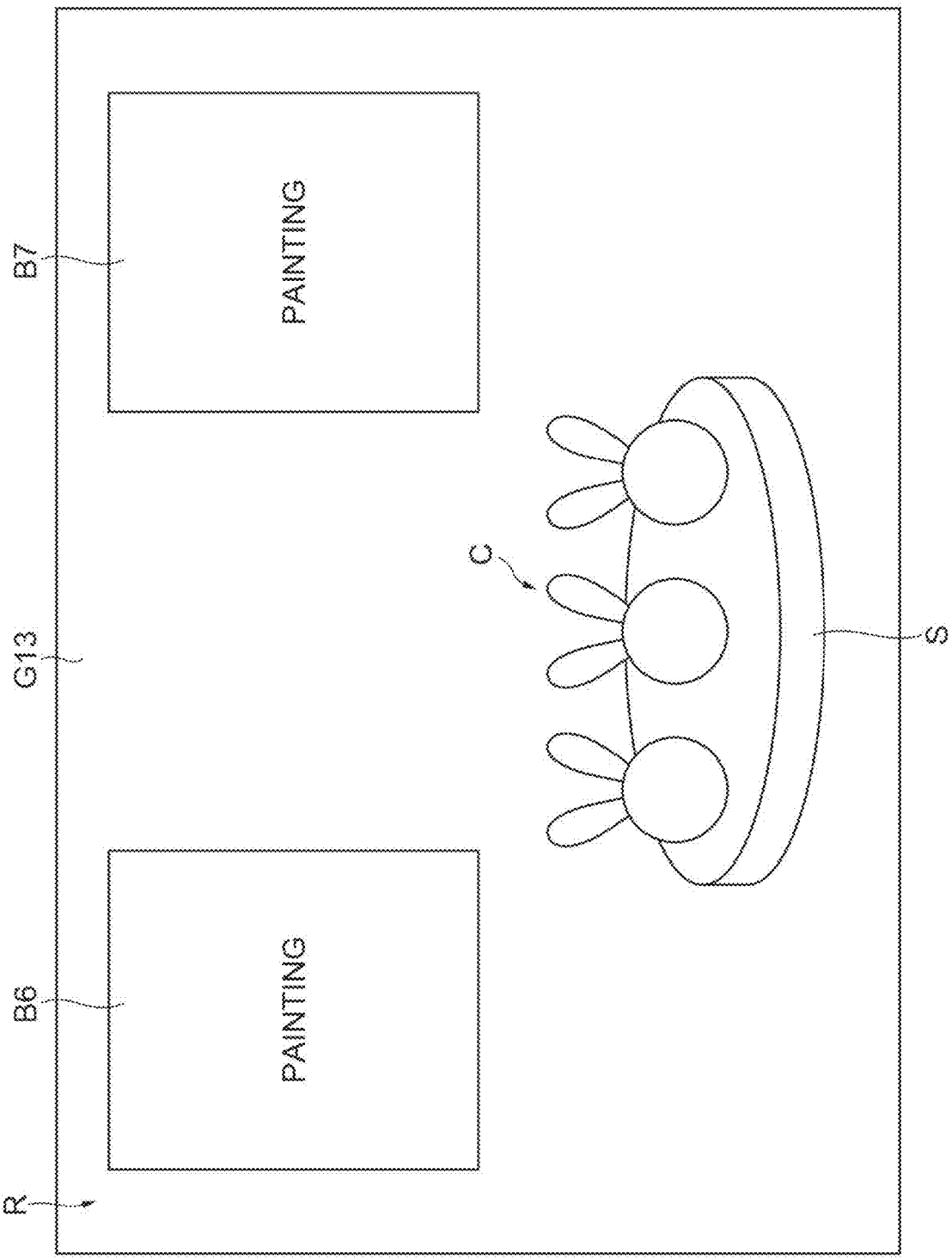
FIG. 34 is a diagram showing an example of a screen displayed in the virtual space.
Figure 35:
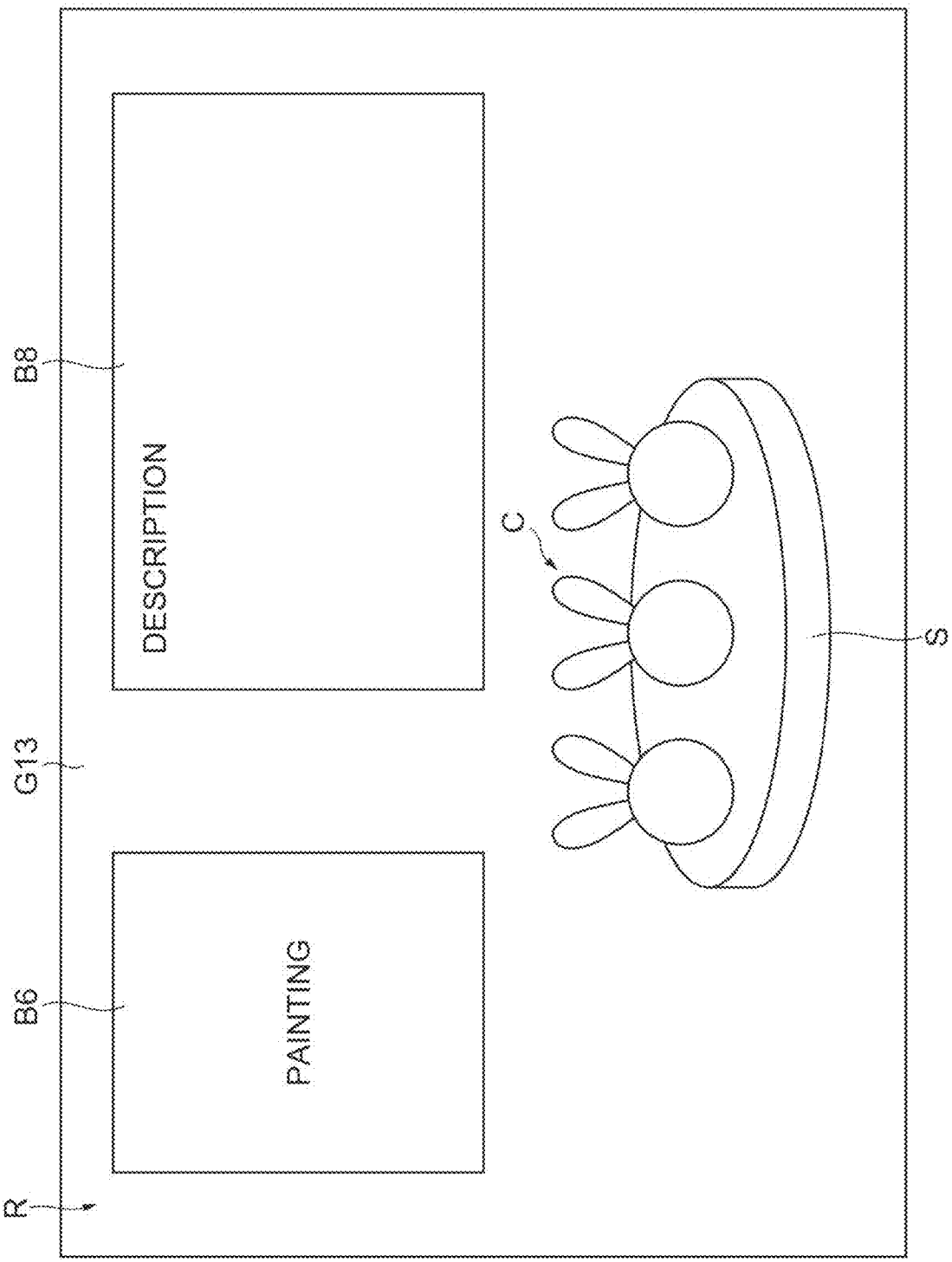
FIG. 35 is a diagram showing an example of a screen displayed in the virtual space.

Next, appreciation of a painting will be described as an example. In the appreciation, character C of an appreciator can participate. As shown in FIG. 34, display boards B6 and B7 and moving stage S are displayed on a screen G13 on which the video of virtual space R for the appreciation is displayed. As shown in FIG. 35, for example, when display board B6 is clicked, a display board B8 is displayed. Display board B8 displays a description of the painting displayed on display board B6.

(Activity 6)

Figure 36:
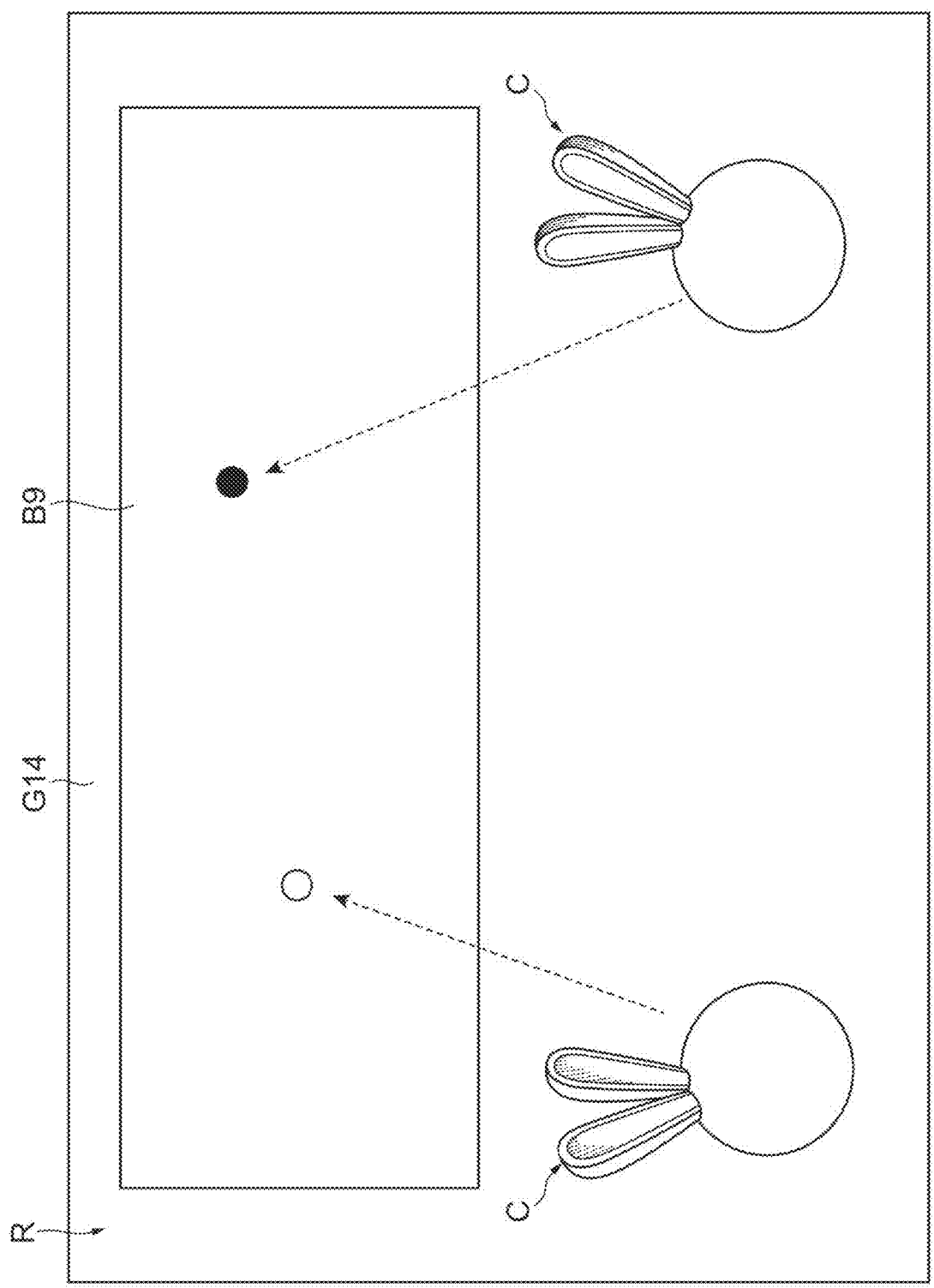
FIG. 36 is a diagram showing an example of a screen displayed in the virtual space.

The activity 6 is, for example, video creation. In video creation, ear animation E of character C is output as an editable video in the activity in the virtual space. As shown in FIG. 36, for example, a display board B9 and two characters C are displayed on screen G13 on which the video of virtual space R to be created is displayed. Various contents may be displayed on display board B9. Character C explains details displayed on display board B9 by using the pointer. The pointers can be color-coded for each character C. Thus, character C which explains using the pointer can be recognized. Further, the direction of character C may be automatically rotated in accordance with the display and position of the pointer. In this way, character C rotates in response to (in conjunction with) the movement of the pointer, thereby increasing the sense of presence of the explanation.

In the created video, the action of ear animation E of character C, the layout and size of character C, the layout and size of display board B9, and the details to be displayed on display board B9 can be edited. The created video can be uploaded to a moving image sharing service or the like.

Effects

As described above, in system 100 according to the embodiment, upon performing an operation related to the action of character C in the first screen including character C and the content based on the details of the activity, the display is transitioned to the second screen including character C corresponding to character C of the first screen. For example, in the activity 1, when ear animation E of the plurality of characters C performs the action of raising hand in response to the operations of users U1, U2, and U3, raiser-of-hand window W5 is displayed instead of material window W4. In raiser-of-hand window W5, characters C for which ear animation E performed the action of raising hand are displayed in the order of the action. In this way, in system 100, the screen transition can be performed in accordance with the moving of character C that acts by the intentional operation of one of users U1, U2, and U3. Therefore, in system 100, when character C performs the activity in virtual space R, the improvement of the convenience of users U1, U2, and U3 who use character C is achieved.

The operation related to the action of character C may include, in addition to moving characters C of users U1, U2, and U2 or causing characters C to display the display portion, generating a display portion in another character C (character C of the AI or the like) by performing text input (keyboard input, audio input, or the like) on the display portion of character C. The activating of ear animation E in response to one of the operations of users U1, U2, and U3 may include the acting (responding, operating) of ear animation E of other characters C in response to the operations of users U1, U2, and U3 in addition to the activating of ear animation E of character C of user by one of the operations of users U1, U2, and U3. By inducing the screen transition and the action of ear animation E of another character C in conjunction with text input, audio operation, and the like of characters C of users U1, U2, and U3, dynamic communication with a more rich sense of reaction and presence than communication with text display only can be provided.

Character C included in the first screen (hereinafter, also referred to as "first character C") and character C included in the second screen (hereinafter, also referred to as "second character C") correspond to each other. A first character C and a second character C may have the same forms (appearance, shape) or different forms. For example, the first character C included in the first screen and the second character C included in the second screen may have the same form of body B before and after the transition of the screen (for example, the state shown in the pattern A of FIG. 5). For example, the first character C included in the first screen may be in the state shown in the pattern A of FIG. 5, and the second character C included in the second screen may be in the state where body B is deformed to be material window CW as shown in FIG. 18. Further, for example, the first character C included in the first screen and the second character C2 included in the second screen may be different in color or pattern, or may be different in function. In short, character C corresponding to character C of the first screen should be included in the second screen.

Character C means that ear animation E imitating ears is a component of each of the avatars of users U1, U2, and U3. Each character C has a non-verbal information method for expressing the states and emotions of users U1, U2, and U3 through ear animation E. In characters C, the presence or absence of face information of users U1, U2, and U3 is not considered.

In system 100 according to the embodiment, in the activity 1, moderator window W1 and presenter window W2 for displaying character C serving as the leader of the activity and participant window W3 for displaying character C serving as the participant of the activity are displayed. The size of character C displayed in moderator window W1 and presenter window W2 may be displayed larger than character C displayed in participant window W3. In this configuration, the size of character C of the leader for explaining the lecture material is displayed larger, and thus the explanation can be easily understood.

In system 100 according to the embodiment, when ear animation E of character C of the participant performs the action indicating raising hand in the activity 1, raiser-of-hand window W5, in which character C is moved from participant window W3 and displayed and the output of the audio of character C in virtual space R is restricted, and speaker window W6, in which at least one character C among characters C displayed in raiser-of-hand window W5 is moved from raiser-of-hand window W5 and displayed and the audio of character C can be output in virtual space R, are displayed. In response to the moving of character C from raiser-of-hand window W5 to speaker window W6, the audio of character C can be output in speaker window W6.

In the above configuration, when ear animation E of character C performs an action indicating raising hand, character C is displayed in raiser-of-hand window W5, and thus the leader can easily recognize character C who performed the action of raising hand. In addition, since the audio output is automatically switched on and off in response to the moving of character C from raiser-of-hand window W5 to speaker window W6, the time and effort for performing the on/off operation can be omitted. Furthermore, since only the audio of character C displayed in speaker window W6 is output, it is possible to help prevent the occurrence of a situation in which the audio of a plurality of characters C displayed in raiser-of-hand window W5 are output at the same time and the audio cannot be heard.

In system 100 according to the embodiment, from tens to hundreds of students may participate in the lecture in the activity 1. In this case, when the video (real video) of all the participants is displayed in virtual space R or when the avatar having the face expression is displayed, a considerable amount of transmission capacity is required. This causes slow operation or degraded video. In this regard, system 100 displays character C that does not include the face expression that dynamically changes. Therefore, even in a lecture or the like in which a large number of people participate, a reduction in transmission capacity is achieved. Therefore, smooth activity is possible. In addition, when the video of the student or the like is displayed, it is difficult to check the state or reaction of the student or the like. In this regard, in system 100, the state and reaction of the student or the like are indicated by the action of ear animation E of character C which is easy to visually recognize. Therefore, in system 100, the state and the reaction of the student or the like can be easily confirmed.

In system 100 according to the embodiment, when the size of one character C among the plurality of characters C displayed in virtual space R is changed in the activities 2 to 5 and the like, the size of other characters C may be changed in the same manner. In this configuration, since the size of all characters C is changed in the same manner, it is possible to achieve the activity with a sense of unity in virtual space R.

In system 100 according to the embodiment, upon receiving an operation of dragging and dropping character C to material window W9 in the activity 2, the predetermined function is executed in material window W9. Specifically, material window W9 is changed to a material window WC in which is operable by users U1, U2, and U3 of character C. In this configuration, by performing an operation involving character movement, such as dragging and dropping a character, unlike a simple button click, it is possible to expect an effect of facilitating the moving time sensation of character C, feelings of participation in the moving operation, and empathy with character C with new scene switching or the like. This operation is considered to be similar in spirit to dragging and discarding a document in a trash box on the screen, for example. Although the deletion click operation is preferable for quick processing, it is considered that when an event is generated with careful consideration, provision of the operation time makes it possible to create a sense of preparation for scene movement in response to a more natural sense.

Note that, when auditory stimulation or sounds such as sound effects or short BGM is used in combination in accordance with scene switching or details of a change in ear animation E, the improvement in the communicability and recognizability of scene generation and switching can be expected. By associating the details of the change with the sound, the change can be easily recognized through the sound, and communication can be made more rich.

In system 100 according to the embodiment, the execution of the predetermined function is terminated in the activity 2 upon receiving an operation of dragging and dropping character C displayed in the material window WC to an area other than the material window WC after character C is dragged and dropped to material window W9. Specifically, the display is changed from the material window WC to material window W9. In this configuration, by performing an operation involving character movement, such as dragging and dropping a character, a leaving process and a leaving sensation can be generated.

In system 100 according to the embodiment, display board B1 for displaying contents and chat board B2 for displaying conversation texts converted into text from audio of character C are displayed in virtual space R of the activity 3. On chat board B2, a predetermined number of conversation texts are displayed from the latest one in time series among a plurality of conversation texts created based on the audio of character C. According to this configuration, in counseling, the user can proceed with counseling while checking the content (consultation details or the like) which is the purpose of counseling and the details of the conversation. Therefore, the effective counseling can be achieved.

In addition, character C is used in counseling in virtual space R. Thus, even when the client does not want to display the face, the non-verbal information such as nodding, consent, and questions from the client can be displayed by ear animation E. Also, since character C has no dynamically changing eyes, the counselor and client can see the screen without worrying about each other's gaze. In the screen, since the conversation text based on the audio of character C is displayed on chat board B2, the user can pay attention to the speech of character C.

The conversation text displayed on chat board B2 is not displayed as the conversation progresses. In counseling, it is important to extract words that are keywords in a conversation and deepen the conversation. It is preferable that the extraction of the words is performed without disturbing the flow of the conversation as much as possible. Therefore, in system 100, upon receiving operations from users U1, U2, and U3 on the conversation text displayed on chat board B2, the conversation text is displayed on display board B1. Thus, new items, important items, and the like generated in the conversation can be displayed on display board B1. Therefore, the words can be extracted without disturbing the flow of the conversation.

In system 100 according to the embodiment, characters C are displayed around display board B3 in the activity 4. In system 100, the motions of users U1, U2, and U3 may be detected, and ear animations E may act based on the motions of users U1, U2, and U3. In this configuration, when character C plays a musical instrument, the rhythm of the musical instrument actually played by the corresponding one of users U1, U2, and U3 can be reflected in ear animation E. Thus, in the musical performance, activity with a sense of unity and presence can be achieved.

In system 100 according to the embodiment, one or more characters are arranged in the activity 5, and one or more moving stages S provided in a movable manner in virtual space R are displayed. In this configuration, character C can be moved on moving stage S in virtual space R. Thus, for example, activities such as sightseeing and art gallery appreciation can be performed while being carried on moving stage S. The user can obtain a sense of presence by moving on moving stage S. Further, a plurality of characters C move on moving stage S, thereby obtaining a sense of unity.

In system 100 according to the embodiment, in the activity 5, a plurality of characters C are arranged on each of a plurality of moving stages S such that audio of the plurality of characters C arranged on one of the plurality of moving stages S and audio of the plurality of characters C arranged on the other of the plurality of moving stages S are inaudible to each other. In this configuration, characters C can have a conversation with each group of characters C on moving stage S. Therefore, it is possible to have a conversation without being concerned about users U1, U2, and U3 in the other groups.

In system 100 according to the embodiment, the animation of character C is output as an editable video for the activity in virtual space R in the activity 6. In this configuration, after the activity is created as a video, the animation can be edited. Therefore, in the post-editing of the video, the effect of ear animation E of character C can be added or changed.

In system 100 according to the embodiment, the activity of character C in virtual space R is recorded and output. In this configuration, the activity of the character in virtual space R can be reviewed later.

In system 100 according to the embodiment, character C is made to rotate in accordance with the position of the predetermined object so as to give the impression that character C is gazing at the predetermined object. In this configuration, character C rotates so as to give the impression of gazing at the predetermined object (focusing on the direction of the predetermined object) in response to the screen transition and the change in at least one or more of the form, state, and function of character C. This allows the user to give the impression that the user is gazing at the predetermined object or is interested in the predetermined object, like a gaze movement or a posture change with respect to an object of interest in a person or a change object. The rotation of character C produces a non-verbal communication effect similar to the change of the line of sight or the posture, and expresses a positive interest in the conversation. Therefore, rich communication can be achieved, such as improvement in the sense of reaction to the conversation and improvement in the sense of presence.

The rotation of character C in the embodiment may be expressed by the rotation of ear animation E of character C or the rotation of body B of character C. The direction of rotation is not necessarily limited to the center of the gaze region. The gaze in the embodiment may be, for example, not the gaze of the partner's eyes as the object but a gaze that gives the impression of the direction of the predetermined object such as the chest of the partner or the general direction of the partner, when the predetermined object is a person. The rotation angle may be small when the mood of interest is conveyed by the rotation in the gaze region direction.

Although the embodiments of the present disclosure is described above, the present disclosure is not necessarily limited to the above-described embodiments, and various modifications can be made without departing from the scope of the present disclosure.

In the above embodiment, ear animation E is activated by any one of "nodding", "agreeing", "clapping", "questioning", "raising hand", and "showing surprise". However, the action of ear animation E in accordance with the user's operation is not limited thereto. The action of ear animation E may be another action or may further include another action. The bending angle and the speed of ear animation E can be appropriately set (changed). Thus, a subtle emotion can be expressed, and the intensity of the emotion expression can be adjusted (strengthened or weakened). In ear animation E, when the strength of the motion is set to be relatively strong, for example, the expression of non-verbal information of a person who has difficulty in expressing emotion can be supported by the expression of the details, strength, and speed of the motion of ear animation E. Further, for communications between cultures having different non-verbal information expressions, the operation mode can be changed in accordance with the cultures of users U1, U2, and U3.

In the above embodiment, operation device 50 detects the motions of hands H or fingers F of users U1, U2, and U3. However, hands H or fingers F of users U1, U2, and U3 may be detected by an image sensor (a camera, a laser, or the like).

The actions of ear animations E are basically executed based on the operations of users U1, U2, and U3, but expressions of users U1, U2, and U3 (face recognition by a camera), audio of users U1, U2, and U3, expression control by artificial intelligence (AI), and the like may be combined.

The operation of character C is not limited to a person, and may be performed by an AI (Chat GPT, Siri (registered trademark), Google assistant (registered trademark), Alexa (registered trademark), or Cortana (registered trademark)). That is, the user who operates character C may be the AI. The user means an object for operating character C. The words spoken by the AI are displayed as text, and the action corresponding to the state and emotion of the AI at that time is expressed by ear animation E. For example, when the AI understands and think "OK", the "OK mark" is operated in ear animation E of the AI, and when the AI cannot understand and think "no good", the "no good mark" is operated in ear animation E of the AI. When the AI finds a good proposal, it may cause ear animation E to perform the action of "clapping" or the operation of changing ear animation E into two exclamation marks. The emotion of the conversation partner may be read by the AI and made to react by the action of ear animation E. Since AI does not have inherent face information and figure information, expressing the non-verbal information of AI by ear animation E can make communication creatively rich.

The animation imitating ears is not limited to the ears themselves, and may be an animation similar to ears. The animation imitating ears may be designed to be associated with ears. The animation imitating ears may be a deformation of the ears with the ears as a basic shape.

In the above embodiment, the operation device may be any device as long as it can detect acceleration and angular velocity. The operation device may be, for example, a mobile phone (such as a smartphone) having a display (display portion) for displaying ear animation E. In the case of a mobile phone, the action data is generated by operating the mobile phone in the same manner as operation device 50.

In the above embodiment, the mode in which the control data is generated in terminal 10, terminal 20, and terminal 30 has been described as an example. However, the control data may be generated by server 40. In this configuration, terminal 10, terminal 20, and terminal 30 transmit action data to server 40, and server 40 generates control data based on the action data.

The above embodiment is described by taking as an example the mode in which body B, ear animation E, and the like are displayed on terminals 10, 20, and 30. However, when the terminal is a wearable terminal or a head mounted display (HMD) terminal, body B, ear animation E, and the like may be displayed on a lens or the like, or may be displayed as a hologram. That is, character C is displayed in the cyberspace. The cyberspace may include virtual reality (VR), augmented reality (AR), and mixed reality (MR).

In the above embodiment, the example shown in FIG. 18 is described by taking as an example the mode in which the display is switched from material window W9 to the material window WC by dragging and dropping (dragging in) character C to material window W9. However, the switching of the display to the material window, that is, the method of displaying the display portion on body B may be performed by another method.

Figure 37:
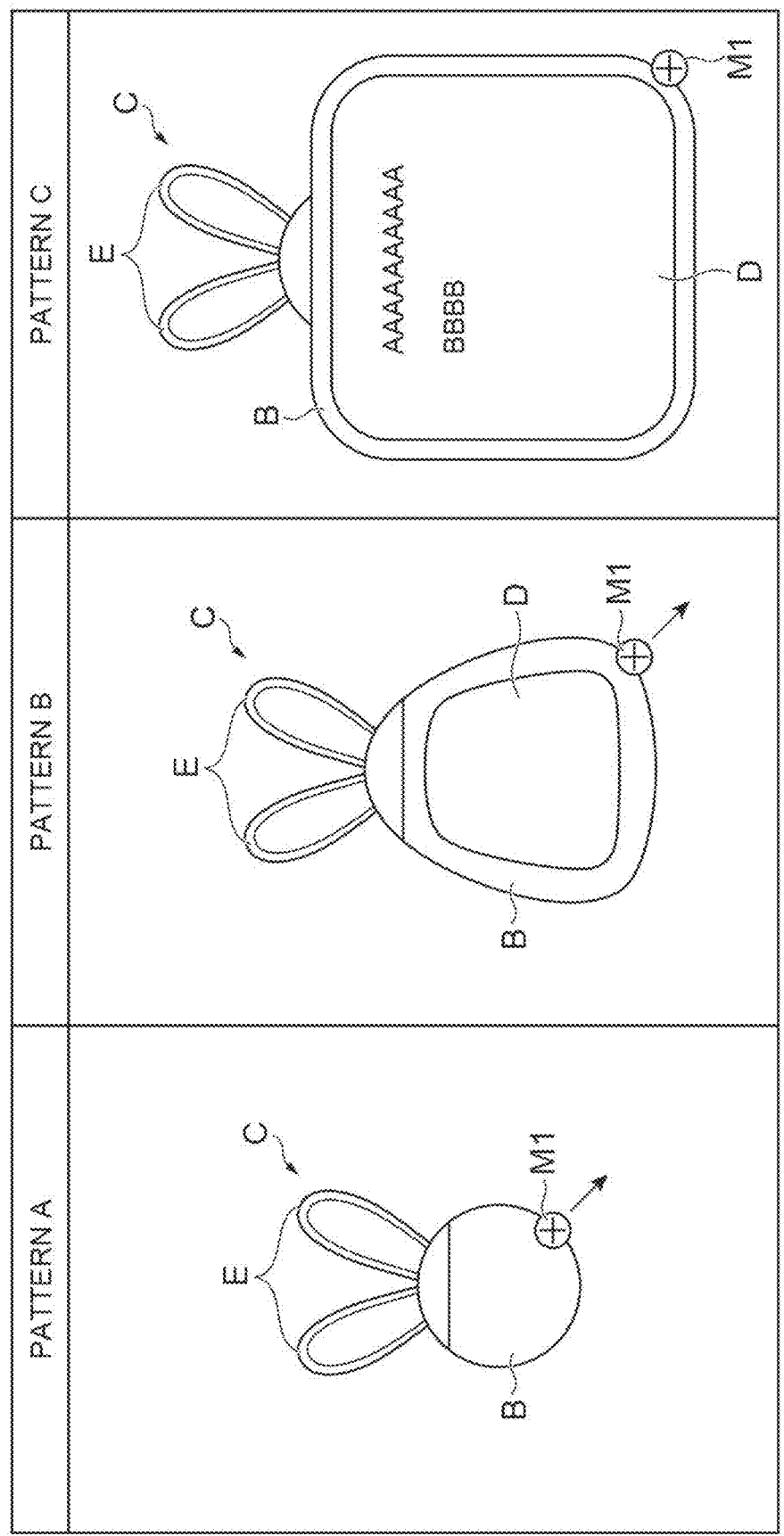
FIG. 37 is a diagram showing an example of a deformation of a body of a character.

For example, as shown in the pattern A of FIG. 37, when body B of character C is clicked (touched), a "+" mark M1 is displayed on body B. As shown in the pattern B of FIG. 37, when "+" mark M1 displayed on body B is dragged outward, body B is enlarged and a display portion D is formed (displayed) on body B. As shown in the pattern C of FIG. 37, when "+" mark M1 is dragged further outward, body B is deformed into, for example, a substantially rectangular shape, and display portion D of a predetermined size is displayed. By changing (enlarging or reducing) the size of body B, the size of display portion D can be appropriately set (adjusted). Display portion D displays materials and functions as a whiteboard. Specifically, display portion D has a function of selecting and displaying a document, an image, a text, a camera image, a user's self-image, a pen input whiteboard, and the like.

Figure 38:
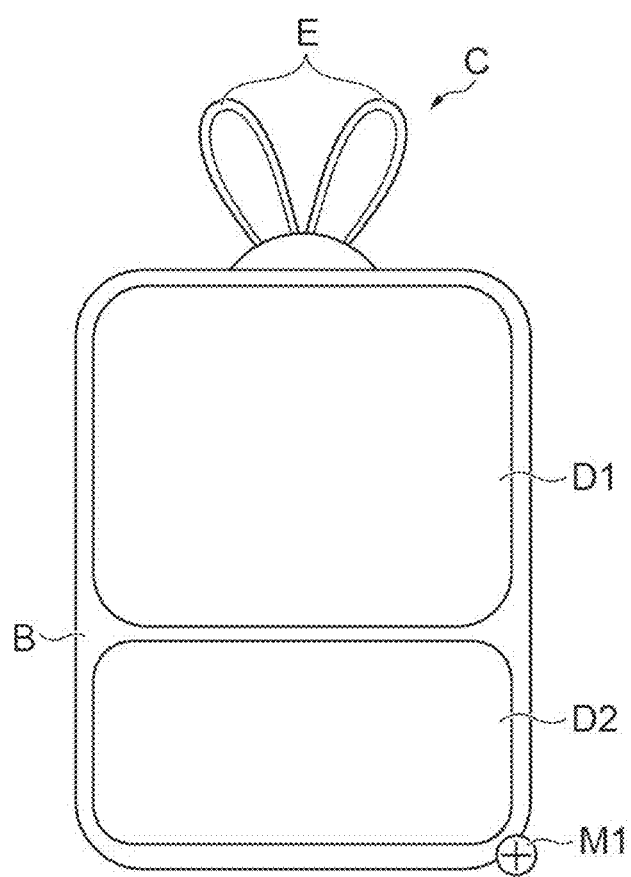
FIG. 38 is a diagram showing an example of a form in which a display portion is displayed on a character.

As shown in FIG. 38, a plurality of (two) display portions D1 and D2 may be displayed by dragging "+" mark M1 further outward from the state shown in the pattern C of FIG. 37. In the example shown in FIG. 38, display portion D1 may display the materials and the like and the input details input by users U1, U2, and U3, and display portion D2 may display the translation of the display details displayed in display portion D1.

The layout, size, and the like of display portions D1 and D2 can be set as appropriate. In the form in which body B functions as display portion D (D1, D2) (the form in which body B serves as the display portion, the form in which the display portion is displayed on body B), the whole body B may serve as the display portion and ear animation E may be displayed on the upper portion of body B as shown in FIG. 18, or a part (semicircular portion) of body B before deformation and ear animation E may be displayed on the upper portion of body B after the deformation as shown in the pattern C of FIG. 37. In the example shown in the pattern C of FIG. 37, a part of body B and ear animation E have a hat-like shape, and the hat is placed on the upper portion of body B. The shape of a part of body B is not limited to a semicircular shape, and may be a rectangular shape or the like. As in the example shown in the pattern C of FIG. 37, ear animation E and a part of body B before the deformation are displayed, and a part of body B which is not deformed is left, whereby an effect of making it easy to recognize the connection between body B before the deformation and body B after the deformation can be obtained.

As shown in FIG. 39, two characters C displayed with display portions D1 and D2 may be displayed so as to converse with each other. In the conversation between characters C (users U1, U2, and U3), conversation text or the like may be displayed on display portions D1 and D2. Display portions D1 and D2 may display, automatically or by manual operation, a drawing, a text, a moving image, a camera image, a self-portrait of a moving image taken by a camera, a self-portrait of a still image, or a text corresponding to audio, etc., corresponding to a conversation, by acquiring audio data of users U1, U2, and U3 and linking the data with AI. For example, in a conversation between a doctor and a patient, when explaining cataract surgery, the eyeball structure is automatically displayed in display portion D2 of character C of the doctor based on the conversation details. This makes it easier for the patient to understand the explanation of the exchange between the intraocular lens and the crystalline lens. As described above, by utilizing AI based on the keyword and the key sentence, the most suitable drawing, sentence, music, moving image, still image, website or the like is automatically displayed and output on display portions D1 and D2 of character C of the explainer, so that the conversation can be dynamically and efficiently configured.

Figure 40:
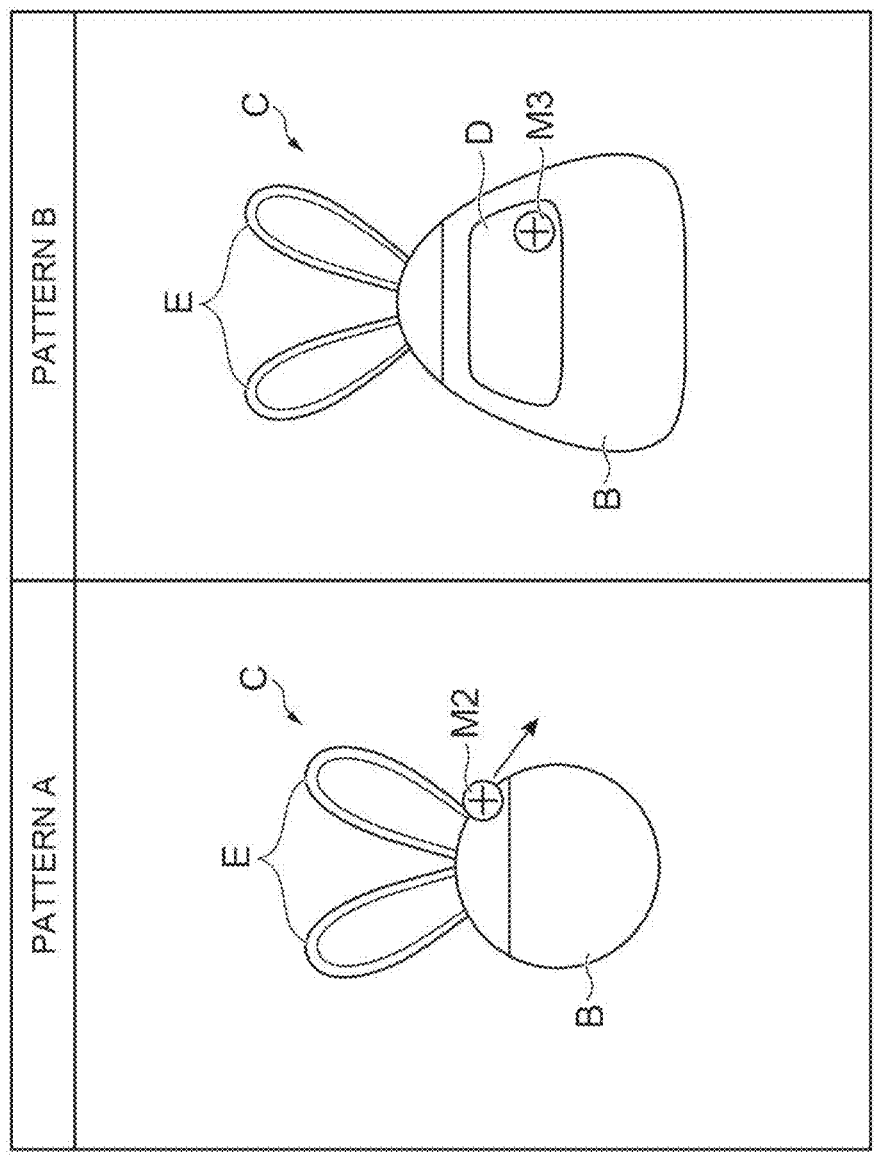
FIG. 40 is a diagram showing an example of a deformation of a body of a character.
Figure 41:
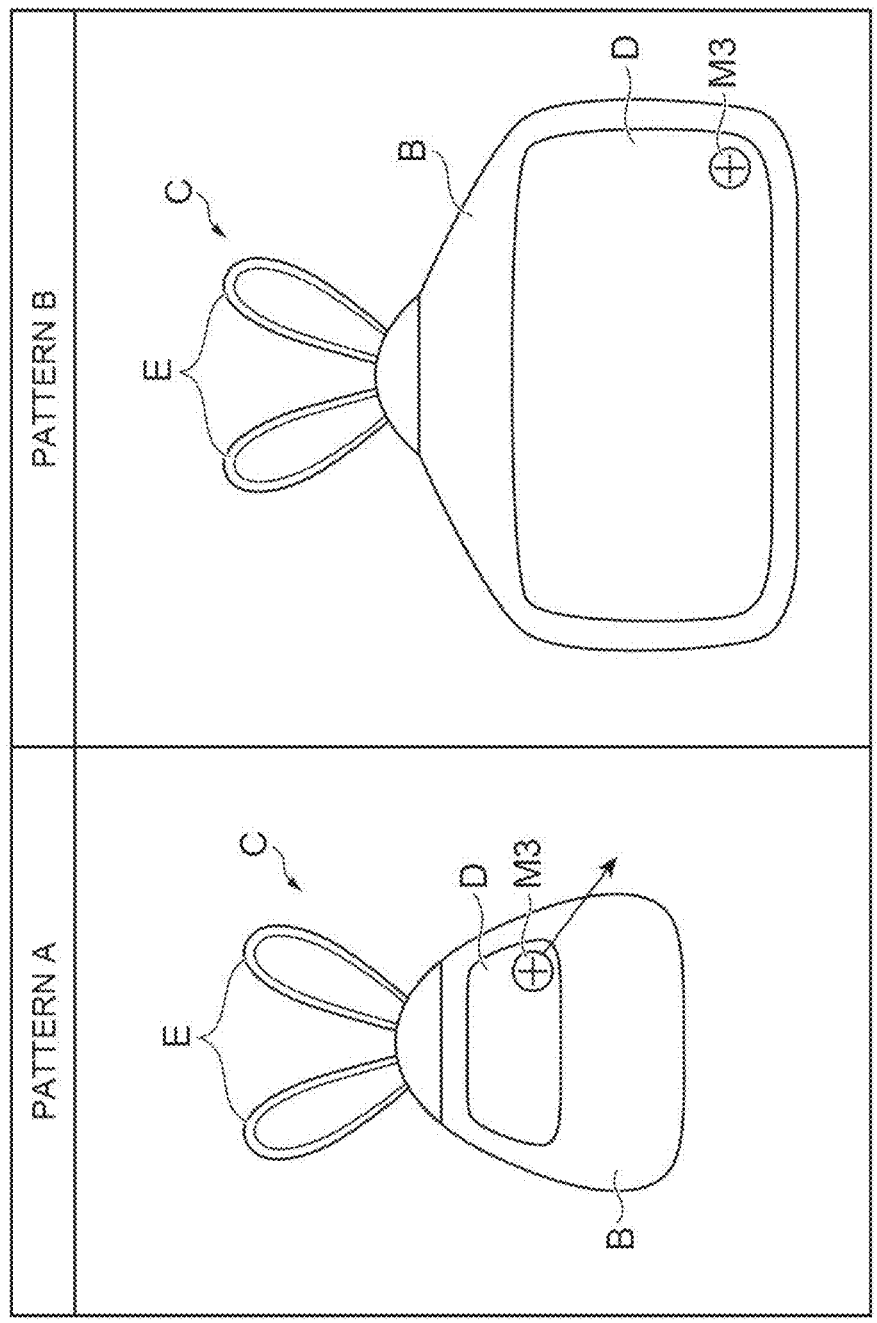
FIG. 41 is a diagram showing an example of a deformation of a body of a character.

As another method of displaying the display portion on body B, as shown in the pattern A of FIG. 40 "+" mark M2 is displayed on body B, for example, by clicking (touching) the upper side (ear animation E side) of body B of character C. As shown in the pattern B of FIG. 40, when a "+" mark M3 displayed on body B is dragged, body B is enlarged and display portion D is formed (displayed) on body B. As shown in pattern A of FIG. 41, when "+" mark M3 displayed on display portion D is further dragged, display portion D is enlarged as shown in pattern B of FIG. 41.

Figure 42:
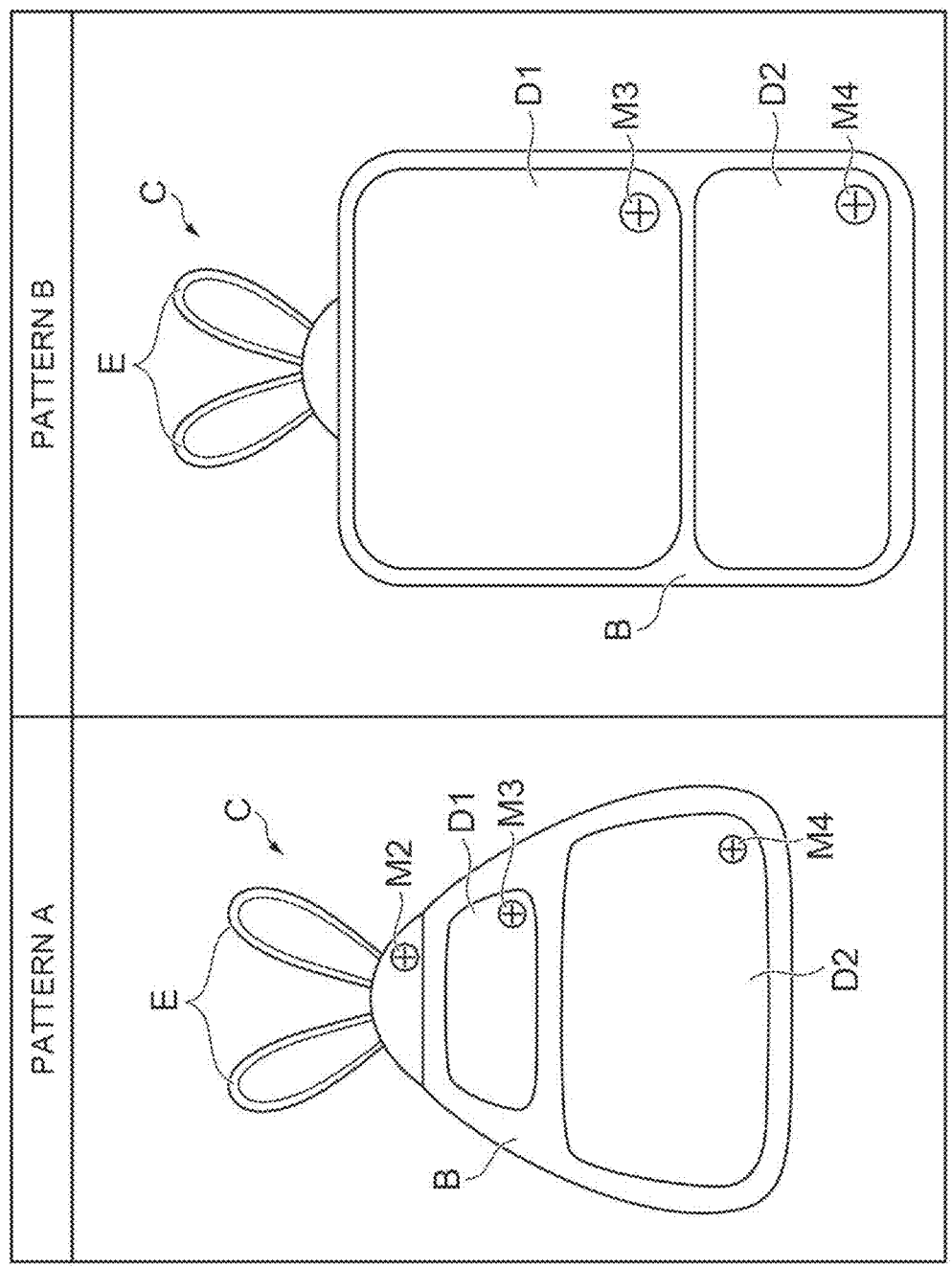
FIG. 42 is a diagram showing an example of a deformation of a body of a character.

As shown in the pattern A of FIG. 42, when the upper side (ear animation E side) of body B of character C is clicked (touched) again, "+" mark M2 is displayed on body B. By clicking "+" mark M2 displayed on body B, new display portion D2 is formed. As shown in the pattern B of FIG. 42, when "+" mark M3 and a "+" mark M4 displayed on display portions D1 and D2 are dragged further outward, display portion D is enlarged.

Figure 43:
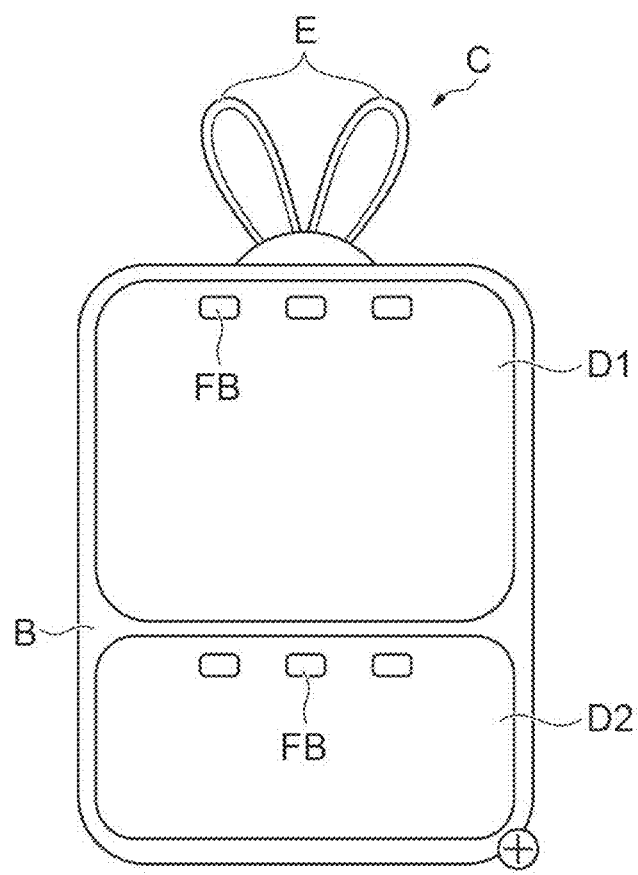
FIG. 43 is a diagram showing an example of a form in which the display portion is displayed on a character.

As shown in FIG. 43, function buttons FB may be displayed in display portions D1 and D2. One or more function buttons FB may be displayed. By clicking function button FB, the functions in display portions D1 and D2 can be switched. Function buttons FB may include, for example, a material display button, a handwriting input button, a translation button, an AI search button, and the like. In each of display portions D1 and D2, the function of the selected function button FB is performed. For example, when the material button is selected as function button FB in display portion D1, a screen of a personal computer or the like is displayed in display portion D1, and a material can be selected and displayed. For example, when the handwriting input button is selected as function button FB in display portion D1, tools for handwriting input (a pen, selection of the color and thickness of the pen, an eraser, and the like) are displayed in display portion D1. For example, when the translation button is selected in display portion D2, the translation is displayed in display portion D2. For example, when the AI search button is selected in display portion D2, a drawing, text, a moving image, a still image, audio, or the like corresponding to the conversation is automatically displayed and output in display portion D2.

As described above, the function change element such as displaying display portion D (D1, D2) is added by the operation of enlarging (reducing) body B by each of users U1, U2, and U3. Therefore, a visual conversation can be easily provided, and the change is interesting, so that the conversation is enjoyable. Since users U1, U2, and U3 operate body B, users U1, U2, and U3 can visually recognize body B including surrounding participants. Further, the generation of display portion D (D1, D2) by the deformation of body B of character C can be freely and easily arranged by dragging the "+" mark displayed on body B, such as displaying in a multiple manner or changing the size, whereby the user interface is remarkably improved. Therefore, the function is highly useful as an audio-visual support tool for conversation.

Further, body B of character C may be automatically transformed (deformed) in accordance with the location, attribute, and the like in various locations (environments, situations) such as a specific location in the virtual space, a pavilion, a classroom, a library, and a restaurant. The deformation of body B includes a change in form (shape), a change in color, a change in design (pattern, etc.), and the like. In this way, body B deforms in accordance with the place or the like, and thus the atmosphere of the place can be further felt. Each of users U1, U2, and U3 can set whether or not the deformation of each body B is possible. Further, when character C performs the deformation, a plurality of modes may be displayed so that character C can select one of the modes.

Figure 44:
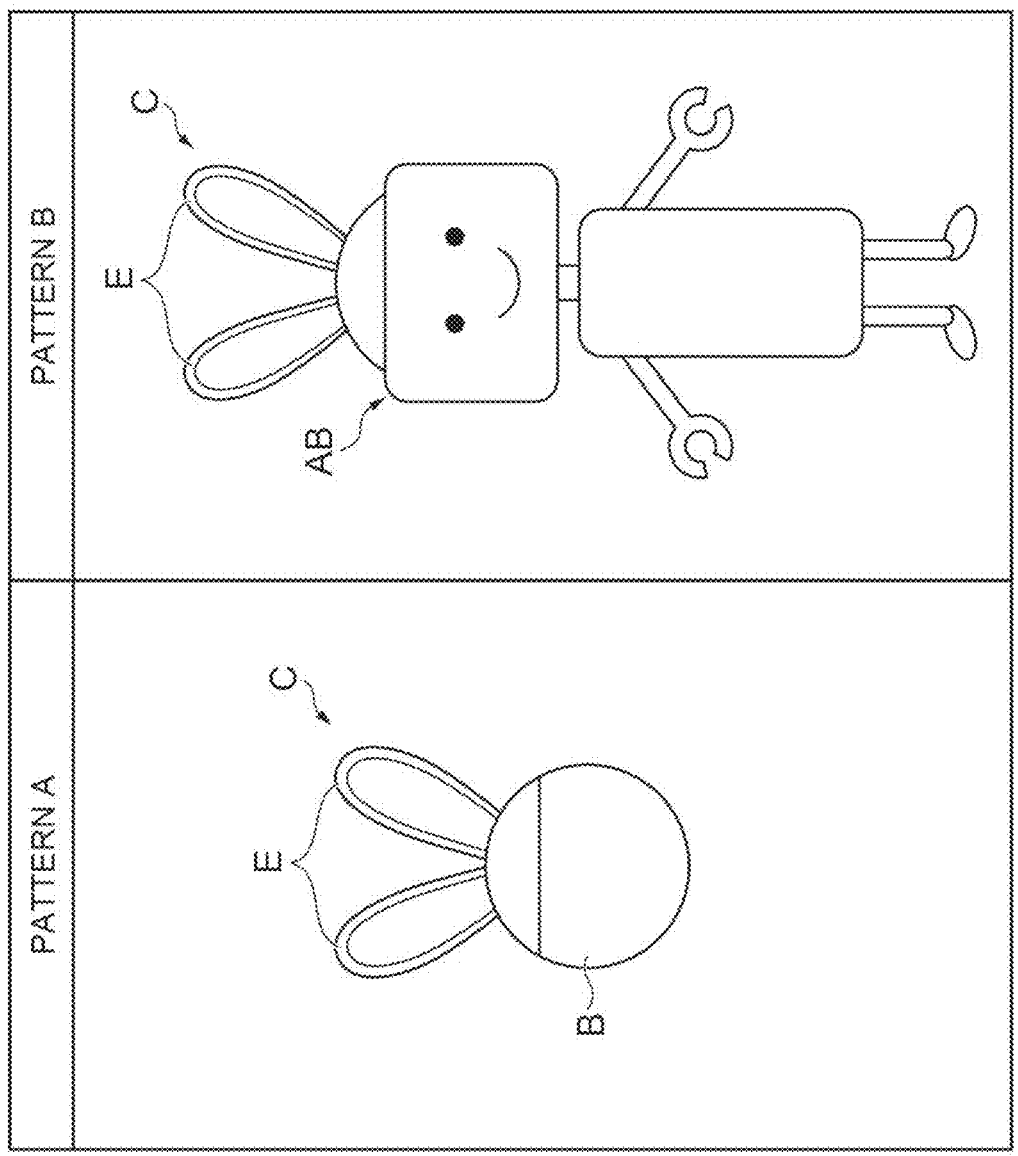
FIG. 44 is a diagram showing an example of a deformation of a character.

Further, character C may be integrated with the avatar in the virtual space. Character C shown in the pattern A of FIG. 44 may be displayed integrally with, for example, an avatar AB as shown in the pattern B of FIG. 44. Avatar AB may include a face expression or may not include a face expression. In this case, a part of character C, for example, the upper portion of body B including ear animation E is added to the upper portion of avatar AB. By adding not only ear animation E but also a part of body B (for example, a semicircular portion, identification information) together, the deformation of character C can be smoothly performed, and even if the deformation is performed, continuity and visibility of identification can be maintained and achieved by inheriting a part of the design which has given the original identification, and a sense of incongruity regarding the identification by the deformation can be reduced.

The portion added to avatar AB is not limited to ear animation E and a part of body B, and may be only ear animation E. The portion added to avatar AB may be a base body, a support body, or the like having ear animation E, for example, a cap, a headphone having ear animation E, or the like. The cap may have various shapes (such as a top hat, a baseball cap, a crown cap, and a helmet). The hat form allows avatar AB to be identified. The hat may display text information, a name, a nickname, an attribute, a mark, or an identifiable NFT. This further improves the identifiability of avatar AB.

As described above, by adding ear animation E (including a part of body B and the hat) to avatar AB, the function of ear animation E can be maintained even when avatar AB is used. Thus, the fusion of ear animation E and avatar AB can accommodate a tailored brand that can achieve enhancements to non-verbal communication and reveal identification information in avatar AB. In addition, the design and function can be merged with a non-fungible token (NFT) to further expand the service.

Character C is not limited to avatar AB of the human type, and may be applied to a "thing" such as a car and a display without a face expression. By applying ear animation E to the "object", it is possible to give a sense of being a living creature to the "thing". Rather than being a "thing", character C may be a design such as NFT, a mark such as a brand, a video, an image, or text information to which ear animation E is added. As described above, if the thing including ear animation E has a certain role and effect as a specific group, attribute, and identification display, the thing can be widely applied as character C.

Figure 45:
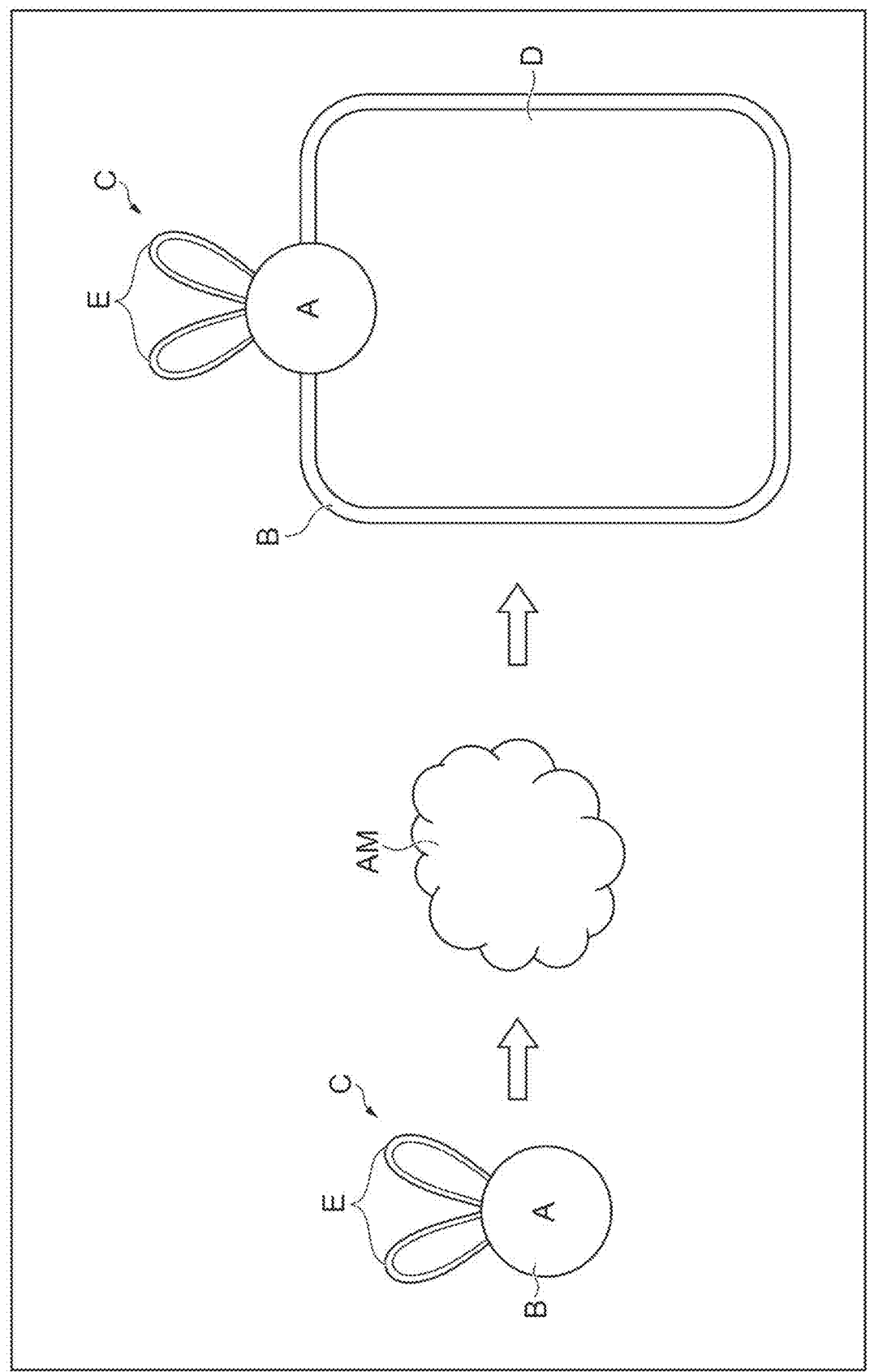
FIG. 45 is a diagram showing an example of a deformation of the body of the character.

As another method of displaying the display portion on body B (method of changing the form), another animation may be displayed when the display portion is displayed on body B from the normal state of character C (state in which the display portion is not displayed). As shown in FIG. 45, for example, an animation AM such as smoke, a cloud, a tornado (whiplash), or the like may be displayed between a normal state of character C (hereinafter, also referred to as "first form") and a mode (hereinafter, also referred to as "second form") in which the display portion is displayed on body B is displayed. Animation AM may be any animation as long as the appearance thereof is different from those of the first form and the second form, and various animations can be adopted.

In this way, by displaying animation AM between the first form and the second form, it is possible to alleviate the impression of an immediate (rapid) change from the first form to the second form. In this case, for example, an effect of reducing the sense of discomfort of users U1, U2, and U3 with respect to the change from the first form to the second form is obtained.

Figure 46:
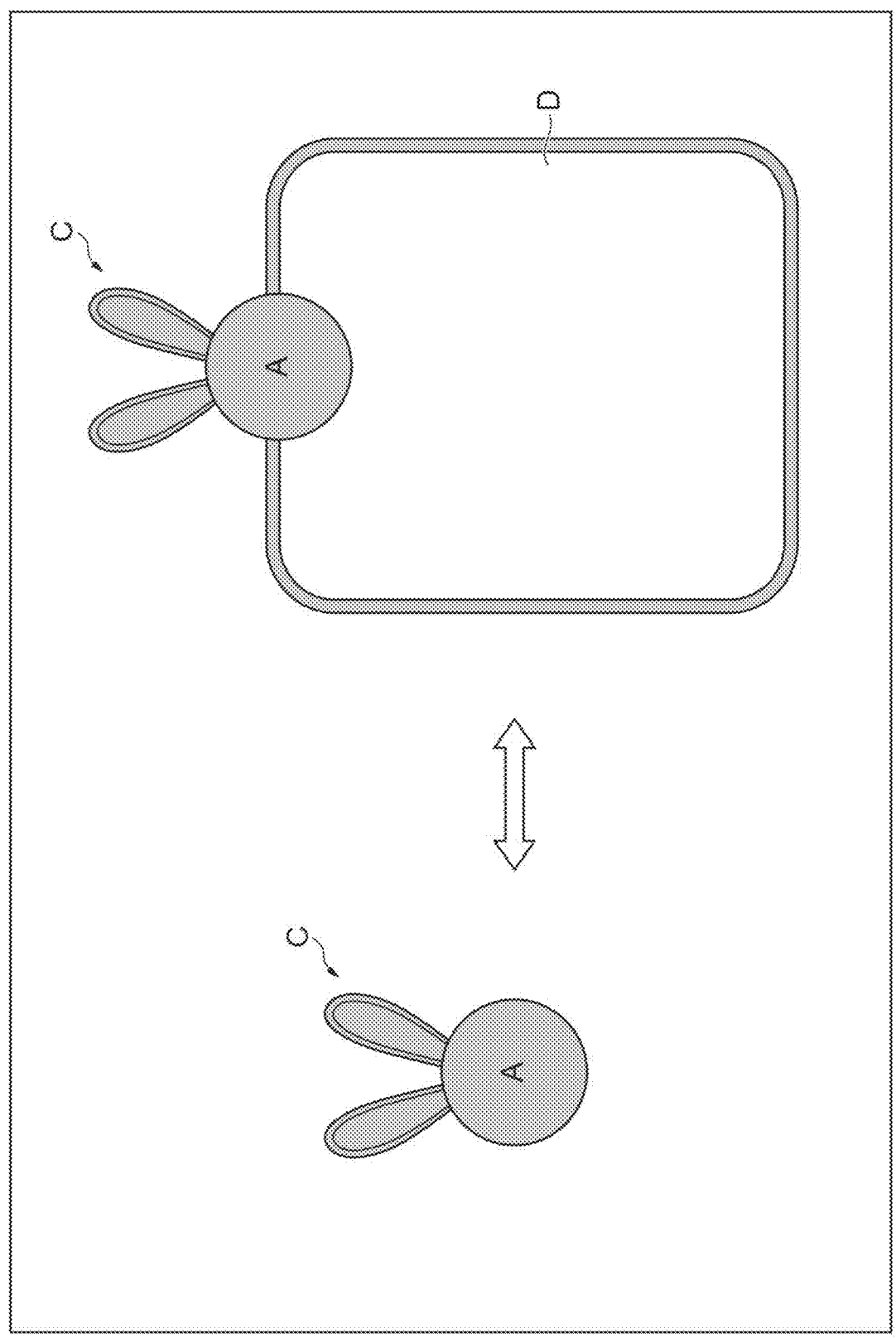
FIG. 46 is a diagram showing an example of a deformation of the body of the character.

The first form and the second form are preferably configured so that users U1, U2, and U3 can be identified before and after the change in form. For example, as shown in FIG. 46, the identification information (a name, initials, a specific design (NFT, pattern, etc.), brand mark) displayed on body B can be the same in the first form and the second form. In the second form, the shape of body B may be the same as that in the first embodiment. That is, in the second form, display portion D is displayed while maintaining the same shape of body B as in the first form. The same color can be used in the first form and the second form.

Figure 47:
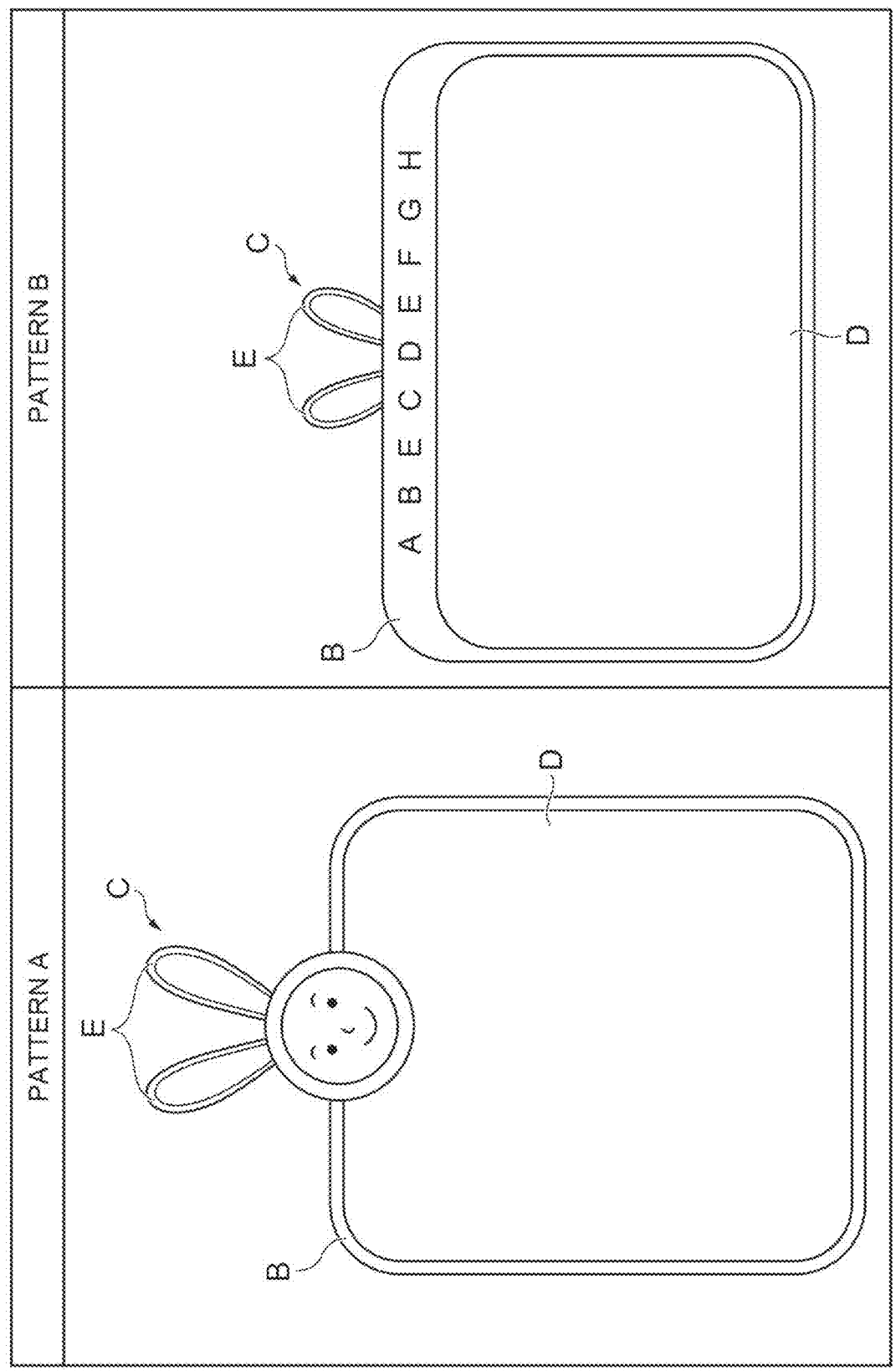
FIG. 47 is a diagram showing an example of a deformation of the body of the character.

As shown in the pattern A of FIG. 47, in the second form, a face image (video) may be displayed on body B. The display of the face image is executed by, for example, acquiring a face portion, by face recognition using AI or the like, from an image including the faces of users U1, U2, and U3 obtained by an imaging device such as a camera and displaying the face portion on body B. As shown in pattern B of FIG. 47, identification information such as a name may be displayed in the frame portion formed by body B in the second form.

As described above, in the case of changing from the first form to the second form, it is preferable that the ease of identification of users U1, U2, and U3 is maintained in the first form and the second form. Here, human angle of vision is typically around 120°. When high performance is required, for example, when humans read information on a screen, a clear field of view (central field of view) is within an angle of vision of 10°. Therefore, when observing the screen, it is difficult to read information on the entire screen and pay attention to the information. For example, when the angle of vision of the central visual field is 10° at a position distant from the screen by 50 cm to 60 cm, the angle of vision corresponds to a region having a radius of about 8 cm to 10 cm. In this way, when humans read information on the screen, the angle of vision is preferably within 10°. Even when it is difficult to set the angle of vision to 10°, it is preferable to set the angle of vision as small as possible.

In order to set within the angle of vision of 10° or to reduce the angle of vision as much as possible, it is preferable to integrally display display portion D in character C while maintaining identification information (identification information) and maintaining the identifiability of the whole character C in the first form and the second form, instead of simply combining character C and the display portion. Therefore, as in the example shown in FIG. 46 or FIG. 47, it is preferable to form a frame around display portion D in the same color and design as character C, or to display a name, an initial, a specific design (NFT, pattern, etc.), and a brand mark as identification information on a part of body B, for example, on the upper portion as a part of the frame design.

Figure 48:
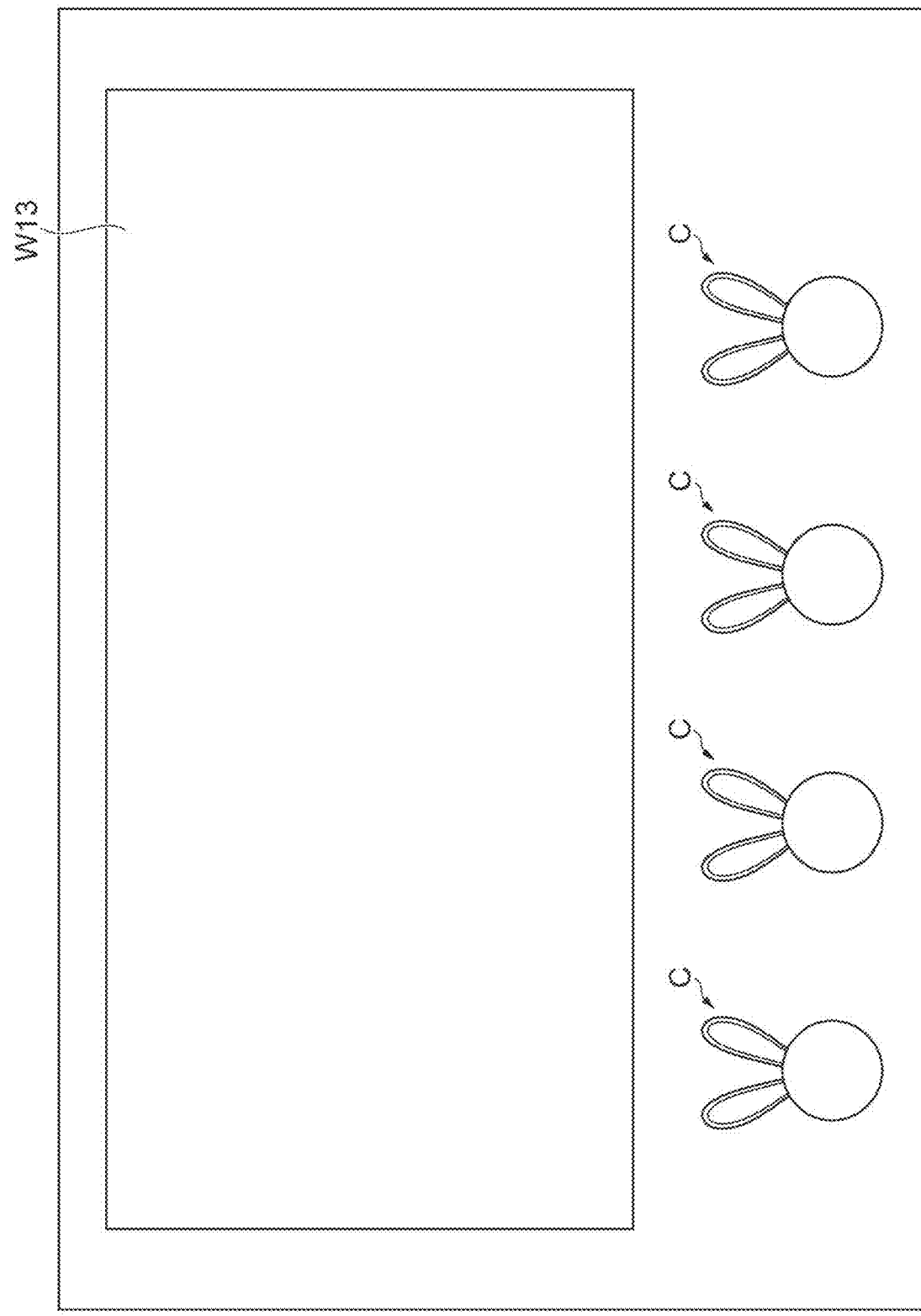
FIG. 48 is a diagram showing an example of a screen displayed in the virtual space.
Figure 49:
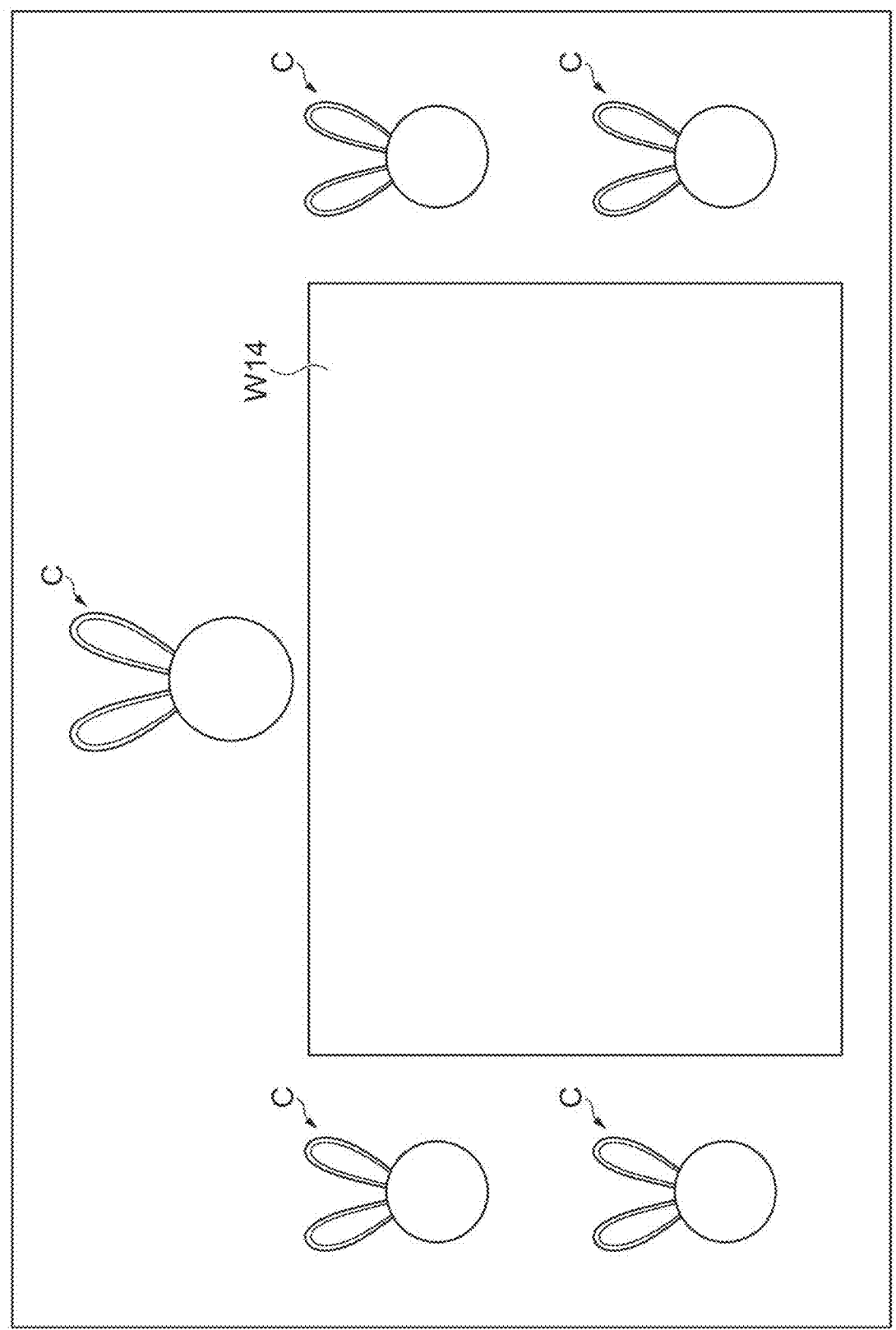
FIG. 49 is a diagram showing an example of a screen displayed in the virtual space.
Figure 50:
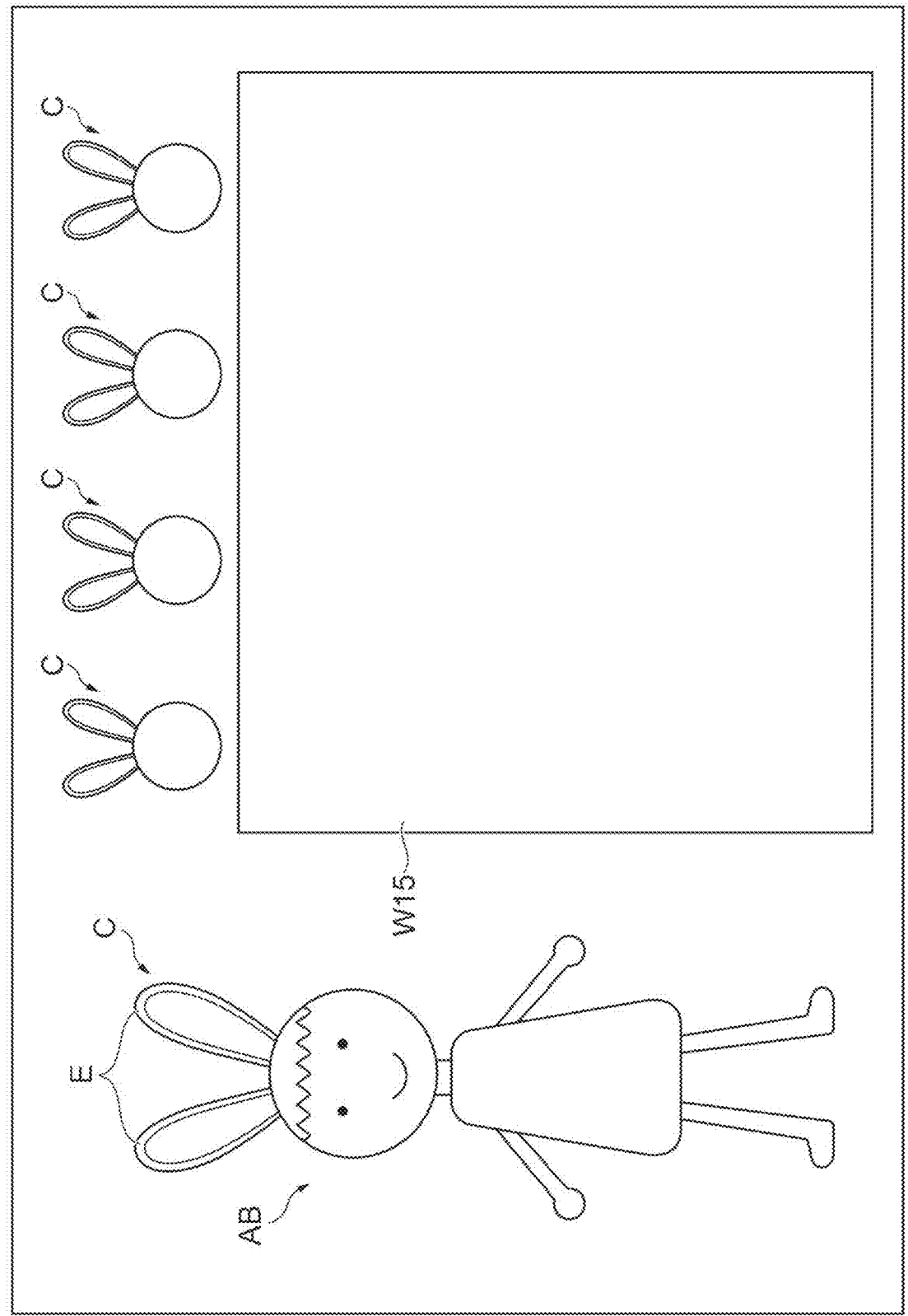
FIG. 50 is a diagram showing an example of a screen displayed in the virtual space.

For example, when character C and the translation are displayed on the screen, it is difficult to simultaneously read the change of ear animation E of character C and the word of the translation in the area of the wide angle of vision. For example, as shown in FIG. 48, when character C and the translation are displayed but a display window W13 is displayed separately, the angle of vision increases, and thus it may be difficult to simultaneously read the change of ear animation E of character C and the word of the translation. Further, as shown in FIG. 49, for example, when a display window W14 is displayed below character C as the presenter, the angle of vision decreases compared to in the example shown in FIG. 48, but the angle of vision increases to greater than 10°. As shown in FIG. 50, when character C and the display window W15 which are integrally displayed with avatar AB are displayed, the angle of vision increases.

Figure 51:
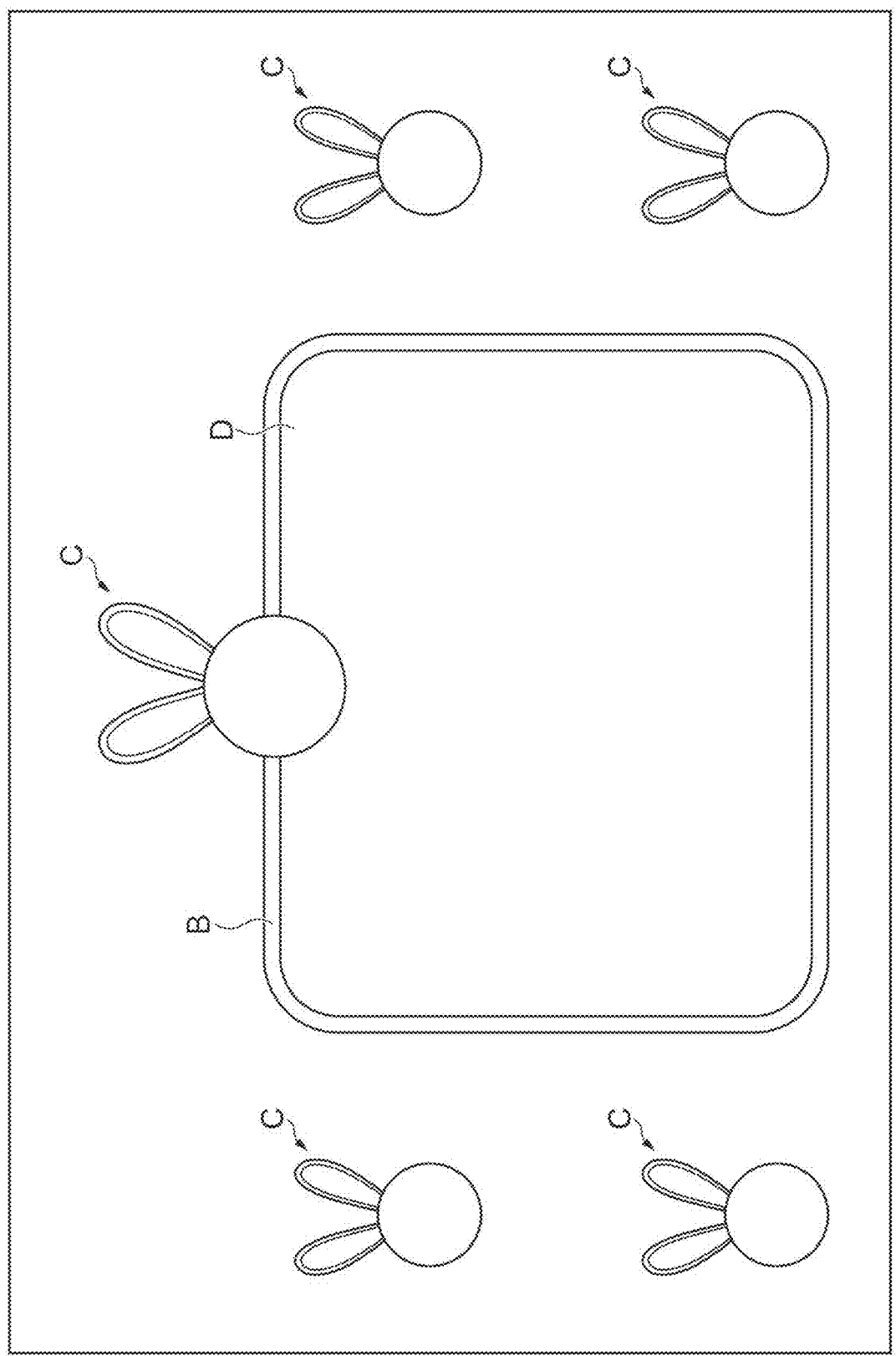
FIG. 51 is a diagram showing an example of a screen displayed in the virtual space.

As in the example shown in FIG. 51, when display portion D is displayed on body B in character C, ear animation E and the text information displayed on display portion D are displayed at positions closer to each other, and thus the angle of vision is decreases compared to the case where character C and the display window are separately displayed. Therefore, visibility is improved, and information processing becomes easier. As a result, ear animation E (non-verbal information) and the text information can be understood at the same time. Further, in character C, in the configuration in which display portion D is displayed and integrated with body B, it is expected that the sense of unity between ear animation E and the text information is improved and the sense of familiarity and dynamism is improved as compared with the configuration in which character C and the display window are separately displayed.

In the future, it is expected that communication in different languages will spread on a daily basis throughout the world due to the spread of simultaneous interpretation technology by AI. Character C in which ear animation E and display portion D for displaying the interpretation sentence are integrally displayed can be expected as an application for achieving communication in different languages. In particular, from the viewpoint of GX (green transformation), it is very effective for reducing the transmission capacity to express the non-verbal expressions by ear animation E, instead of always displaying face information which is a real moving image, for reducing the transmission capacity (reducing energy). When face information recognition is required, a still image of a face or the like can be displayed on body B of character C as shown in FIG. 47.

Figure 52:
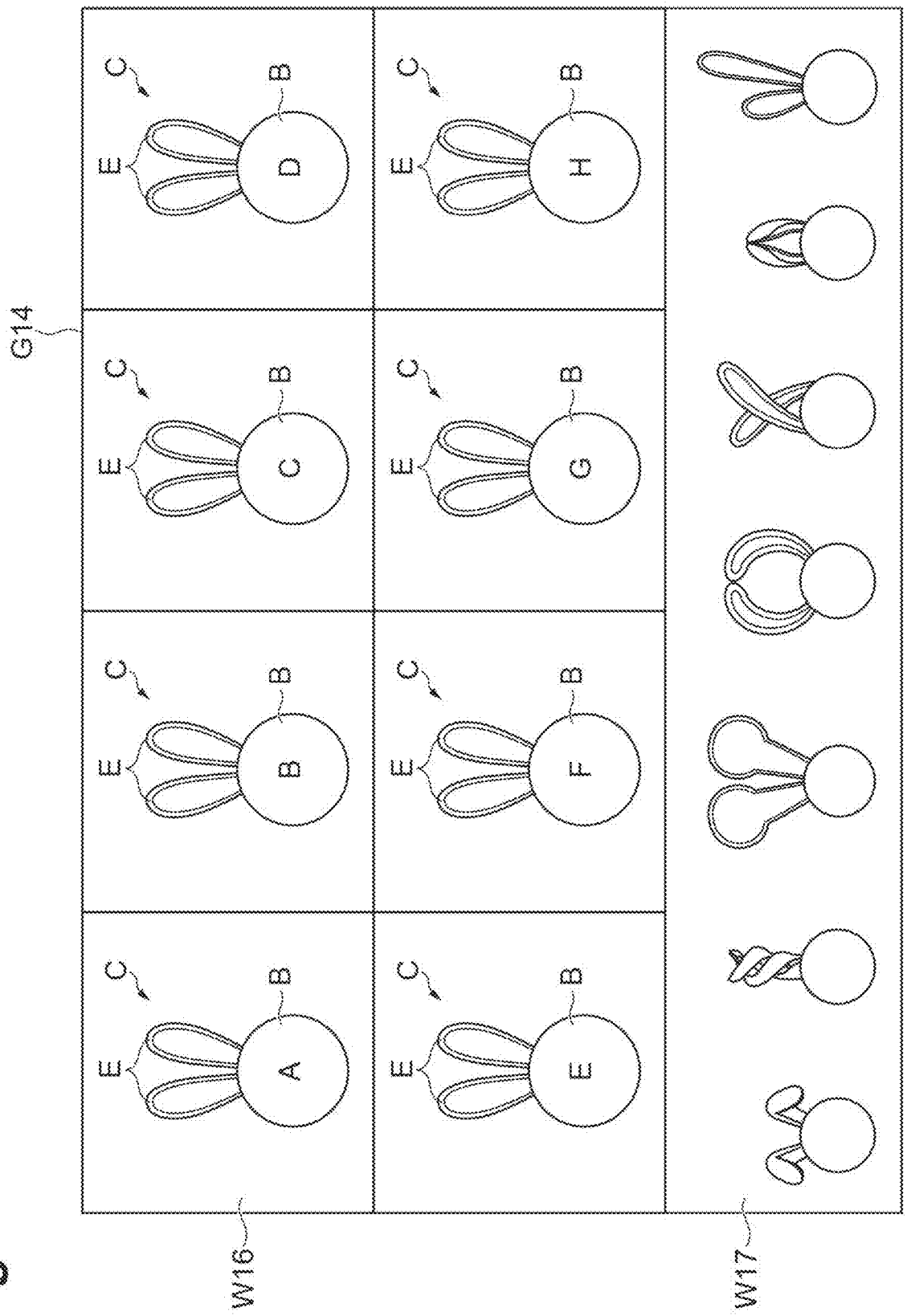
FIG. 52 is a diagram showing an example of a screen displayed in the virtual space.

As another method of displaying the display portion on body B, as shown in FIG. 52, character C may be clicked (touched or selected) on a screen G14 on which a plurality of characters C are displayed. Screen G14 is a screen displayed in the activity of a conference, for example. On screen G14, a participant window W16 in which character C is displayed and an operation window W17 are displayed. In participant window W16, character C participating in the conference is displayed. Information (for example, "A" to "H") capable of identifying the participant is displayed in body B of character C. In operation window W17, a plurality of operation patterns of ear animation E in character C are displayed. Users U1, U2, and U3 click one of the operation patterns displayed in operation window W17. Thus, ear animations E of characters C of users U1, U2, and U3 act in a predetermined pattern.

Figure 53:
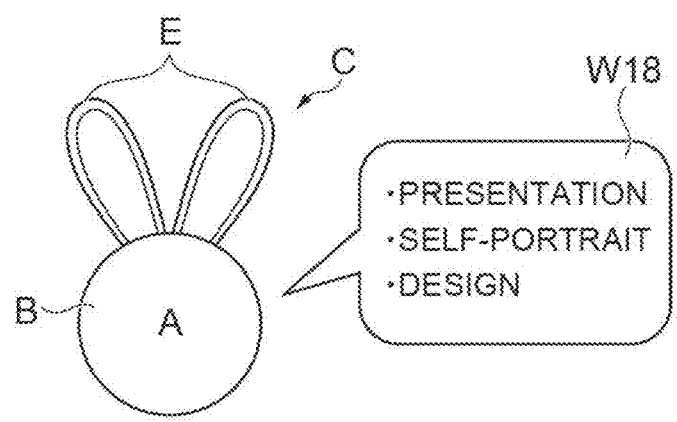
FIG. 53 is a diagram showing an example of a screen displayed in the virtual space.

When users U1, U2, and U3 click their own character C on screen G14, a function selection window W18 is displayed near character C as shown in FIG. 53. Function selection window W18 is displayed in a pop-up manner like a balloon near character C. Function selection window W18 displays a plurality of functions to be executed in character C. In function selection window W18, for example, functions of "presentation", "self-portrait", and "design" are displayed. When the function of "presentation" is selected, display portion D (FIG. 54) is displayed on body B. When the function of "self-portrait" is selected, face images (video) of users U1, U2, and U3 are displayed on body B. When the display of the face image is stopped, the function of "self-portrait" is selected again. When the "design" function is selected, a screen for setting (changing) the design of character C is displayed. In the design setting screen, text ("A" or the like) displayed in character C, the color of character C, and the like can be set.

Figure 54:
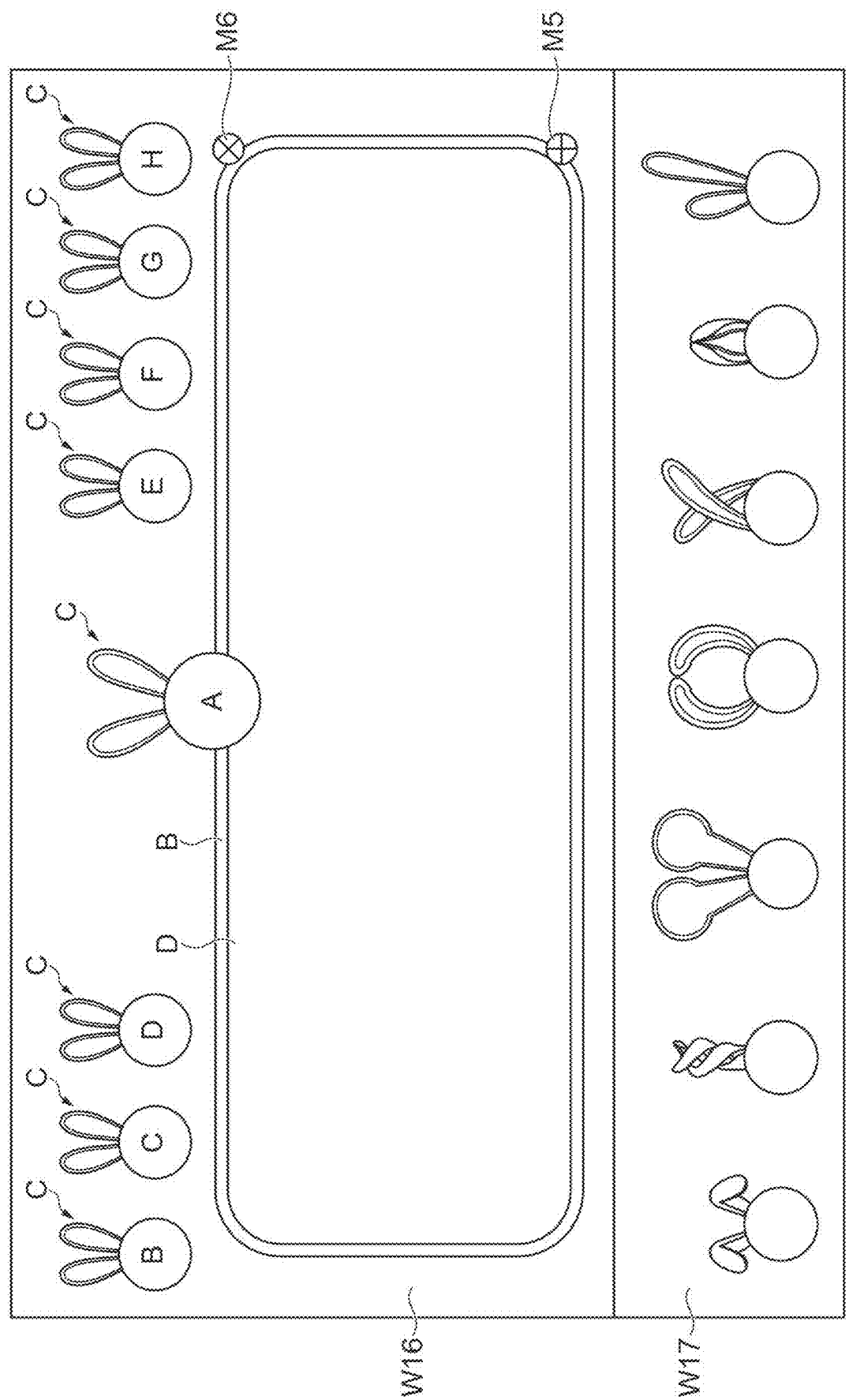
FIG. 54 is a diagram showing an example of a screen displayed in the virtual space.

When "presentation" is selected in function selection window W18, display portion D is formed (displayed) in body B of character C as shown in FIG. 54. Identification information is displayed on body B of character C. Character C ("A") having display portion D is displayed in an enlarged manner in participant window W16. Other characters C ("B" to "H") are displayed in a reduced size. Other characters C ("B" to "H") are arranged side by side in the upper portion of participant window W16, for example. In display portion D of body B of character C, presentation materials and the like are displayed.

A "+" mark M5 and an "x" mark M6 are displayed in body B. When "+" mark M5 is dragged, display portion D can be enlarged or reduced. When "x" mark M6 is clicked, the display of display portion D of body B is terminated. In this case, the display returns to participant window W16 shown in FIG. 52.

In the example described above, the form in which function selection window W18 is displayed and display portion D is displayed on body B of character C by clicking "presentation" in function selection window W18 is described as an example. However, the method of displaying display portion D on body B of character C may be another method. For example, display portion D may be displayed based on the audio of user U1, U2, or U3. Specifically, when user U1, U2, or U3 starts talking, display portion D may be automatically displayed on body B of character C. In this case, when display portion D is displayed for all of the responding words such as "Well" and "I see", the screen display is frequently switched, and users U1, U2, and U3 may feel discomfort. Therefore, for example, when users U1, U2, and U3 continuously speak for five seconds or more, display portion D may be set to be displayed on body B. As another method, display portion D may be displayed on body B of character C when the space bar of the keyboard or the like is pressed. As described above, the display of display portion D on body B may be performed by the manual operation at the operation level that does not hinder the conversation or by automation in accordance with the situation.

In the above embodiment, character C is operated by user U1, U2, or U3. However, as described above, the operation of character C may be performed by the AI. One or more characters C are displayed in virtual space R, and at least one character C of the one or more characters C is operated by the AI. A display window (display portion) W21 (see FIG. 56) corresponding to character C operated by the AI may be displayed. Display window W21 displays at least one of text generated by AI, a still image associated with the text, a moving image associated with the text, a sentence associated with the text, and website information associated with the text. Character C may output audio corresponding to the text generated by the AI.

Character C acts as follows, for example, by the operation of character C by the AI. When AI understands the input text and/or audio of the communication partner, AI operates character C so that ear animation E of character C performs a nodding action (pattern B in FIG. 5). In the case where AI is processing (thinking), AI operates character C to repeat the action of ear animation E of character C with entangled ears (pattern E in FIG. 5). When the processing is completed in the AI (when the result or the like is obtained), the AI operates character C so that ear animation E of character C performs the operation of giving the impression of an exclamation mark (!) (see FIG. 59). In the case where the AI cannot cope with the situation, the AI operates character C so as to repeat the action of deeply bending the ear in ear animation E of character C (pattern C in FIG. 5). When the communication partner understands and accepts character C, the AI operates character C so that the ear of ear animation E of character C performs a clapping action.

Figure 55:
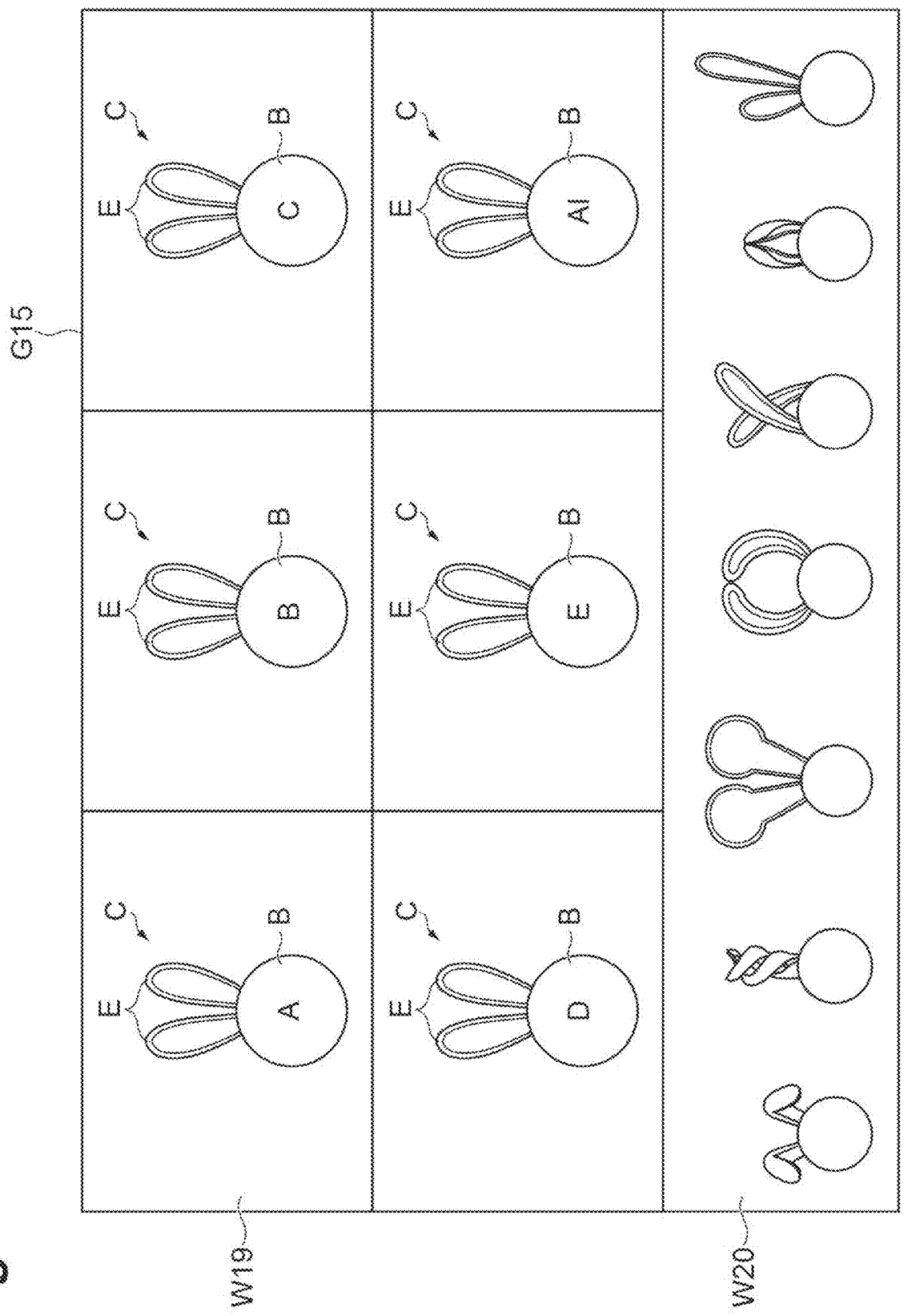
FIG. 55 is a diagram showing an example of a screen displayed in the virtual space.

An example of a form in which the AI operates character C will be described. As shown in FIG. 55, a participant window W19 in which characters C are displayed and an operation window W20 are displayed on a screen G15. In participant window W19, characters C participating in the conference are displayed. Information (for example, "A" to "E", "AI") capable of identifying a participant is displayed on body B of character C. In operation window W20, a plurality of action patterns of ear animation E in character C are displayed.

Figure 56:
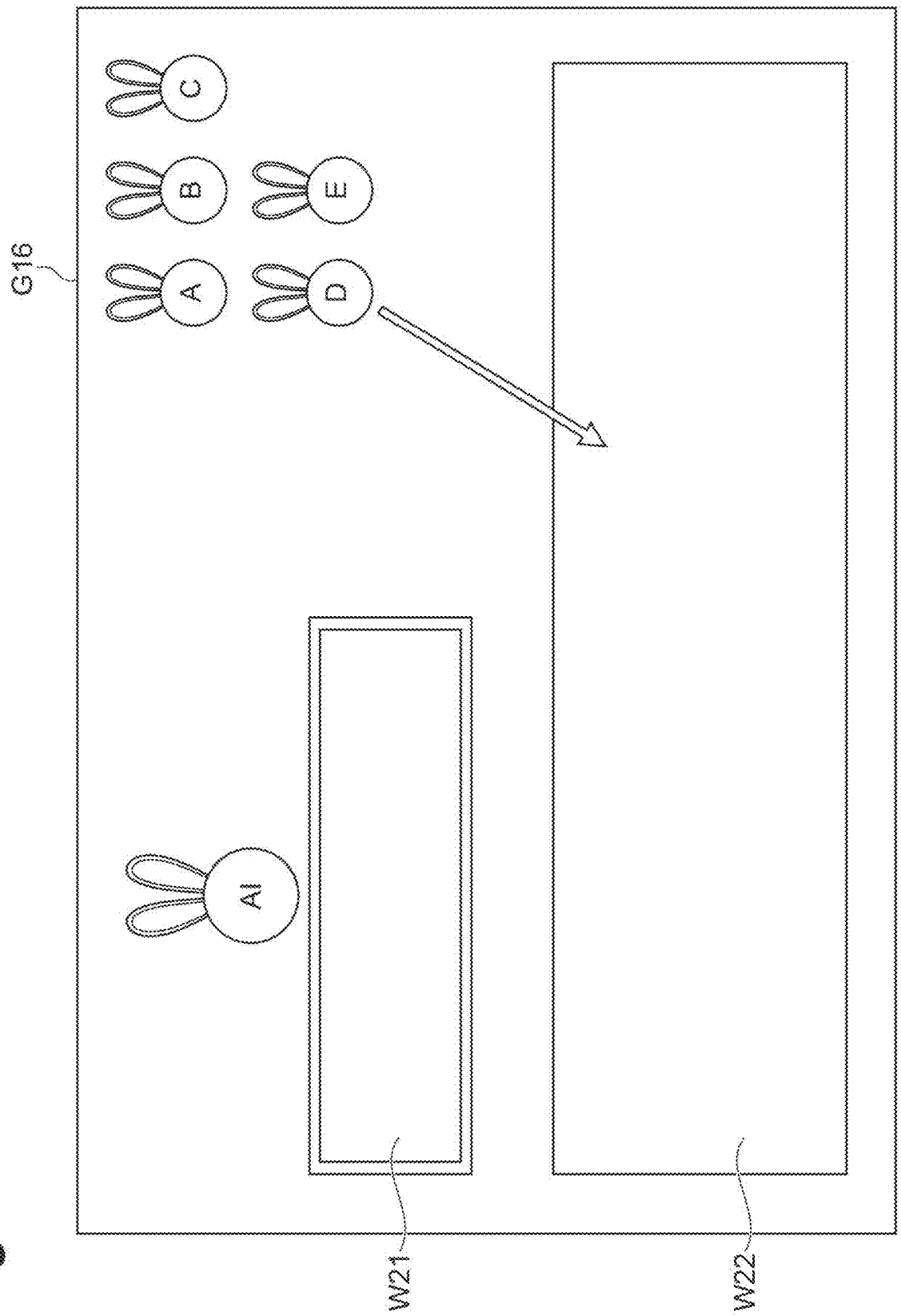
FIG. 56 is a diagram showing an example of a screen displayed in the virtual space.

When the user (including users U1, U2, U3, etc.) clicks character C of "AI" on screen G15, screen G15 is changed to a screen G16 as shown in FIG. 56. On screen G16, display window (display portion) W21 is displayed near character C of the AI, and a text window W22 is displayed. Display window W21 is a display portion corresponding to character C of the AI, and is displayed in a mode in which it can be recognized that character C of the AI and display window W21 correspond to each other. In the example shown in FIG. 56, display window W21 is displayed on an upper portion of character C of the AI. Text can be input into text window W22. The text may be input by keyboard input, handwriting input, audio input, or the like.

Figure 57:
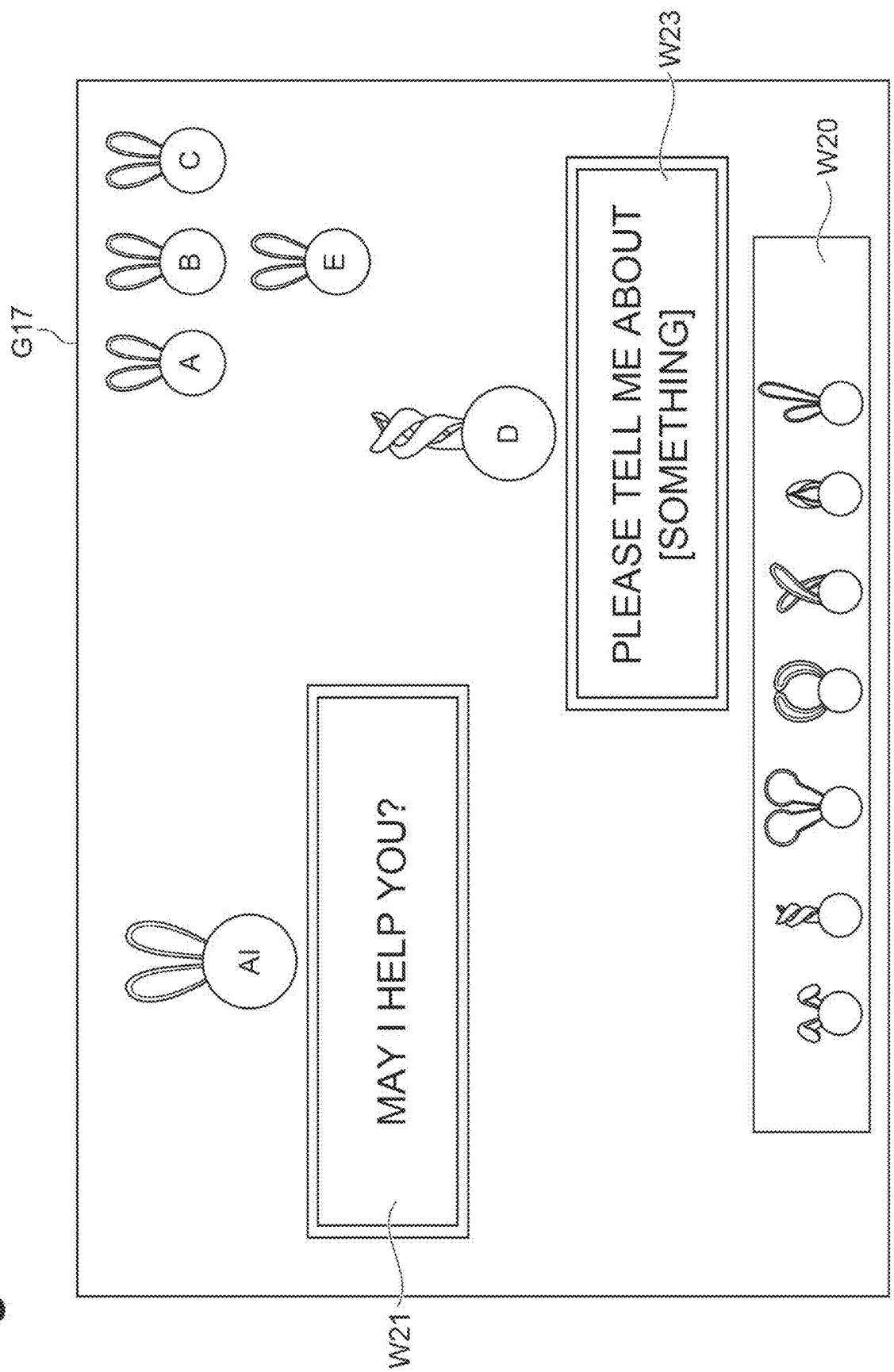
FIG. 57 is a diagram showing an example of a screen displayed in the virtual space.

When the arbitrary character C (in the example shown in FIG. 56, the character "D") is dragged and dropped in text window W22, the screen transitions to a screen G17 as shown in FIG. 57. When there are a plurality of characters C, the plurality of characters C are dragged and dropped into text window W22. The following description will be made of a case where only character C of "D" is used. On screen G17, character C and display window W21 of the AI, character C and an input window W23 of the questioner, and operation window W20 are displayed. Input window W23 is displayed in response to character C of the questioner. In the example shown in FIG. 56, input window W23 is displayed on the lower portion of character C as a questioner. In screen G17, characters C other than the questioner are displayed in a predetermined area. Characters C other than the questioner may be displayed smaller than character C of the AI and character C of the questioner.

In screen G17, a text such as "May I help you?" is displayed in display window W21. The user inputs text (for example, "Please tell me about [something]") into input window W23. The text may be input by keyboard input, handwriting input, audio input, or the like. While inputting text into input window W23, ear animation E of character C as a questioner performs an action of entangling the ears. During the input of text into input window W23, ear animation E of character C of AI performs a nodding operation. Ear animation E of character C of the AI may be the action of shaking to the left and right.

Figure 58:
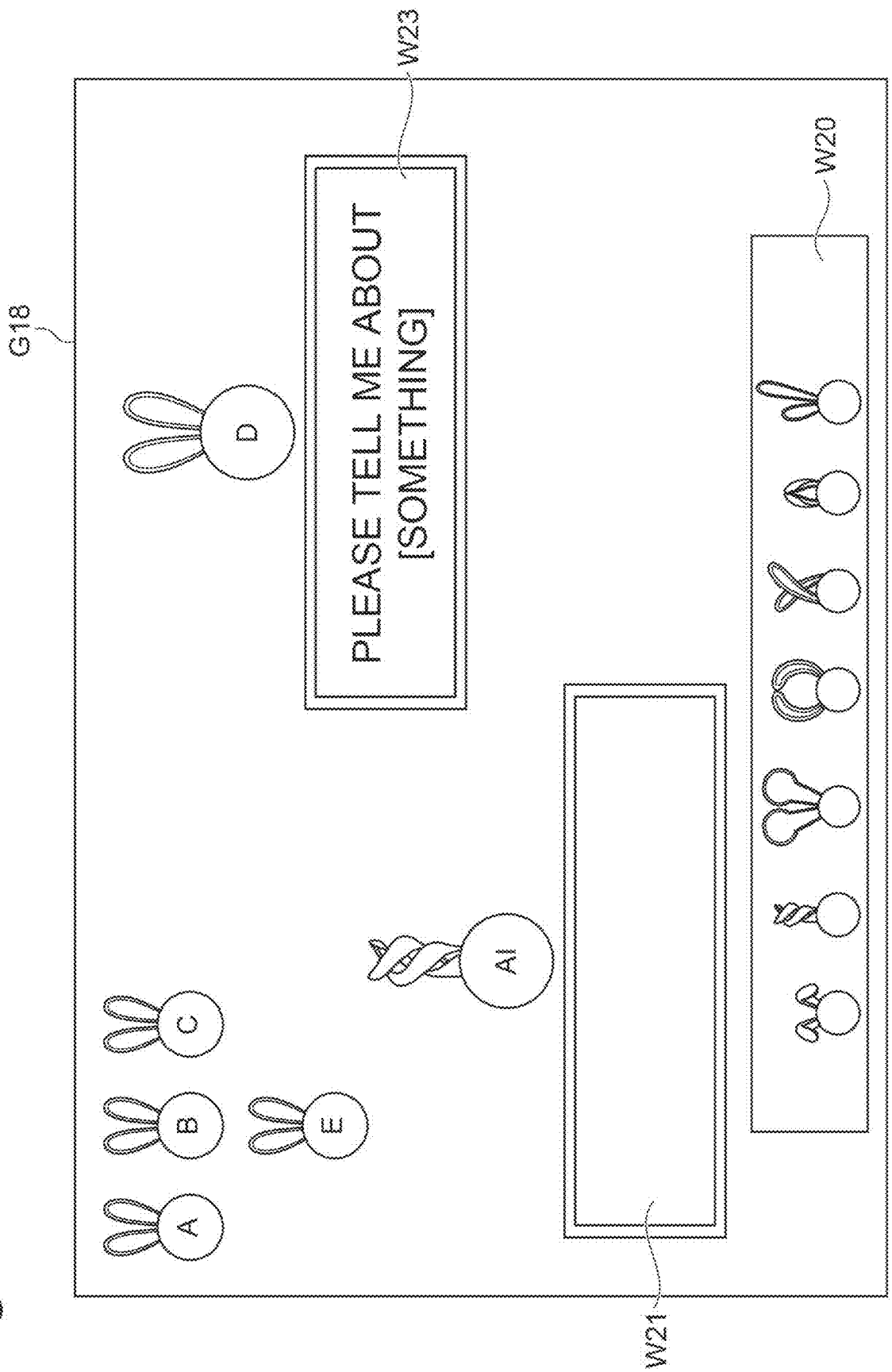
FIG. 58 is a diagram showing an example of a screen displayed in the virtual space.
Figure 59:
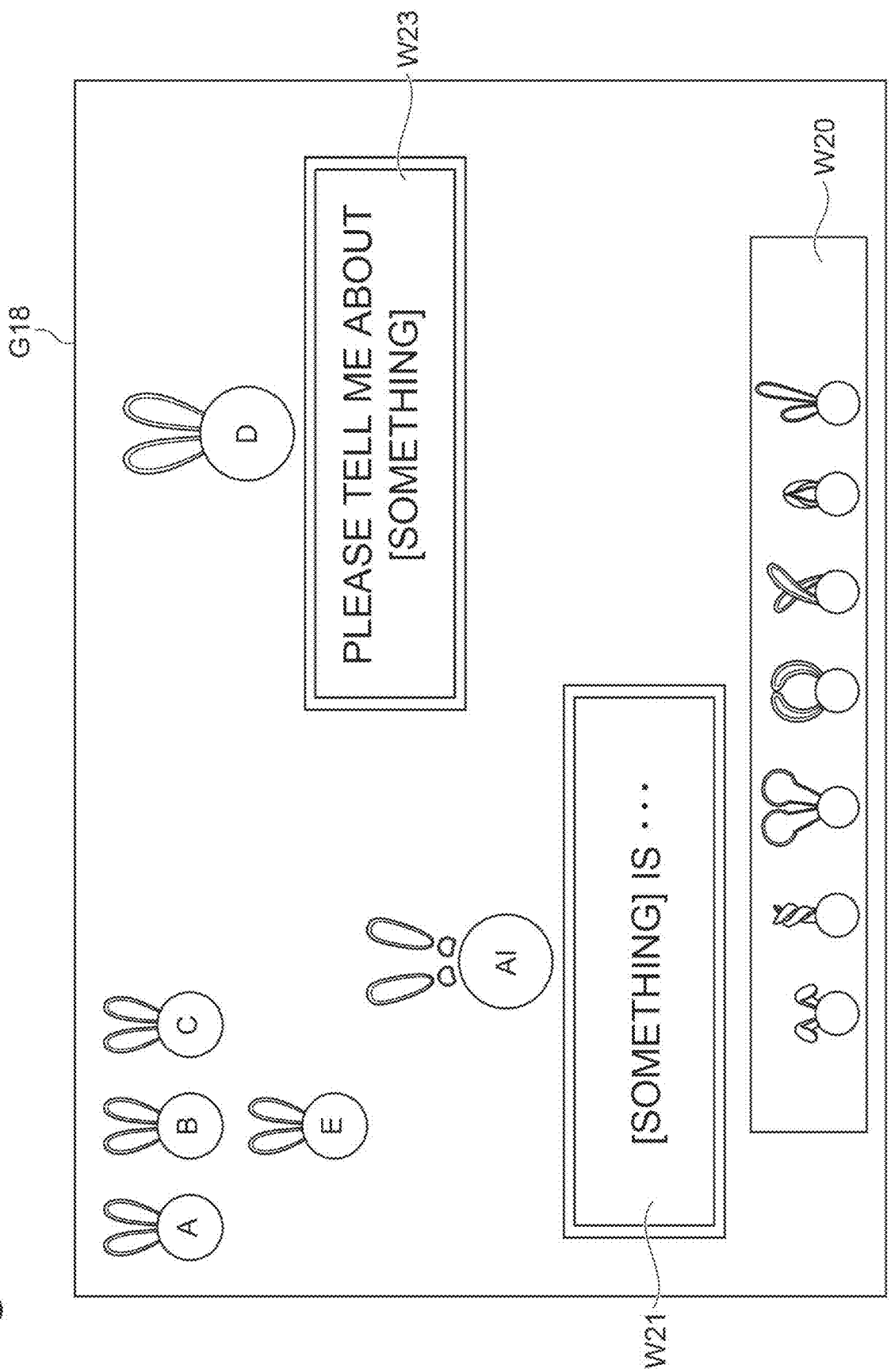
FIG. 59 is a diagram showing an example of a screen displayed in the virtual space.

When the input of text into input window W23 is completed, the user clicks character C of the AI. This causes a transition to a screen G18, as shown in FIG. 58. While the AI is processing the text (question) input into input window W23, ear animation E of character C of the AI repeats the entwining action. When the processing by the AI is completed, as shown in FIG. 59, ear animation E of character C of the AI performs an operation of giving the impression of an exclamation mark (!). Further, display window W21 displays an answer to the text (question) input into input window W23. In display window W21, in addition to the text generated by the AI, a still image related to the text, a moving image related to the text, a sentence related to the text, website information related to the text, and the like may be displayed. In display window W21, a text and a translation corresponding to the text or a translation of text may be displayed. Further, audio corresponding to the text displayed in display window W21 may be output.

Figure 60:
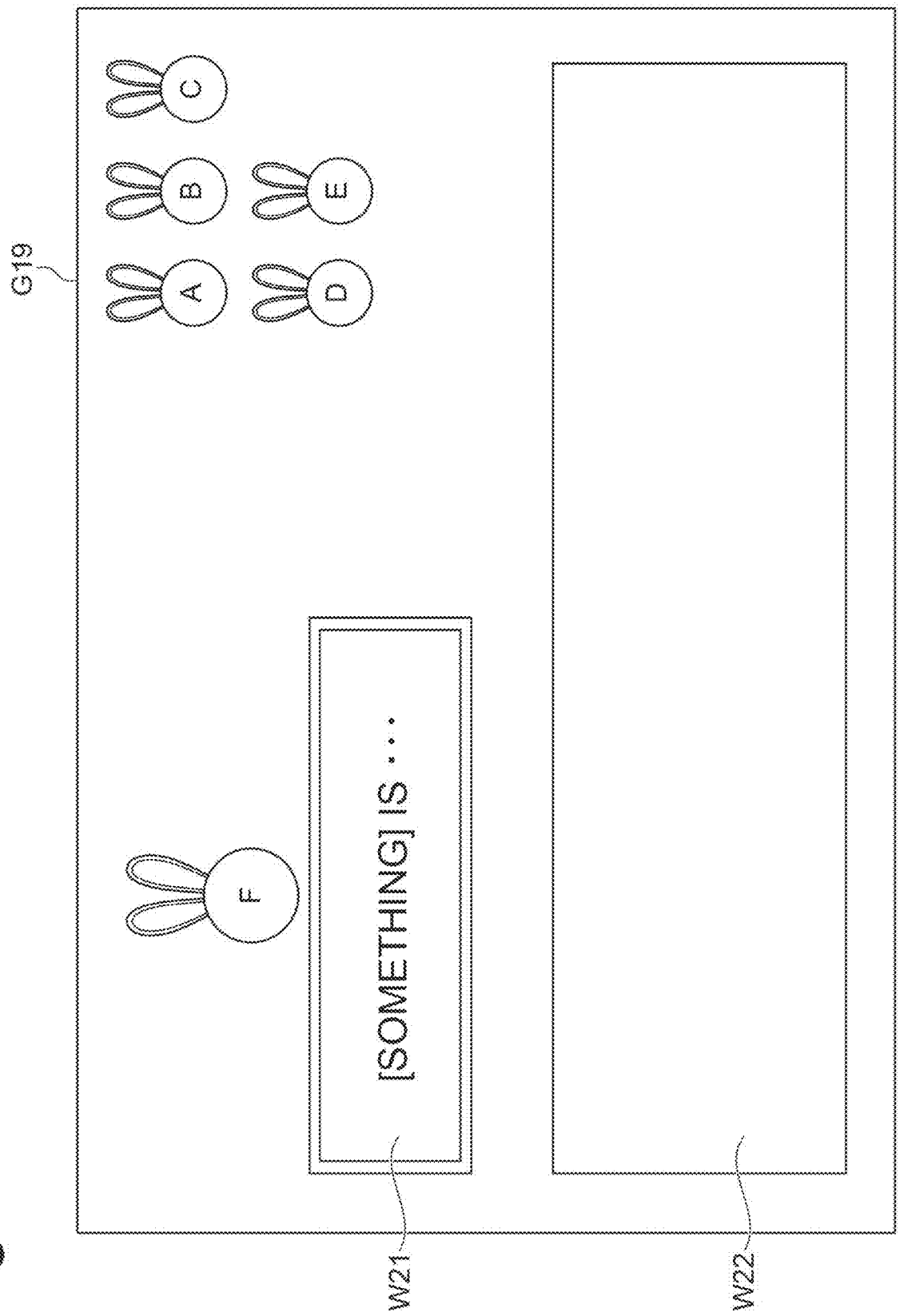
FIG. 60 is a diagram showing an example of a screen displayed in the virtual space.

In the case where the processing for the text (question) input into input window W23 cannot be completed, ear animation E of character C of the AI repeats the action of deeply bending the ear. When the processing by the AI is completed, the screen is transitioned to a screen G19 as shown in FIG. 60. Text window W22 is displayed on screen G19.

In the above embodiment, the case where the number of characters C of AI is one is described as an example, but the number of characters C of AI may be two or more. When the characters C of the AI are two or more, users U1, U2, and U3 may click the character C of the AI for which an answer is requested.

Figure 61:
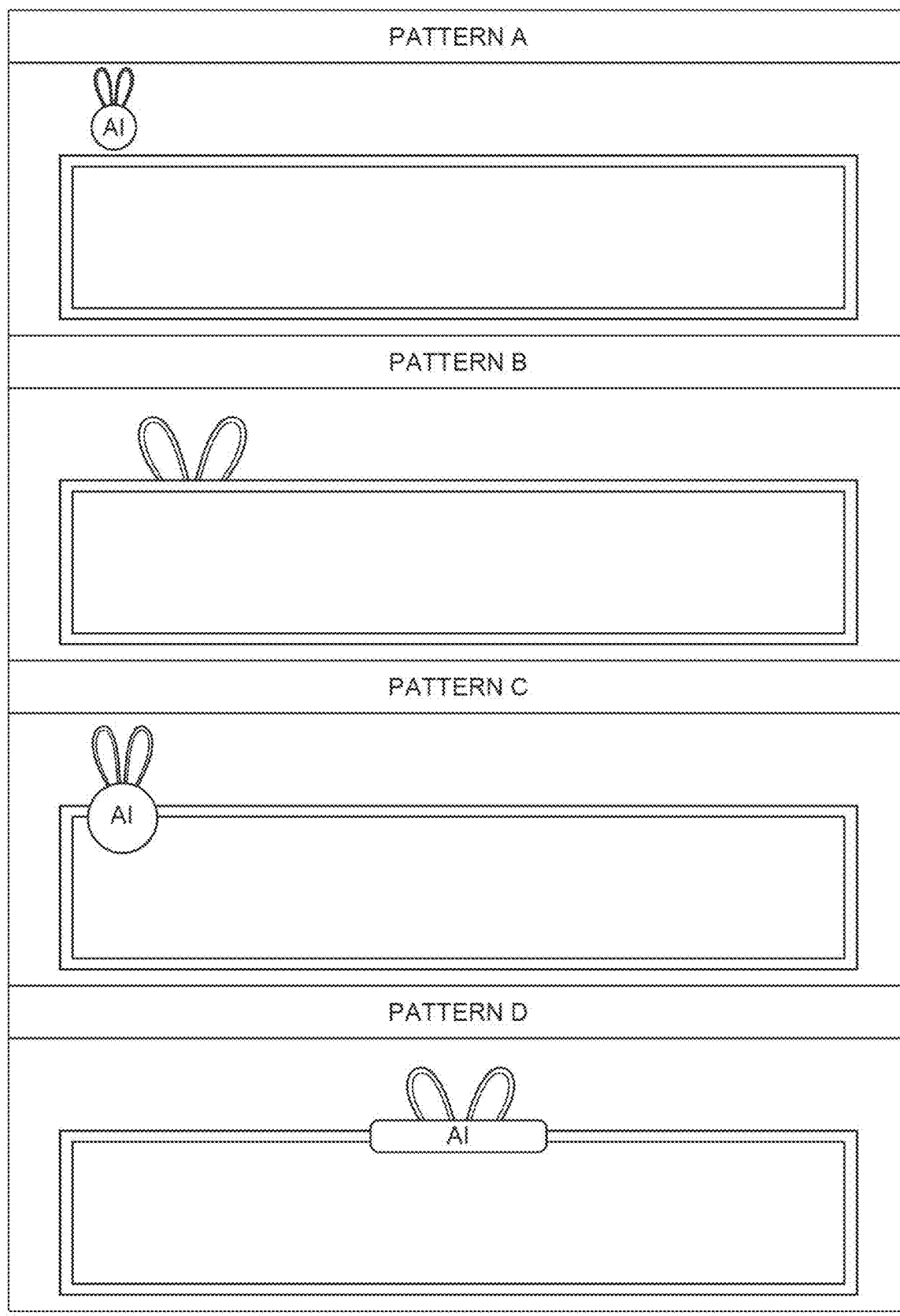
FIG. 61 is a diagram showing the display form of the character and the display portion.

In the above embodiment, display window (display portion) W21 is displayed on a lower portion of character C of the AI. However, the form of the display portion corresponding to character C of the AI is not limited thereto. As shown in pattern A of FIG. 61, character C and the display portion may be displayed separately, and as shown in pattern B of FIG. 61, the display portion and the ear animation may be integrated. Further, as shown in pattern C of FIG. 61, the display portion and the character may be integrated (a part of the body of the character may be the display portion), and as shown in pattern D of FIG. 61, the display portion and the character in which the body is deformed may be integrated.

In the above embodiment, the example in which the exchange between character C of the AI and character C of the questioner is displayed in the chat format is described. However, the communication between character C of the AI and character C of the questioner may be in the form as shown in FIG. 39. When there are character C of the AI and characters C of the plurality of users U1, U2, and U3, character C of the conversation partner (character C of the AI or character C of user U1, U2, or U3) is clicked after inputting character C in input window W23 of the user. When character C of the conversation partner is character C of user U1, U2, or U3, the details input into input window W23 are transmitted to the AI.

In addition to the above embodiment, the function of displaying the automatic recording for a predetermined time before and after the action of ear animation E, reproduction, time position information, and the like may be provided by using the action of ear animation E as a signal. In the automatic recording, since ear animation E is an action (reaction) after listening to other users U1, U2, and U3, the recording start position (time) using the action of ear animation E as a signal is preferably before the action of ear animation E, for example, 5 seconds before. The recording end position (time) can be set to a predetermined time (for example, 15 seconds) after the action of ear animation E. The recording end position may be determined by the operation of user U1, U2, or U3, or the recording may be extended by the manual operation. In addition, the recording may be performed at a timing (a position or a time at which the tag is attached) set by user U1, U2, or U3 during the class or the like.

Figure 62:
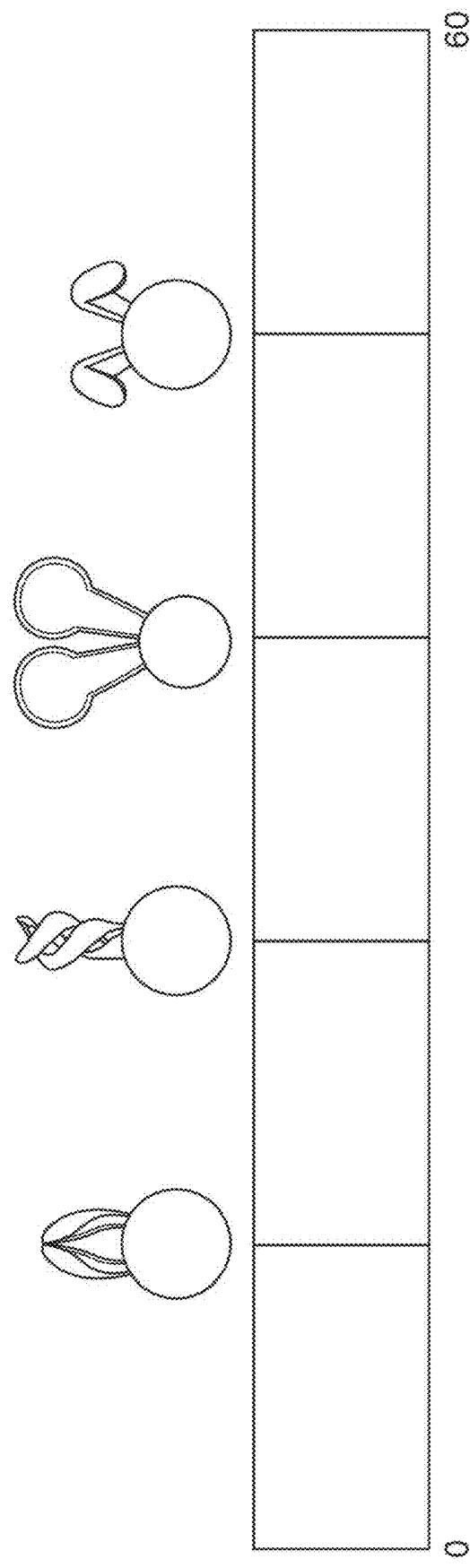
FIG. 62 is a diagram showing a time chart of a video recording.

As shown in FIG. 62, when the recorded program is reproduced, the action pattern of ear animation E is clicked in the time chart. For example, when the user clicks the action pattern of "clapping", a moving image is reproduced from 5 seconds before the operation of ear animation E to 15 seconds after the operation. Thus, the recorded program can be efficiently viewed.

As described above, since the recording is performed with the action of ear animation E as a starting point, the recording can be performed without performing a special operation. Therefore, the user can easily review the lesson and the like. In addition, the presenter and the like can also confirm a reaction based on the action of ear animation E, which is useful for reviewing the presentation. Further, for example, it is possible to record not statistics of the entire class but the reaction of a specific user for each individual. Therefore, a detailed reaction analysis can be performed. The analysis results may be summarized by the AI.

APPENDIX

As can be seen from the various examples above, the present disclosure includes the following aspects.

Appendix 1

A display program for controlling display of an activity in a virtual space, the activity being performed using a character for which an animation imitating ears acts in response to an operation of a user, the character being operable by the user, the display program causing a computer to execute:
    displaying a first screen including the character and content, the content being based on details of the activity; and
    causing the display to transition to a second screen different from the first screen in response to an action of the character.

Appendix 2

The display program according to Appendix 1, wherein a plurality of display areas are displayed in the virtual space, and
the content is displayed in at least one of the plurality of display areas.

Appendix 3

The display program according to Appendix 2, wherein the plurality of display areas include:
    a first display area in which the character serving as a leader of the activity is displayed; and
    a second display area in which the character serving as each of participants of the activity is displayed, and
    the character displayed in the first display area is displayed in a larger size than the characters displayed in the second display area.

Appendix 4

The display program according to Appendix 3, wherein the plurality of display areas include:
    a third display area in which, in response to the animation for the character of the participant performing an action indicating raising of a hand, the character is moved from the second display area and displayed and in which output of an audio of the one or more characters in the virtual space is limited; and
    a fourth display area in which the character displayed in the third display area is moved from the third display area and displayed and in which output of an audio of the character in the virtual space is acceptable, and
in response to movement of the character from the third display area to the fourth display area, output of the audio of the at least one of the one or more characters in the fourth display area is enabled.

Appendix 5

The display program according to Appendix 2 or Appendix 3, wherein each of the plurality of display areas is changeable in at least one of size and position in the virtual space.

Appendix 6

The display program according to Appendix 3 or Appendix 4, wherein the character displayed in the second display area is displayed in a distinguishable manner in accordance with an attribute of the user.

Appendix 7

The display program according to Appendix 3 or Appendix 4, wherein for the characters displayed in the second display area, output of the audio of the character in the virtual space is limited.

Appendix 8

The display program according to Appendix 2, wherein the display area in which the content is displayed displays input details input from the user.

Appendix 9

The display program according to Appendix 1, wherein a display portion configured to display the content is displayed in the virtual space.

Appendix 10

The display program according to Appendix 9, wherein the display portion displays input details input from the user.

Appendix 11

The display program according to Appendix 9 or Appendix 10, wherein in response to receipt of an operation of dragging and dropping the character to the display portion, a predetermined function is implemented in the display portion.

Appendix 12

The display program according to Appendix 11, wherein the user who operates the display portion is displayed in an identifiable manner.

Appendix 13

The display program according to Appendix 11, wherein after the character is dragged and dropped to the display portion, implementation of the predetermined function is terminated in response to receipt of an operation of dragging and dropping the character displayed in the display portion to an area other than the display portion.

Appendix 14

The display program according to Appendix 9 or Appendix 10, wherein in response to receipt of a predetermined operation on the display portion from the user, an operation screen is displayed to operate details displayed in the display portion.

Appendix 15

The display program according to Appendix 8 or Appendix 10, wherein the character of the user who inputs the input details is displayed in an identifiable manner from other characters, each being the character.

Appendix 16

The display program according to Appendix 9, wherein positions of the character and the display portion in the virtual space are changeable.

Appendix 17

The display program according to Appendix 9 or Appendix 10, wherein
the character is changeable in size, and
in response to a change in a size of one of a plurality of the characters displayed in the virtual space, a size of another of the plurality of characters is also changed in a similar manner.

Appendix 18

The display program according to Appendix 1, wherein a content display portion configured to display the content, a text display portion configured to display a conversation text obtained by converting an audio of the character into text, and at least two characters, each being the character, are displayed in the virtual space.

Appendix 19

The display program according to Appendix 18, wherein the text display portion displays a predetermined number of conversation texts among a plurality of the conversation texts created based on the audio of the character such that a chronologically latest conversation text among the predetermined number of conversation texts is displayed first.

Appendix 20

The display program according to Appendix 18 or Appendix 19, wherein in response to receipt of an operation on the conversation text displayed in the text display portion from the user, the conversation text is displayed in the content display portion.

Appendix 21

The display program according to Appendix 18 or Appendix 19, wherein
the character is changeable in layout and size, and
in response to a change in a layout or size of one of the two characters displayed in the virtual space, a layout or size of another of the two characters is also changed in accordance with the layout or size of the one of the two characters.

Appendix 22

The display program according to Appendix 9 or Appendix 10, wherein
the character is displayed around the display portion, and
an action of the user is detected, and the animation is activated based on the action of the user.

Appendix 23

The display program according to Appendix 9, wherein one or more movable objects on which one or more characters, each being the character, are arranged are displayed, the one or more movable objects being provided to be movable in the virtual space.

Appendix 24

The display program according to Appendix 23, wherein a plurality of the characters are arranged on each of a plurality of the movable objects, an audio of the plurality of characters arranged on one of the plurality of movable objects and an audio of the plurality of characters arranged on the other of the plurality of movable objects are configured not to be audible to each other.

Appendix 25

The display program according to Appendix 9, wherein a description of the content displayed in the display portion is displayed.

Appendix 26

The display program according to Appendix 9, wherein the activity in the virtual space includes outputting the animation for the character as editable video.

Appendix 27

The display program according to Appendix 1 or Appendix 2, wherein the activity of the character in the virtual space is recorded and output.

Appendix 28

A display method for controlling display of an activity in a virtual space, the activity being performed using a character for which an animation imitating ears acts in response to an operation of a user, the character being operable by the user, the display method including:
- displaying a first screen including the character and content, the content being based on details of the activity; and
- causing the display to transition to a second screen different from the first screen in response to an action of the character.

Appendix 29

A display system for controlling display of an activity in a virtual space, the activity being performed using a character for which an animation imitating ears acts in response to an operation of a user, the character being operable by the user, wherein
- a first screen is displayed, the first screen including the character and content, the content being based on details of the activity, and
- the display is caused to transition to a second screen different from the first screen in response to an action of the character.

REFERENCE SIGNS LIST 10 terminal, 11 input unit, 12 control unit, 13 storage unit, 13P terminal program, 14 communication unit, 15 output unit, 20 terminal, 30 terminal, 40 server, 42 control unit, 43 storage unit, 43P server program, 43S reception data, 44 communication unit, 50 operation device, 51A operation surface, 52 communication unit, 53 input unit, 54 control unit, 55 battery, 100 display system, AB avatar, AM animation, AP access point, B body, B1 display board (content display portion), B2 chat board (text display portion), B3 display board, B4 display board, B5 display board, B6 display board, B7 display board, B8 display board, B9 display board, BR1 breakout room, BR2 breakout room, BR3 breakout room, BR4 breakout room, BS base station, C character, CG character, CW material window, D, D1, D2 display portion, E ear animation, F finger, G1 selection screen, G2 screen, G3 screen, G4 screen, G5 screen, G6 screen, G7 screen, G8 screen, G9 screen, G10 screen, G11 screen, G12 screen, G13 screen, G14 screen, G15 screen, G16 screen, G17 screen, G18 screen, G19 screen, H hand, L distance, M1 mark, M2 mark, M3 mark, M4 mark, M5 mark, N network, P pointer, R virtual space, S moving stage, SB scroll bar, T table, U1 user, U2 user, U3 user, W1 moderator window (display area), W2 presenter window (display area), W3 participant window (display area), W4 material window (display area), W5 raiser-of-hand window (display area), W6 speaker window (display area), W7 material window, W9 material window, W10 material window, W11 participant window, W12 material window, W13 display window, W14 display window, W16 participant window, W17 operation window, W18 function selection window, W19 participant window, W20 operation window, W21 display window, W22 text window, W23 input window

The invention claimed is:

1. A non-transitory computer readable storage medium including executable instructions, which when executed by a computer, cause the computer to execute a display program stored on the non-transitory computer readable storage medium, the display program for controlling display of an activity in a virtual space, the activity being performed using a character operable by a user, the display program causing a computer to execute:
- displaying a first screen including the character and content, the content being based on details of the activity; and
- causing the display to transition to a second screen in response to an operation related to an action of the character, the second screen being different from the first screen and including a character corresponding to the character on the first screen, wherein
- the character on the first screen and the character on the second screen are different in at least one of form, state, and function, and
- for at least one of the character on the first screen and the character on the second screen, an animation imitating ears acts in response to an operation of the user,
- wherein the animation imitating ears acts includes at least one of expansion, contraction, bending, swinging, or entwining in response to the operation of the user,
- wherein
- a plurality of display areas are displayed in the virtual space,
- the character is displayed in at least some of the plurality of display areas,
- the plurality of display areas in which the character is displayed include:
  - a display area in which output of an audio of the character in the virtual space is limited; and
  - a display area capable of outputting the audio of the character in the space.

2. The non-transitory computer readable storage medium according to claim 1, wherein
- a plurality of display areas are displayed in the virtual space,
- the character is displayed in at least some of the plurality of display areas,
- each of the plurality of display areas in which the character is displayed is divided in accordance with an attribute of the character, and
- a form of the character is changed for each of the display areas.

3. The non-transitory computer readable storage medium according to claim 1, wherein the character displayed in the display areas is displayed in a distinguishable manner in accordance with an attribute of the user.

4. The non-transitory computer readable storage medium according to claim 2, wherein an audio of the character displayed in one of the plurality of display areas and the audio of the character displayed in another of the plurality of display areas are not to be audible to each other.

5. The non-transitory computer readable storage medium according to claim 2, wherein upon receiving an operation of dragging and dropping the character from one of the plurality of display areas to another of the plurality of display areas on the first screen, display of the character in the one of the plurality of display areas and the other of the plurality of display areas on the second screen is changed.

6. The non-transitory computer readable storage medium according to claim 1, wherein upon receiving a predetermined operation from the user, a plurality of the characters are displayed such that a front or back orientation of the plurality of characters is changed collectively.

7. The non-transitory computer readable storage medium according to claim 1, wherein a display portion is displayed on part of the character on the second screen by at least one of a predetermined operation and an audio input by the user on the first screen.

8. The non-transitory computer readable storage medium according to claim 7, wherein the display portion displays at least one of a conversation text converted into text from the audio of the character, a translation of the conversation text, and a translation of details displayed in the display portion.

9. The non-transitory computer readable storage medium according to claim 8, wherein the display portion displays at least one of a necessary drawing, a sentence, music, a moving image, a still image, and a website by using AI based on at least one of the audio and a text input for the character.

10. The non-transitory computer readable storage medium according to claim 1, wherein a display portion configured to display the content is displayed in the virtual space.

11. The non-transitory computer readable storage medium according to claim 10, wherein the display portion displays input details input from the user.

12. The non-transitory computer readable storage medium according to claim 10, wherein upon receiving an operation of dragging and dropping the character to the display portion, a predetermined function is implemented in the display portion.

13. The non-transitory computer readable storage medium according to claim 12, wherein after the character is dragged and dropped to the display portion, implementation of the predetermined function is terminated upon receiving an operation of dragging and dropping the character displayed in the display portion to an area other than the display portion.

14. The non-transitory computer readable storage medium according to claim 10, wherein upon receiving a predetermined operation on the display portion from the user, an operation screen is displayed to operate display details in the display portion.

15. The non-transitory computer readable storage medium according to claim 10, wherein
the character is changeable in size, and
upon a change in a size of one of a plurality of the characters displayed in the virtual space, a size of another of the plurality of characters is also changed in a similar manner.

16. The non-transitory computer readable storage medium according to claim 1, wherein a content display portion configured to display the content, a text display portion configured to display a conversation text converted into text from an audio of the character, and at least two characters are displayed in the virtual space.

17. The non-transitory computer readable storage medium according to claim 16, wherein upon receiving an operation on the conversation text displayed in the text display portion from the user, the conversation text is displayed in the content display portion.

18. The non-transitory computer readable storage medium according to claim 15, wherein
the character is changeable in layout and size, and
upon a change in a layout or size of one of two characters among the plurality of characters displayed in the virtual space, a layout or size of another of the two characters is also changed in accordance with the layout or size of the one of the two characters.

19. The non-transitory computer readable storage medium according to claim 11, wherein one or more movable objects on which one or more characters are arranged are displayed, the one or more movable objects being movably provided in the virtual space.

20. The non-transitory computer readable storage medium according to claim 19, wherein in a case where a plurality of the characters are arranged on each of a plurality of the movable objects, an audio of the plurality of characters arranged on one of the plurality of movable objects and the audio of the plurality of characters arranged on the other of the plurality of movable objects are not to be audible to each other.

21. The non-transitory computer readable storage medium according to claim 10, wherein a description of the content displayed in the display portion is displayed.

22. The non-transitory computer readable storage medium according to claim 10, wherein, the animation for the character is output as editable video in the activity in the virtual space.

23. The non-transitory computer readable storage medium according to claim 1, wherein an image or video of a face of the user is displayed on part of the character.

24. The non-transitory computer readable storage medium according to claim 1, wherein
one or more characters are displayed in the virtual space, and
at least one character among the one or more characters is operated by AI.

25. The non-transitory computer readable storage medium according to claim 24, wherein
for the character operated by the AI, the animation imitating ears acts by an operation of the AI,
a display portion corresponding to the character operated by the AI is displayed, and
the display portion displays at least one of text generated by the AI, a still image related to the text, a moving image related to the text, a sentence related to the text, and website information related to the text.

26. The non-transitory computer readable storage medium according to claim 24, wherein the character outputs an audio corresponding to the text generated by an AI.

27. The non-transitory computer readable storage medium according to claim 1, wherein the character is made to rotate in accordance with a position of a predetermined object so as to give an impression of the character gazing at the predetermined object.

28. A display method for controlling display of an activity in a virtual space, the activity being performed using a character operable by a user, the display method comprising:
displaying a first screen including the character and content, the content being based on details of the activity; and
causing the display to transition to a second screen in response to an operation related to an action of the character, the second screen being different from the first screen and including a character corresponding to the character on the first screen, wherein
the character on the first screen and the character on the second screen are different in at least one of form, state, and function, and
for at least one of the character on the first screen and the character on the second screen, an animation imitating ears acts in response to an operation of the user,
wherein the animation imitating ears acts includes at least one of expansion, contraction, bending, swinging, or entwining in response to the operation of the user,
wherein
a plurality of display areas are displayed in the virtual space,
the character is displayed in at least some of the plurality of display areas,
the plurality of display areas in which the character is displayed include:
a display area in which output of an audio of the character in the virtual space is limited; and a display area capable of outputting the audio of the character in the space.

29. A display system for controlling display of an activity in a virtual space, the activity being performed using a character operable by a user, wherein
  a first screen is displayed, the first screen including the character and content, the content being based on details of the activity,
  the display is caused to transition to a second screen in response to an operation related to an action of the character, the second screen being different from the first screen and including a character corresponding to the character on the first screen,
  the character on the first screen and the character on the second screen are different in at least one of form, state, and function, and
  for at least one of the character on the first screen and the character on the second screen, an animation imitating ears acts in response to an operation of the user,
  wherein the animation imitating ears acts includes at least one of expansion, contraction, bending, swinging, or entwining in response to the operation of the user,
  wherein
  a plurality of display areas are displayed in the virtual space,
  the character is displayed in at least some of the plurality of display areas,
  the plurality of display areas in which the character is displayed include:
    a display area in which output of an audio of the character in the virtual space is limited; and
    a display area capable of outputting the audio of the character in the space.

* * * * *